United States Patent
Allen et al.

(10) Patent No.: US 10,351,654 B2
(45) Date of Patent: Jul. 16, 2019

(54) POLYMER COMPOSITIONS AND METHODS

(71) Applicant: Saudi Aramco Technologies Company, Dhahran (SA)

(72) Inventors: Scott D. Allen, Ithaca, NY (US); Wayne R. Willkomm, Ithaca, NY (US)

(73) Assignee: Saudi Aramco Technologies Company, Dhahran (SA)

( * ) Notice: Subject to any disclaimer, the term of this patent is extended or adjusted under 35 U.S.C. 154(b) by 0 days.

(21) Appl. No.: 15/833,155

(22) Filed: Dec. 6, 2017

(65) Prior Publication Data

US 2018/0334525 A1 Nov. 22, 2018

Related U.S. Application Data

(63) Continuation of application No. 15/206,402, filed on Jul. 11, 2016, now Pat. No. 9,884,937, which is a continuation of application No. 14/234,482, filed as application No. PCT/US2012/047967 on Jul. 24, 2012, now Pat. No. 9,453,100.

(60) Provisional application No. 61/511,543, filed on Jul. 25, 2011.

(51) Int. Cl.
| | |
|---|---|
| *C08G 18/10* | (2006.01) |
| *C08G 18/08* | (2006.01) |
| *C08G 64/02* | (2006.01) |
| *C08G 64/18* | (2006.01) |
| *C08G 64/34* | (2006.01) |
| *C08G 18/44* | (2006.01) |
| *C08G 18/76* | (2006.01) |
| *C08G 18/16* | (2006.01) |
| *C08G 18/18* | (2006.01) |
| *C08G 18/20* | (2006.01) |
| *C08G 18/24* | (2006.01) |
| *C08G 101/00* | (2006.01) |

(52) U.S. Cl.
CPC .......... *C08G 18/14* (2013.01); *C08G 18/10* (2013.01); *C08G 18/165* (2013.01); *C08G 18/1833* (2013.01); *C08G 18/2081* (2013.01); *C08G 18/246* (2013.01); *C08G 18/44* (2013.01); *C08G 18/7664* (2013.01); *C08G 18/7671* (2013.01); *C08G 64/0208* (2013.01); *C08G 64/183* (2013.01); *C08G 64/34* (2013.01); *C08G 2101/0008* (2013.01); *C08G 2101/0025* (2013.01); *C08G 2101/0066* (2013.01); *C08G 2101/0083* (2013.01)

(58) Field of Classification Search
USPC .......................... 521/170; 528/44, 196, 198
See application file for complete search history.

(56) References Cited

U.S. PATENT DOCUMENTS

| | | | |
|---|---|---|---|
| 1,922,459 | A | 8/1933 | Schmidt |
| 3,887,505 | A | 6/1975 | Demou et al. |
| 4,005,035 | A | 1/1977 | Deaver |
| 4,490,490 | A | 12/1984 | Patton, Jr. et al. |
| 4,634,743 | A | 1/1987 | Prier |
| 4,826,887 | A | 5/1989 | Kuyper et al. |
| 4,851,507 | A | 7/1989 | Kesling, Jr. et al. |
| 4,883,826 | A | 11/1989 | Marugg et al. |
| 4,939,182 | A | 7/1990 | Marugg et al. |
| 5,120,815 | A | 6/1992 | Marugg et al. |
| 5,637,739 | A | 6/1997 | Jacobsen et al. |
| 5,663,393 | A | 9/1997 | Jacobsen et al. |
| 5,665,890 | A | 9/1997 | Jacobsen et al. |
| 5,801,210 | A | 9/1998 | Radovich et al. |
| 5,929,232 | A | 7/1999 | Jacobsen et al. |
| 6,130,340 | A | 10/2000 | Jacobsen et al. |
| 6,262,127 | B1 | 7/2001 | Acemoglu et al. |
| 6,309,997 | B1 | 10/2001 | Fujita et al. |
| 6,359,022 | B1 | 3/2002 | Hickey et al. |
| 6,639,087 | B2 | 10/2003 | Larrow et al. |
| 6,844,448 | B2 | 1/2005 | Jacobsen et al. |
| 6,884,750 | B2 | 4/2005 | Kim et al. |
| 6,903,043 | B2 | 6/2005 | Kim et al. |
| 7,145,022 | B2 | 12/2006 | Luinstra et al. |
| 7,244,805 | B2 | 7/2007 | Park et al. |

(Continued)

FOREIGN PATENT DOCUMENTS

| | | |
|---|---|---|
| CN | 1483051 A | 3/2004 |
| CN | 1880356 A | 12/2006 |

(Continued)

OTHER PUBLICATIONS

U.S. Appl. No. 15/923,076, filed Mar. 16, 2018, Allen et al.

(Continued)

*Primary Examiner* — Terressa Boykin
(74) *Attorney, Agent, or Firm* — Choate, Hall & Stewart LLP; John P. Pearick; Nicholas J. Pace

(57) ABSTRACT

The present invention encompasses polyurethane compositions comprising aliphatic polycarbonate chains. In one aspect, the present invention encompasses polyurethane foams, thermoplastics and elastomers derived from aliphatic polycarbonate polyols and polyisocyanates wherein the polyol chains contain a primary repeating unit having a structure:

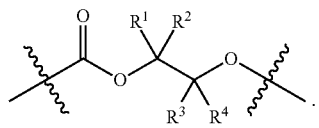

In another aspect, the invention provides articles comprising the inventive foam and elastomer compositions as well as methods of making such compositions.

25 Claims, 3 Drawing Sheets

(56) References Cited

U.S. PATENT DOCUMENTS

| | | |
|---|---|---|
| 7,388,037 B2 | 6/2008 | Sasaki et al. |
| 7,399,822 B2 | 7/2008 | Coates et al. |
| 8,163,867 B2 | 4/2012 | Lee et al. |
| 8,178,591 B2 | 5/2012 | Younes et al. |
| 8,207,365 B2 | 6/2012 | Zheng et al. |
| 8,232,267 B2 | 7/2012 | Groves |
| 8,247,520 B2 | 8/2012 | Allen et al. |
| 8,252,955 B2 | 8/2012 | Gao et al. |
| 8,461,290 B2 | 6/2013 | Carpentier et al. |
| 8,470,956 B2 | 6/2013 | Allen et al. |
| 8,507,733 B2 | 8/2013 | Ok et al. |
| 8,598,309 B2 | 12/2013 | Jeong et al. |
| 8,604,155 B2 | 12/2013 | Allen et al. |
| 8,642,721 B2 | 2/2014 | Ok et al. |
| 8,791,274 B2 | 7/2014 | Ok et al. |
| 8,921,508 B2 | 12/2014 | Allen et al. |
| 9,376,531 B2 | 6/2016 | Allen et al. |
| 9,453,100 B2 | 9/2016 | Allen et al. |
| 9,512,259 B2 | 12/2016 | Allen et al. |
| 9,809,678 B2 | 11/2017 | Allen et al. |
| 9,884,937 B2 | 2/2018 | Allen et al. |
| 9,994,760 B2 | 6/2018 | Allen et al. |
| 2004/0092616 A1 | 5/2004 | Occhiello et al. |
| 2006/0089252 A1 | 4/2006 | Coates et al. |
| 2006/0131791 A1 | 6/2006 | Nakamura et al. |
| 2008/0058468 A1 | 3/2008 | Younes |
| 2009/0306237 A1 | 12/2009 | Babb et al. |
| 2009/0306239 A1 | 12/2009 | Mijolovic et al. |
| 2010/0036008 A1 | 2/2010 | Bruchmann et al. |
| 2010/0048935 A1 | 2/2010 | Mijolovic et al. |
| 2010/0256329 A1 | 10/2010 | Nozaki et al. |
| 2011/0230580 A1 | 9/2011 | Allen et al. |
| 2012/0095122 A1 | 4/2012 | Zhou et al. |
| 2013/0066044 A1 | 3/2013 | Allen et al. |
| 2013/0244864 A1 | 9/2013 | Allen et al. |
| 2013/0296450 A1 | 11/2013 | Hofmann et al. |
| 2014/0046008 A1 | 2/2014 | Allen et al. |
| 2014/0066535 A1 | 3/2014 | Jacobs et al. |
| 2014/0072806 A1 | 3/2014 | Allen et al. |
| 2014/0187660 A1 | 7/2014 | Allen et al. |
| 2014/0249279 A1 | 9/2014 | Williams et al. |
| 2015/0299372 A1 | 10/2015 | Allen et al. |
| 2015/0299386 A1 | 10/2015 | Allen et al. |
| 2016/0115288 A1 | 4/2016 | Waddington |
| 2016/0264728 A1 | 9/2016 | Allen et al. |
| 2016/0319064 A1 | 11/2016 | Allen et al. |
| 2017/0145147 A1 | 5/2017 | Allen et al. |
| 2017/0198203 A1 | 7/2017 | Allen et al. |
| 2018/0022869 A1 | 1/2018 | Allen et al. |

FOREIGN PATENT DOCUMENTS

| | | |
|---|---|---|
| CN | 101134842 A | 3/2008 |
| CN | 101328254 A | 12/2008 |
| CN | 101600748 A | 12/2009 |
| CN | 101857670 A | 10/2010 |
| CN | 102149746 A | 8/2011 |
| EP | 0228037 A2 | 7/1987 |
| EP | 1726612 A2 | 11/2006 |
| EP | 1894956 A1 | 3/2008 |
| EP | 2465890 A1 | 6/2012 |
| EP | 2146977 B1 | 11/2012 |
| EP | 2 730 598 A1 | 5/2014 |
| EP | 2257559 B1 | 10/2014 |
| JP | S51-089597 A | 8/1976 |
| JP | S62-181331 A | 8/1987 |
| JP | H07-188376 A | 7/1995 |
| JP | 2001-503469 A | 3/2001 |
| JP | 2002-179787 A | 6/2002 |
| JP | 2003-082050 A | 3/2003 |
| JP | 2005-290202 A | 10/2005 |
| JP | 2006-104404 A | 4/2006 |
| JP | 2006-169436 A | 6/2006 |
| JP | 2008-081518 | 4/2008 |
| JP | 2008-274051 A | 11/2008 |
| JP | 2010-509479 A | 3/2010 |
| KR | 10-1992-0701290 | 8/1992 |
| KR | 10-0853358 B1 | 8/2008 |
| WO | WO-90/11309 A1 | 10/1990 |
| WO | WO-98/04538 A1 | 2/1998 |
| WO | WO-98/21261 A1 | 5/1998 |
| WO | WO-03/054047 A1 | 7/2003 |
| WO | WO-2006/063701 A1 | 6/2006 |
| WO | WO-2008/058913 A1 | 5/2008 |
| WO | WO-2008/071622 A1 | 6/2008 |
| WO | WO-2008/136179 A1 | 11/2008 |
| WO | WO-2010/028362 A1 | 3/2010 |
| WO | WO-2010/062703 A1 | 6/2010 |
| WO | WO-2010/115567 A1 | 10/2010 |
| WO | WO-2012/071505 A1 | 5/2012 |
| WO | WO-2012/080192 A1 | 6/2012 |
| WO | WO-2012/130760 A1 | 10/2012 |
| WO | WO-2012/154849 A1 | 11/2012 |
| WO | WO-2013/016331 A2 | 1/2013 |
| WO | WO-2013/138161 A1 | 9/2013 |
| WO | WO-2013/158621 A1 | 10/2013 |
| WO | WO-2014/074706 A1 | 5/2014 |
| WO | WO-2014/186397 A1 | 11/2014 |

OTHER PUBLICATIONS

U.S. Appl. No. 15/986,927, filed May 23, 2018, Allen et al.
International Search Report for PCT/US2012/047967, 2 pages (dated Jan. 24, 2013).
International Search Report for PCT/US2013/068932, 2 pages (dated Mar. 10, 2014).
International Search Report for PCT/US2014/037903, 3 pages (dated Sep. 4, 2014).
Jialong, W. et al., Polyurethane Foam Plastics and Its Formation, Processing Technology of Plastics, Printing Industry Press, Section 4 first paragraph: 251 (2009).
Liu Yijun, Polyurethane resin and its application, 68-69 (2005). English Translation, pp. 1-3.
Peilin, X. et al., Combined Polyether Polyols, Polyurethane Materials Handbook, Chemical Industry Press, Section 5 first paragraph: 77 (2002).
Polyurethane Resin Handbook, The Nikkan Kogyo Shimbun, Ltd., ISBN: 4-526-02234-9, 36-37 (Sep. 25, 1987).
Written Opinion for PCT/US2012/047967, 16 pages (dated Jan. 24, 2013).
Written Opinion for PCT/US2013/068932, 17 pages (dated Mar. 10, 2014).
Written Opinion for PCT/US2014/037903, 8 pages (dated Sep. 4, 2014).

POLYMER COMPOSITIONS AND METHODS

CROSS REFERENCE TO RELATED APPLICATIONS

The present application is a continuation of U.S. patent application Ser. No. 15/206,402, filed Jul. 11, 2016 (now U.S. Pat. No. 9,884,937), which is a continuation of U.S. patent application Ser. No. 14/234,482, filed Jan. 23, 2014 (now U.S. Pat. No. 9,453,100), which claims priority to U.S. provisional patent application No. 61/511,543, filed Jul. 25, 2011, the entire contents of which are hereby incorporated by reference.

GOVERNMENT SUPPORT

This invention was made with government support under grant number DE-FE0002474 awarded by the Department of Energy. The government has certain rights in the invention.

FIELD OF THE INVENTION

This invention pertains to the field of polymers. More particularly, the invention pertains to polyurethane foams and thermoplastics incorporating aliphatic polycarbonate polyols having a high percentage of —OH end groups.

SUMMARY OF THE INVENTION

In one aspect, the present invention encompasses polyurethane foams, thermoplastics and elastomers derived from aliphatic polycarbonate polyols and polyisocyanates wherein the polyol chains contain a primary repeating unit having a structure:

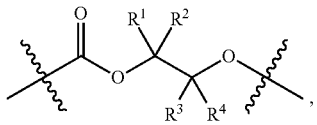

where $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms.

In certain embodiments, such aliphatic polycarbonate chains are derived from the copolymerization of carbon dioxide with one or more epoxide substrates. Such copolymerizations are described and exemplified in published PCT application WO/2010/028362 the entirety of which is incorporated herein by reference. In some embodiments, the aliphatic polycarbonate chains are derived from ethylene oxide, propylene oxide, or optionally substituted $C_{3-30}$ aliphatic epoxides, or mixtures of two or more of these. In some embodiments, the aliphatic polycarbonate chains have a number average molecular weight ($M_N$) less than about 20,000 g/mol. In certain embodiments, the aliphatic polycarbonate polyols have a functional number of between about 1.8 and about 6.

In another aspect, the present invention encompasses urethane compositions comprising aliphatic polycarbonates derived from the alternating copolymerization of one or more epoxides and carbon dioxide. In certain embodiments, the inventive urethane compositions comprise foams. In certain embodiments, the inventive urethanes comprise thermoplastic polyurethanes. In certain embodiments, the inventive urethanes comprise polyurethane molding compositions. In certain embodiments, the inventive urethanes comprise polyurethane sheet, bar, rod, or tube stock.

In another aspect, the present invention encompasses methods of making such foams and thermoplastic compositions. In certain embodiments, the methods comprise a step of contacting the aliphatic polycarbonate polyol with one or more isocyanate compounds under conditions to promote the chain extension of cross-linking of the polyol chains by formation of urethane linkages.

Definitions

Definitions of specific functional groups and chemical terms are described in more detail below. For purposes of this invention, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5th Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3rd Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain embodiments, mixtures of enantiomers or diastereomers are provided.

Furthermore, certain compounds, as described herein may have one or more double bonds that can exist as either the Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a stereoisomer may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound or polymer is made up of a significantly greater proportion of one enantiomer. In certain embodiments the compound is made up of at least about 90% by weight of a preferred enantiomer. In other embodiments the compound is made up of at least about 95%, 98%, or 99% by weight of a preferred enantiomer. Preferred enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. *Stereochemistry of Carbon Compounds* (McGraw-Hill, N Y, 1962); Wilen, S. H. *Tables of Resolving Agents and Optical Resolutions* p. 268 (E. L. Eliel, Ed., Univ. of Notre Dame Press, Notre Dame, Ind. 1972).

The term "epoxide", as used herein, refers to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. In certain embodiments, a polymer is comprised of substantially alternating units derived from $CO_2$ and an epoxide (e.g., poly(ethylene carbonate). In certain embodiments, a polymer of the present invention is a copolymer, terpolymer, heteropolymer, block copolymer, or tapered heteropolymer incorporating two or more different epoxide monomers. With respect to the structural depiction of such higher polymers, the convention of showing enchainment of different monomer units separated by a slash may be used herein

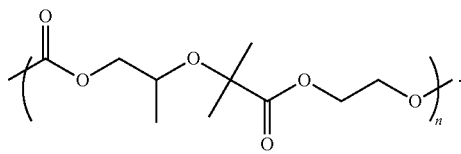

These structures are to be interpreted to encompass copolymers incorporating any ratio of the different monomer units depicted unless otherwise specified. This depiction is also meant to represent random, tapered, block co-polymers, and combinations of any two or more of these and all of these are implied unless otherwise specified.

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-40 carbon atoms. In certain embodiments, aliphatic groups contain 1-20 carbon atoms. In certain embodiments, aliphatic groups contain 3-20 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in some embodiments aliphatic groups contain 1-3 carbon atoms, and in some embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, refers to aliphatic groups wherein one or more carbon atoms are independently replaced by one or more atoms selected from the group consisting of oxygen, sulfur, nitrogen, or phosphorus. In certain embodiments, one to six carbon atoms are independently replaced by one or more of oxygen, sulfur, nitrogen, or phosphorus. Heteroaliphatic groups may be substituted or unsubstituted, branched or unbranched, cyclic or acyclic, and include saturated, unsaturated or partially unsaturated groups.

As used herein, the term "bivalent $C_{1-8}$ (or $C_{1-3}$) saturated or unsaturated, straight or branched, hydrocarbon chain", refers to bivalent alkyl, alkenyl, and alkynyl, chains that are straight or branched as defined herein.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In certain embodiments, the term "3- to 7-membered carbocycle" refers to a 3- to 7-membered saturated or partially unsaturated monocyclic carbocyclic ring. In certain embodiments, the term "3- to 8-membered carbocycle" refers to a 3- to 8-membered saturated or partially unsaturated monocyclic carbocyclic ring. In certain embodiments, the terms "3- to 14-membered carbocycle" and "$C_{3-14}$ carbocycle" refer to a 3- to 8-membered saturated or partially unsaturated monocyclic carbocyclic ring, or a 7- to 14-membered saturated or partially unsaturated polycyclic carbocyclic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in some embodiments alkyl groups contain 1-3 carbon atoms, and in some embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in some embodiments alkenyl groups contain 2-3 carbon atoms, and in some embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in some embodiments alkynyl groups contain 2-3 carbon atoms, and in some embodiments alkynyl groups contain 2 carbon atoms. Representative alkynyl groups include, but are not limited to, ethynyl, 2-propynyl (propargyl), 1-propynyl, and the like.

The term "alkoxy", as used herein refers to an alkyl group, as previously defined, attached to the parent molecule through an oxygen atom. Examples of alkoxy, include but are not limited to, methoxy, ethoxy, propoxy, isopropoxy, n-butoxy, tert-butoxy, neopentoxy, and n-hexoxy.

The term "acyl", as used herein, refers to a carbonyl-containing functionality, e.g., —C(=O)R', wherein R' is hydrogen or an optionally substituted aliphatic, heteroaliphatic, heterocyclic, aryl, heteroaryl group, or is a substituted (e.g., with hydrogen or aliphatic, heteroaliphatic, aryl, or heteroaryl moieties) oxygen or nitrogen containing functionality (e.g., forming a carboxylic acid, ester, or amide functionality). The term "acyloxy", as used here, refers to an acyl group attached to the parent molecule through an oxygen atom.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like. In certain embodiments, the terms "6- to 10-membered aryl" and "$C_{6-10}$ aryl" refer to a phenyl or an 8- to 10-membered polycyclic aryl ring.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. In certain embodiments, the term "5- to 10-membered heteroaryl" refers to a 5- to 6-membered heteroaryl ring having 1 to 3 heteroatoms independently selected from nitrogen, oxygen, or sulfur, or an 8- to 10-membered bicyclic heteroaryl ring having 1 to 4 heteroatoms independently selected from nitrogen, oxygen, or sulfur. In certain embodiments, the term "5- to 12-membered heteroaryl" refers to a 5- to 6-membered heteroaryl ring having 1 to 3 heteroatoms independently selected from nitrogen, oxygen, or sulfur, or an 8- to 12-membered bicyclic heteroaryl ring having 1 to 4 heteroatoms independently selected from nitrogen, oxygen, or sulfur.

As used herein, the terms "heterocycle", "heterocyclyl", "heterocyclic radical", and "heterocyclic ring" are used interchangeably and refer to a stable 5- to 7-membered monocyclic or 7-14-membered polycyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or +NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 12-membered heterocyclic" refers to a 3- to 8-membered saturated or partially unsaturated monocyclic heterocyclic ring having 1 to 2 heteroatoms independently selected from nitrogen, oxygen, or sulfur, or a 7- to 12-membered saturated or partially unsaturated polycyclic heterocyclic ring having 1-3 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —(CH$_2$)$_{0-4}$R°; —(CH$_2$)$_{0-4}$OR; —O—(CH$_2$)$_{0-4}$C(O)OR°; —(CH$_2$)$_{0-4}$CH(OR°)$_2$; —(CH$_2$)$_{0-4}$SR°; —(CH$_2$)$_{0-4}$Ph, which may be substituted with R°; —(CH$_2$)$_{0-4}$O(CH$_2$)$_{0-1}$Ph which may be substituted with R°; —CH═CHPh, which may be substituted with R°; —NO$_2$; —CN; —N$_3$; —(CH$_2$)$_{0-4}$N(R°)$_2$; —(CH$_2$)$_{0-4}$N(R°)C(O)R°; —N(R°)C(S)R°; —(CH$_2$)$_{0-4}$N(R°)C(O)NR°$_2$; —N(R°)C(S)NR°$_2$; —(CH$_2$)$_{0-4}$N(R°)C(O)OR°; —N(R°)N(R°)C(O)R°; —N(R°)N(R°)C(O)NR°$_2$; —N(R°)N(R°)C(O)OR°; —(CH$_2$)$_{0-4}$C(O)R; —C(S)R°; —(CH$_2$)$_{0-4}$C(O)ORo; —(CH$_2$)$_{0-4}$C(O)N(R°)$_2$; —(CH$_2$)$_{0-4}$C(O)SR°; —(CH$_2$)$_{0-4}$C(O)OSiR°$_3$; —(CH$_2$)$_{0-4}$OC(O)R°; —OC(O)(CH$_2$)$_{0-4}$SR—, SC(S)SR°; —(CH$_2$)$_{0-4}$SC(O)R°; —(CH$_2$)$_{0-4}$C(O)NR°$_2$; —C(S)NR°$_2$; —C(S)SR°; —SC(S)SR°, —(CH$_2$)$_{0-4}$OC(O)NR°$_2$; —C(O)N(OR°)R°; —C(O)C(O)R°; —C(O)CH$_2$C(O)R°; —C(NOR°)R°; —(CH$_2$)$_{0-4}$SSR°; —(CH$_2$)$_{0-4}$S(O)$_2$R°; —(CH$_2$)$_{0-4}$S(O)$_2$OR°; —(CH$_2$)$_{0-4}$OS(O)$_2$R°; —S(O)$_2$NR°$_2$; —(CH$_2$)$_{0-4}$S(O)R°; —N(R°)S(O)$_2$NR°$_2$; —N(R°)S(O)$_2$R°; —N(OR°)R°; —C(NH)NR°$_2$; —P(O)$_2$R°; —P(O)R°$_2$; —OP(O)R°$_2$; —OP(O)(OR°)$_2$; SiR°$_3$; —(C$_{1-4}$ straight or branched alkylene)O—N(R°)$_2$; or —(C$_{1-4}$ straight or branched alkylene)C(O)O—N(R°)$_2$, wherein each R° may be substituted as defined below and is independently hydrogen, C$_{1-8}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R°, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on R° (or the ring formed by taking two independent occurrences of R° together with their intervening atoms), are independently halogen, —(CH$_2$)$_{0-2}$R●, -(haloR●), —(CH$_2$)$_{0-2}$OH, —(CH$_2$)$_{0-2}$OR●, —(CH$_2$)$_{0-2}$CH(OR●)$_2$; —O(haloR●), —CN, —N$_3$, —(CH$_2$)$_{0-2}$C(O)R●, —(CH$_2$)$_{0-2}$C(O)OH, —(CH$_2$)$_{0-2}$C(O)OR●, —(CH$_2$)$_{0-4}$C(O)N(R°)$_2$; —(CH$_2$)O$_2$SR●, —(CH$_2$)$_{0-2}$SH, —(CH$_2$)$_{0-2}$NH$_2$, —(CH$_2$)$_{0-2}$NHR●, —(CH$_2$)$_{0-2}$NR●$_2$, —NO$_2$, —SiR●$_3$, —OSiR°$_3$, —C(O)SR●, —(C$_{1-4}$ straight or branched alkylene)C(O)OR●, or —SSR● wherein each R● is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R° include ═O and ═S.

Suitable divalent substituents on a saturated carbon atom of an "optionally substituted" group include the following: ═O, ═S, ═NNR*$_2$, ═NNHC(O)R*, ═NNHC(O)OR*, ═NNHS(O)$_2$R*, ═NR*, ═NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R●, -(haloR●), —OH, —OR●, —O(haloR●), —CN, —C(O)OH, —C(O)OR●, —NH$_2$, —NHR●, —NR●$_2$, or —NO$_2$, wherein each R● is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R†, —NR†$_2$, —C(O)R†, —C(O)OR†, —C(O)C(O)R†, —C(O)CH$_2$C(O)R†, —S(O)$_2$R†, —S(O)$_2$NR†$_2$, —C(S)NR†$_2$, —C(NH)NR†$_2$, or —N(R†)S(O)$_2$R†; wherein each R† is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R†, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of $R^\dagger$ are independently halogen, —R•, -(haloR•), —OH, —OR•, —O(haloR•), —CN, —C(O)OH, —C(O)OR•, —NH$_2$, —NHR•, —NR•$_2$, or —NO$_2$, wherein each R• is unsubstituted or where preceded by "halo" is substituted only with one or more halogens, and is independently $C_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

When substituents are described herein, the term "radical" or "optionally substituted radical" is sometimes used. In this context, "radical" means a moiety or functional group having an available position for attachment to the structure on which the substituent is bound. In general the point of attachment would bear a hydrogen atom if the substituent were an independent neutral molecule rather than a substituent. The terms "radical" or "optionally-substituted radical" in this context are thus interchangeable with "group" or "optionally-substituted group".

As used herein, the "term head-to-tail" or "HT", refers to the regiochemistry of adjacent repeating units in a polymer chain. For example, in the context of poly(propylene carbonate) (PPC), the term head-to-tail based on the three regiochemical possibilities depicted below:

moieties such as hydroxyl-terminated polyethers. Alkoxylated materials can be derived from the parent compounds by treatment of the functional groups with epoxides.

DETAILED DESCRIPTION OF CERTAIN EMBODIMENTS

Figure 1:
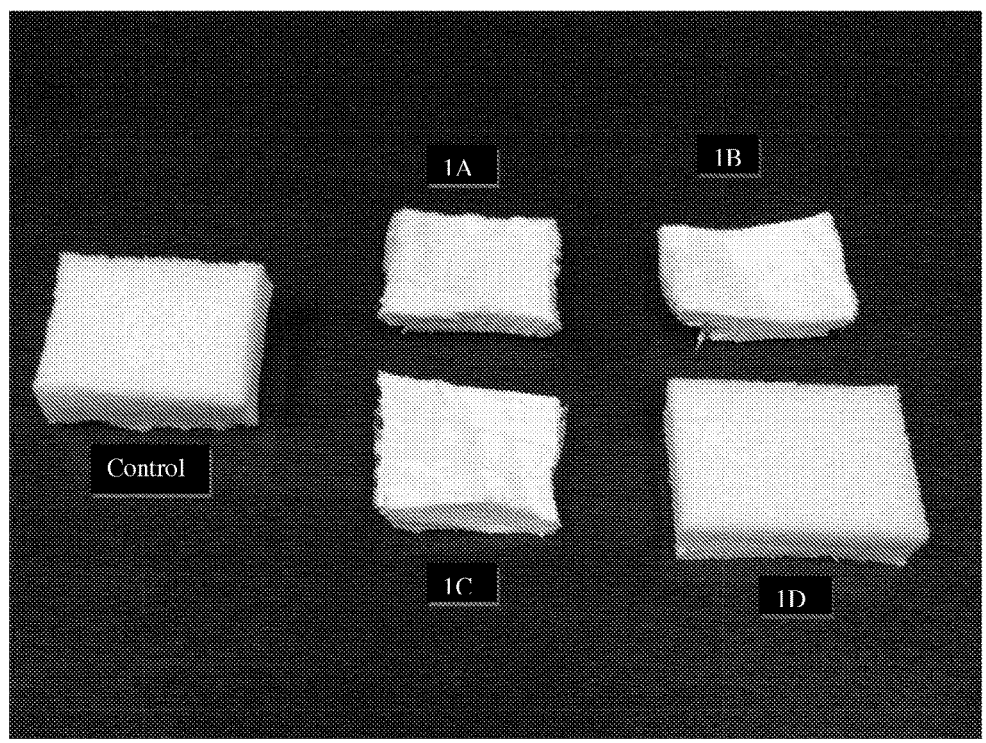
FIG. 1 shows a photograph of flexible foam samples prepared according to Examples 1A through 1D along with a control flexible foam sample.
Figure 2:
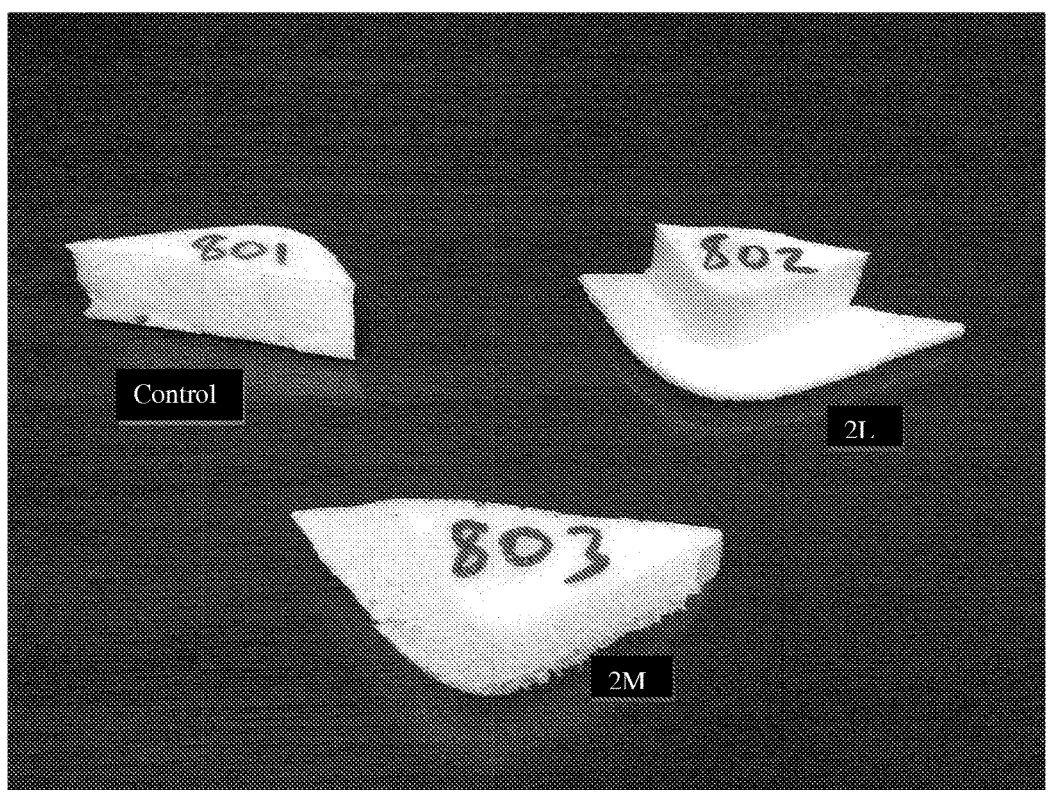
FIG. 2 shows a photograph of microcellular foam samples prepared according to Examples 2L and 2M along with a control microcellular foam sample.
Figure 3:
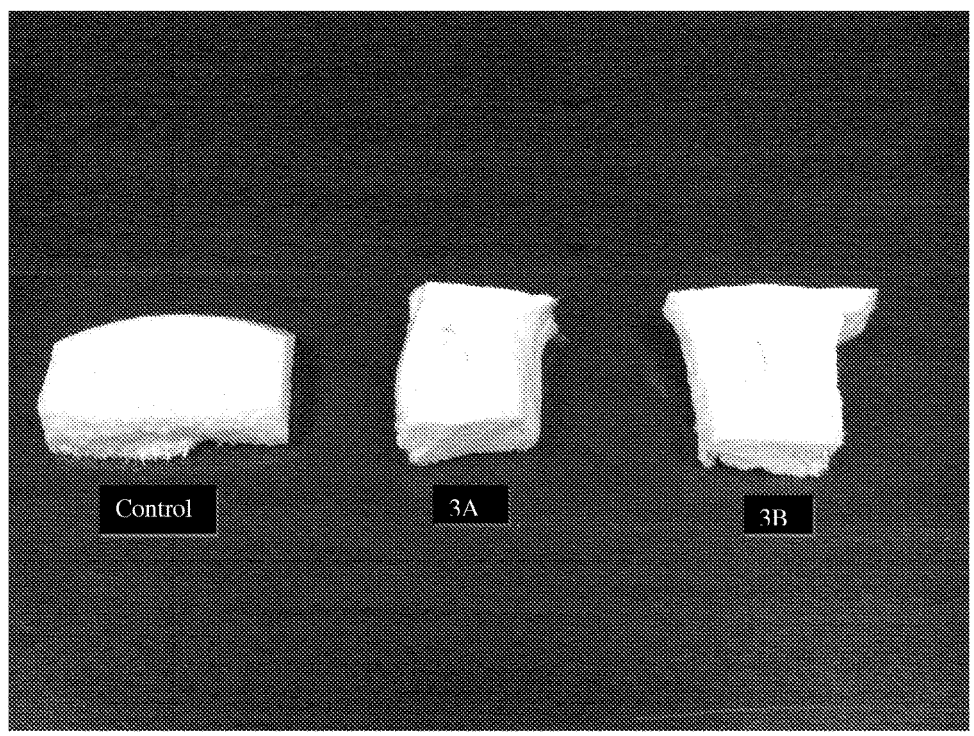
FIG. 3 shows a photograph of rigid foam samples prepared according to the methods of Examples 3A and 3B along with a control rigid foam sample.

In one aspect, the present invention encompasses polymer compositions comprising aliphatic polycarbonate chains cross-linked or chain extended through urethane linkages. In certain embodiments, these polymer compositions comprise polyurethane foams, thermoplastics, or elastomers.

The field of polyurethane manufacture and formulation is well advanced. In some embodiments, the novel materials presented herein are formulated, processed, and used

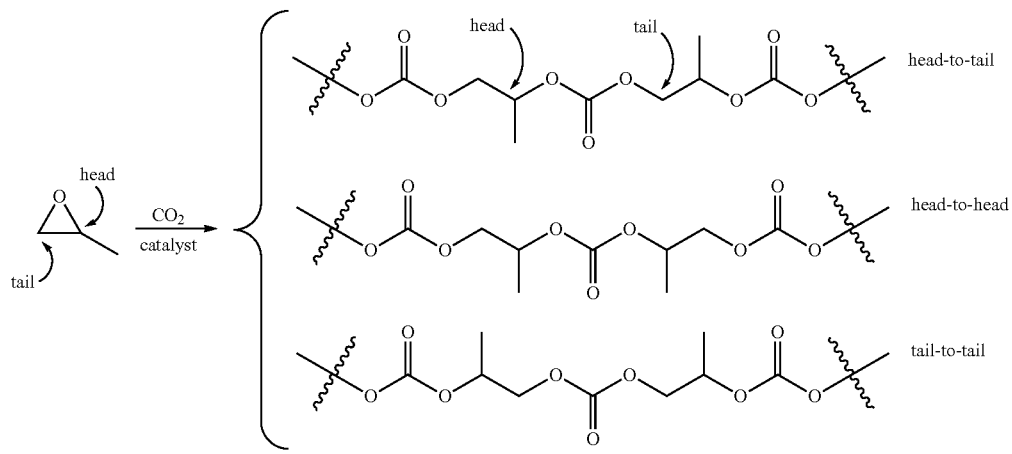

The term "head-to-tail ratio" or (H:T) refers to the proportion of head-to-tail linkages to the sum of all other regiochemical possibilities. With respect to the depiction of polymer structures, while a specific regiochemical orientation of monomer units may be shown in the representations of polymer structures herein, this is not intended to limit the polymer structures to the regiochemical arrangement shown but is to be interpreted to encompass all regiochemical arrangements including that depicted, the opposite regiochemistry, random mixtures, isotactic materials, syndiotactic materials, racemic materials, and/or enantioenriched materials and combinations of any of these unless otherwise specified.

As used herein the term "alkoxylated" means that one or more functional groups on a molecule (usually the functional group is an alcohol, amine, or carboxylic acid, but is not strictly limited to these) has appended to it a hydroxy-terminated alkyl chain. Alkoxylated compounds may comprise a single alkyl group or they may be oligomeric according to methods well known in the art. Combining knowledge of the art, with the disclosure and teachings herein, the skilled artisan will readily apprehend variations, modifications and applications of the compositions, such variations are specifically encompassed herein. The following references contain information on the formulation, manufacture and uses of polyurethane foams and elastomers, the entire content of each of these references is incorporated herein by reference.

Vahid Sendijarevic, et al.; *Polymeric Foams And Foam Technology*, 2$^{nd}$ edition, Hanser Gardner Publications; 2004 (ISBN 978-1569903360)

David Eaves; *Handbook of Polymer Foams*, Smithers Rapra Press; 2004 (ISBN 978-1859573884)

Shau-Tarng Lee et al.; *Polymeric Foams: Science and Technology*, CRC Press 2006 (ISBN 978-0849330759)

Kaneyoshi Ashida; *Polyurethane and Related Foams: Chemistry and Technology*, CRC Press; 2006 (ISBN 978-1587161599)

*Handbook of Thermoplastic Elastomers*, William Andrew Publishers, 2007 (ISBN 978-0815515494)

*The Polyurethanes Book*, J. Wiley & Sons, 2003 (ISBN 978-0470850411)

In one aspect, the polyurethane compositions of the present invention are derived by combining two compositions: a first composition comprising one or more isocyanate compounds optionally containing diluents, solvents, coreactants and the like (typically denoted the A side mixture), and a second composition comprising one or more polyols optionally with additional reactants, solvents, catalysts, or additives (typically denoted the B side mixture). Before fully describing these compositions, the polyols and isocyanates from which they are formulated will be more fully described.

I. Aliphatic Polycarbonate Polyols

This section describes some of the aliphatic polycarbonate polyols that have utility in making compositions of the present invention. In certain embodiments, compositions of the present invention comprise aliphatic polycarbonate polyols derived from the copolymerization of one or more epoxides and carbon dioxide. Examples of suitable polyols, as well as methods of making them are disclosed in PCT publication WO2010/028362 the entirety of which is incorporated herein by reference.

It is advantageous for many of the embodiments described herein that the aliphatic polycarbonate polyols used have a high percentage of reactive end groups. Such reactive endgroups are typically hydroxyl groups, but other reactive functional groups may be present if the polyols are treated to modify the chemistry of the end groups. Such modified materials may terminate in amino groups, thiol groups, alkene groups, carboxylate groups, isocyanate groups and the like. For purposes of this invention, the term 'aliphatic polycarbonate polyol' typically refers to —OH terminated materials, but also includes these end-group modified compositions, unless otherwise specified.

In certain embodiments, at least 90% of the end groups of the polycarbonate polyol used are —OH groups. In certain embodiments, at least 95%, at least 96%, at least 97% or at least 98% of the end groups of the polycarbonate polyol used are —OH groups. In certain embodiments, more than 99%, more than 99.5%, more than 99.7%, or more than 99.8% of the end groups of the polycarbonate polyol used are —OH groups. In certain embodiments, more than 99.9% of the end groups of the polycarbonate polyol used are —OH groups.

Another way of expressing the —OH end-group content of a polyol composition is by reporting its OH# which is measured using methods well known in the art. In certain embodiments, the aliphatic polycarbonate polyols utilized in the present invention have an OH# greater than about 40. In certain embodiments, the aliphatic polycarbonate polyols have an OH# greater than about 50, greater than about 75, greater than about 100, or greater than about 120.

In certain embodiments, it is advantageous if the aliphatic polycarbonate polyol compositions have a substantial proportion of primary hydroxyl end groups. These are the norm for compositions comprising poly(ethylene carbonate), but for polyols derived copolymerization of substituted epoxides with $CO_2$, it is common for some or most of the chain ends to consist of secondary hydroxyl groups. In certain embodiments, such polyols are treated to increase the proportion of primary —OH end groups. This may be accomplished by reacting the secondary hydroxyl groups with reagents such as ethylene oxide, reactive lactones, and the like. In certain embodiments, the aliphatic polycarbonate polyols are treated with beta lactones, caprolactone and the like to introduce primary hydroxyl end groups.

In certain embodiments, aliphatic polycarbonate chains comprise a copolymer of carbon dioxide and one or more epoxides. In certain embodiments, aliphatic polycarbonate chains comprise a copolymer of carbon dioxide and ethylene oxide. In certain embodiments, aliphatic polycarbonate chains comprise a copolymer of carbon dioxide and propylene oxide. In certain embodiments, aliphatic polycarbonate chains comprise a copolymer of carbon dioxide and cyclohexene oxide. In certain embodiments, aliphatic polycarbonate chains comprise a copolymer of carbon dioxide and cyclopentene oxide. In certain embodiments, aliphatic polycarbonate chains comprise a copolymer of carbon dioxide and 3-vinyl cyclohexane oxide.

In certain embodiments, aliphatic polycarbonate chains comprise a terpolymer of carbon dioxide and ethylene oxide along with one or more additional epoxides selected from the group consisting of propylene oxide, 1,2-butene oxide, 2,3-butene oxide, cyclohexene oxide, 3-vinyl cyclohexene oxide, epichlorohydrin, glicydyl esters, glycidyl ethers, styrene oxides, and epoxides of higher alpha olefins. In certain embodiments, such terpolymers contain a majority of repeat units derived from ethylene oxide with lesser amounts of repeat units derived from one or more additional epoxides. In certain embodiments, terpolymers contain about 50% to about 99.5% ethylene oxide-derived repeat units. In certain embodiments, terpolymers contain greater than about 60% ethylene oxide-derived repeat units. In certain embodiments, terpolymers contain greater than 75% ethylene oxide-derived repeat units. In certain embodiments, terpolymers contain greater than 80% ethylene oxide-derived repeat units. In certain embodiments, terpolymers contain greater than 85% ethylene oxide-derived repeat units. In certain embodiments, terpolymers contain greater than 90% ethylene oxide-derived repeat units. In certain embodiments, terpolymers contain greater than 95% ethylene oxide-derived repeat units.

In some embodiments, aliphatic polycarbonate chains comprise a copolymer of carbon dioxide and propylene oxide along with one or more additional epoxides selected from the group consisting of ethylene oxide, 1,2-butene oxide, 2,3-butene oxide, cyclohexene oxide, 3-vinyl cyclohexene oxide, epichlorohydrin, glicydyl esters, glycidyl ethers, styrene oxides, and epoxides of higher alpha olefins. In certain embodiments, such terpolymers contain a majority of repeat units derived from propylene oxide with lesser amounts of repeat units derived from one or more additional epoxides. In certain embodiments, terpolymers contain about 50% to about 99.5% propylene oxide-derived repeat units. In certain embodiments, terpolymers contain greater than 60% propylene oxide-derived repeat units. In certain embodiments, terpolymers contain greater than 75% propylene oxide-derived repeat units. In certain embodiments, terpolymers contain greater than 80% propylene oxide-derived repeat units. In certain embodiments, terpolymers contain greater than 85% propylene oxide-derived repeat units. In certain embodiments, terpolymers contain greater than 90% propylene oxide-derived repeat units. In certain embodiments, terpolymers contain greater than 95% propylene oxide-derived repeat units.

In certain embodiments, in the polymer compositions described hereinabove, aliphatic polycarbonate chains have a number average molecular weight ($M_n$) in the range of 500 g/mol to about 250,000 g/mol.

In certain embodiments, aliphatic polycarbonate chains have an $M_n$ less than about 100,000 g/mol. In certain embodiments, aliphatic polycarbonate chains have an $M_n$ less than about 70,000 g/mol. In certain embodiments, aliphatic polycarbonate chains have an $M_n$ less than about 50,000 g/mol. In certain embodiments, aliphatic polycarbonate chains have an $M_n$ between about 500 g/mol and about 40,000 g/mol. In certain embodiments, aliphatic polycarbonate chains have an $M_n$ less than about 25,000 g/mol. In certain embodiments, aliphatic polycarbonate chains have an $M_n$ between about 500 g/mol and about 20,000 g/mol. In certain embodiments, aliphatic polycarbonate chains have an $M_n$ between about 500 g/mol and about 10,000 g/mol. In certain embodiments, aliphatic polycarbonate chains have an $M_n$ between about 500 g/mol and about 5,000 g/mol. In certain embodiments, aliphatic polycarbonate chains have an $M_n$ between about 1,000 g/mol and about 5,000 g/mol. In certain embodiments, aliphatic polycarbonate chains have an $M_n$ between about 5,000 g/mol and about 10,000 g/mol. In certain embodiments, aliphatic polycarbonate chains have an $M_n$ between about 500 g/mol and about 1,000 g/mol. In certain embodiments, aliphatic polycarbonate chains have an $M_n$ between about 1,000 g/mol and about 3,000 g/mol. In certain embodiments, aliphatic polycarbonate chains have an $M_n$ of about 5,000 g/mol. In certain embodiments, aliphatic polycarbonate chains have an $M_n$ of about 4,000 g/mol. In certain embodiments, aliphatic polycarbonate chains have an $M_n$ of about 3,000 g/mol. In certain embodiments, aliphatic polycarbonate chains have an $M_n$ of about 2,500 g/mol. In certain embodiments, aliphatic polycarbonate chains have an $M_n$ of about 2,000 g/mol. In certain embodiments, aliphatic polycarbonate chains have an $M_n$ of about 1,500 g/mol. In certain embodiments, aliphatic polycarbonate chains have an $M_n$ of about 1,000 g/mol.

In certain embodiments, the aliphatic polycarbonate polyols used are characterized in that they have a narrow molecular weight distribution. This can be indicated by the polydispersity indices (PDI) of the aliphatic polycarbonate polymers. In certain embodiments, aliphatic polycarbonate compositions have a PDI less than 2. In certain embodiments, aliphatic polycarbonate compositions have a PDI less than 1.8. In certain embodiments, aliphatic polycarbonate compositions have a PDI less than 1.5. In certain embodiments, aliphatic polycarbonate compositions have a PDI less than 1.4. In certain embodiments, aliphatic polycarbonate compositions have a PDI between about 1.0 and 1.2. In certain embodiments, aliphatic polycarbonate compositions have a PDI between about 1.0 and 1.1.

In certain embodiments aliphatic polycarbonate compositions of the present invention comprise substantially alternating polymers containing a high percentage of carbonate linkages and a low content of ether linkages. In certain embodiments, aliphatic polycarbonate compositions of the present invention are characterized in that, on average in the composition, the percentage of carbonate linkages is 85% or greater. In certain embodiments, aliphatic polycarbonate compositions of the present invention are characterized in that, on average in the composition, the percentage of carbonate linkages is 90% or greater. In certain embodiments, aliphatic polycarbonate compositions of the present invention are characterized in that, on average in the composition, the percentage of carbonate linkages is 91% or greater. In certain embodiments, aliphatic polycarbonate compositions of the present invention are characterized in that, on average in the composition, the percentage of carbonate linkages is 92% or greater. In certain embodiments, aliphatic polycarbonate compositions of the present invention are characterized in that, on average in the composition, the percentage of carbonate linkages is 93% or greater. In certain embodiments, aliphatic polycarbonate compositions of the present invention are characterized in that, on average in the composition, the percentage of carbonate linkages is 94% or greater. In certain embodiments, aliphatic polycarbonate compositions of the present invention are characterized in that, on average in the composition, the percentage of carbonate linkages is 95% or greater. In certain embodiments, aliphatic polycarbonate compositions of the present invention are characterized in that, on average in the composition, the percentage of carbonate linkages is 96% or greater. In certain embodiments, aliphatic polycarbonate compositions of the present invention are characterized in that, on average in the composition, the percentage of carbonate linkages is 97% or greater. In certain embodiments, aliphatic polycarbonate compositions of the present invention are characterized in that, on average in the composition, the percentage of carbonate linkages is 98% or greater. In certain embodiments, aliphatic polycarbonate compositions of the present invention are characterized in that, on average in the composition, the percentage of carbonate linkages is 99% or greater. In certain embodiments, aliphatic polycarbonate compositions of the present invention are characterized in that, on average in the composition, the percentage of carbonate linkages is 99.5% or greater. In certain embodiments, the percentages above exclude ether linkages present in polymerization initiators or chain transfer agents and refer only to the linkages formed during epoxide $CO_2$ copolymerization.

In certain embodiments, aliphatic polycarbonate compositions of the present invention are characterized in that they contain essentially no ether linkages either within the polymer chains derived from epoxide $CO_2$ copolymerization or within any polymerization intiators, chain transfer agents or end groups that may be present in the polymer. In certain embodiments, aliphatic polycarbonate compositions of the present invention are characterized in that they contain, on average, less than one ether linkage per polymer chain within the composition. In certain embodiments, aliphatic polycarbonate compositions of the present invention are characterized in that they contain essentially no ether linkages.

In certain embodiments where an aliphatic polycarbonate is derived from mono-substituted epoxides (e.g. such as propylene oxide, 1,2-butylene oxide, epichlorohydrin, epoxidized alpha olefins, or a glycidol derivative), the aliphatic polycarbonate is characterized in that it is regioregular. Regioregularity may be expressed as the percentage of adjacent monomer units that are oriented in a head-to-tail arrangement within the polymer chain. In certain embodiments, aliphatic polycarbonate chains in the inventive polymer compositions have a head-to-tail content higher than about 80%. In certain embodiments, the head-to-tail content is higher than about 85%. In certain embodiments, the head-to-tail content is higher than about 90%. In certain embodiments, the head-to-tail content is greater than about 91%, greater than about 92%, greater than about 93%, greater than about 94%, or greater than about 95%. In certain embodiments, the head-to-tail content of the polymer is as determined by proton or carbon-13 NMR spectroscopy.

In certain embodiments, aliphatic polycarbonate polyols useful for the present invention have a viscosity controlled to be within a particular range. The preferred range may depend upon a particular application and may be controlled to be within the normal range for a particular application.

In certain embodiments, where the aliphatic polycarbonate polyol is used in the formulation of a rigid foam or a thermoplastic composition, the polyol has a viscosity, as measured at a temperature of at least 20° C. but less than 70° C., of less than about 30,000 cps. In certain embodiments, such polyols have a viscosity less than about 20,000 cps, less than about 15,000 cps, less than about 12,000 cps, or less than about 10,000 cps. In certain embodiments, such polyols have a viscosity between about 600 and about 30,000 cps. In certain embodiments, such polyols have a viscosity between about 2,000 and about 20,000 cps. In certain embodiments, such polyols have a viscosity between about 5,000 and about 15,000 cps.

In other embodiments, where the aliphatic polycarbonate polyol is used in the formulation of a flexible foam, the polyol has a viscosity, as measured at a temperature of at least 20° C. but less than 70° C., of less than about 10,000 cps. In certain embodiments, such polyols have a viscosity less than about 8,000 cps, less than about 6,000 cps, less than about 3,000 cps, or less than about 2,000 cps. In certain embodiments, such polyols have a viscosity between about 1,000 and about 10,000 cps. In certain embodiments, such polyols have a viscosity between about 1,000 and about 6,000 cps.

In certain embodiments, the polyol viscosity values described above represent the viscosity as measured at 25° C. In certain embodiments, the viscosity values above represent the viscosity as measured at 30° C., 40° C., 50° C., 60° C. or 70° C.

In certain embodiments, aliphatic polycarbonate polyols useful for the present invention have a Tg within a particular range. The desired Tg will vary with the application and may be controlled to be within the known normal range for a particular application. In certain embodiments, where the polyol is used in the formulation of a flexible foam or a soft elastomer composition, the polyol has a Tg less than about 20° C. In certain embodiments, such polyols have Tg less than about 15° C., less than about 10° C., less than about 5° C., less than about 0° C., less than about –10° C., less than about –20° C., or less than about 40° C. In certain embodiments, such polyols have a Tg between about –30° C. and about –20° C. In certain embodiments, such polyols have a Tg between about –30° C. and about –20° C.

In certain embodiments, where the aliphatic polycarbonate polyol is used in the formulation of a rigid foam or a thermoplastic composition, the polyol has a Tg greater than about –30° C. In certain embodiments, such polyols have Tg greater than about –20° C., greater than about –10° C., greater than about 0° C., greater than about 10° C., greater than about 15° C., or greater than about 25° C. In certain embodiments, such polyols have a Tg between about –10° C. and about 30° C. In certain embodiments, such polyols have a Tg between about 0° C. and about 20° C.

In certain embodiments, compositions of the present invention comprise aliphatic polycarbonate polyols having a structure P1:

wherein, $R^1$, $R^2$, $R^3$, and $R^4$ are, at each occurrence in the polymer chain, independently selected from the group consisting of —H, fluorine, an optionally substituted $C_{1-30}$ aliphatic group, and an optionally substituted $C_{1-20}$ heteroaliphatic group, and an optionally substituted $C_{6-10}$ aryl group, where any two or more of $R^1$, $R^2$, $R^3$, and $R^4$ may optionally be taken together with intervening atoms to form one or more optionally substituted rings optionally containing one or more heteroatoms;

Y is, at each occurrence, independently —H or the site of attachment to any of the chain-extending moieties described in the classes and subclasses herein;

n is at each occurrence, independently an integer from about 3 to about 1,000;

is a multivalent moiety; and x and y are each independently an integer from 0 to 6, where the sum of x and y is between 2 and 6.

In certain embodiments, the multivalent moiety

embedded within the aliphatic polycarbonate chain is derived from a polyfunctional chain transfer agent having two or more sites from which epoxide/$CO_2$ copolymerization can occur. In certain embodiments, such copolymerizations are performed in the presence of polyfunctional chain transfer agents as exemplified in published PCT application PCT/US2009/056220 (WO/2010/028362).

In certain embodiments, a polyfunctional chain transfer agent has a formula:

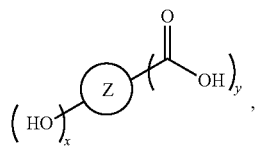

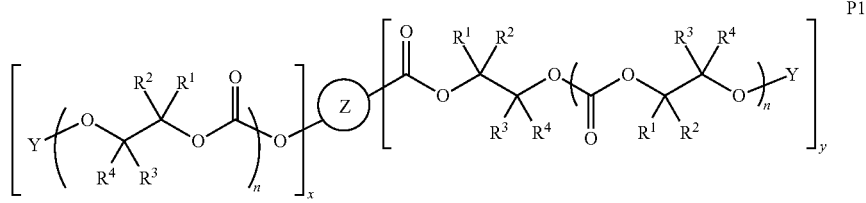

wherein each of

, x, and y is as defined above and described in classes and subclasses herein.

In certain embodiments, aliphatic polycarbonate chains in the inventive polymer compositions are derived from the copolymerization of one or more epoxides with carbon dioxide in the presence of such polyfunctional chain transfer agents as shown in Scheme 2:

Scheme 2

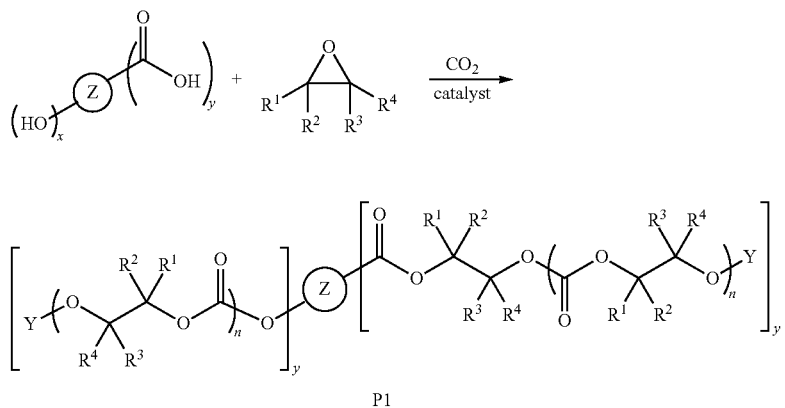

In certain embodiments, aliphatic polycarbonate chains in polymer compositions of the present invention comprise chains with a structure P2:

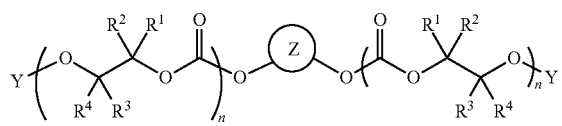

wherein each of $R^1$, $R^2$, $R^3$, $R^4$, Y,

and n is as defined above and described in the classes and subclasses herein.

In certain embodiments where aliphatic polycarbonate chains have a structure P2,

K is derived from a dihydric alcohol. In such instances

represents the carbon-containing backbone of the dihydric alcohol, while the two oxygen atoms adjacent to

are derived from the —OH groups of the diol. For example, if the polyfunctional chain transfer agent were ethylene glycol, then

would be —$CH_2CH_2$— and P2 would have the following structure:

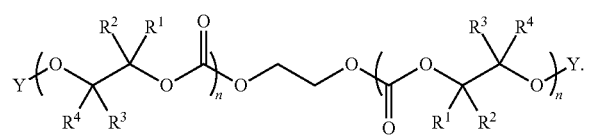

In certain embodiments, where

is derived from a dihydric alcohol, the dihydric alcohol comprises a $C_{2-40}$ diol. In certain embodiments, the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 2-methyl-2,4-pentane diol, 2-ethyl-1,3-hexane diol, 2-methyl-1,3-propane diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, isosorbide, glycerol monoesters, glycerol monoethers, trimethylolpropane monoesters, trimethylolpropane monoethers, pentaerythritol diesters, pentaerythritol diethers, and alkoxylated derivatives of any of these.

In certain embodiments, where

is derived from a dihydric alcohol, the dihydric alcohol is selected from the group consisting of: diethylene glycol, triethylene glycol, tetraethylene glycol, higher poly(ethylene glycol), such as those having number average molecular weights of from 220 to about 2000 g/mol, dipropylene glycol, tripropylene glycol, and higher poly(propylene glycols) such as those having number average molecular weights of from 234 to about 2000 g/mol.

In certain embodiments, where

is derived from a dihydric alcohol, the dihydric alcohol comprises an alkoxylated derivative of a compound selected from the group consisting of: a diacid, a diol, or a hydroxy acid. In certain embodiments, the alkoxylated derivatives comprise ethoxylated or propoxylated compounds.

In certain embodiments, where is derived from a dihydric alcohol, the dihydric alcohol comprises a polymeric diol. In certain embodiments, a polymeric diol is selected from the group consisting of: polyethers, polyesters, hydroxy-terminated polyolefins, polyether-copolyesters, polyether polycarbonates, polycarbonate-copolyesters, polyoxymethylene polymers, and alkoxylated analogs of any of these. In certain embodiments, the polymeric diol has an average molecular weight less than about 2000 g/mol.

In certain embodiments,

is derived from a polyhydric alcohol with more than two hydroxy groups. In certain embodiments, the aliphatic polycarbonate chains in polymer compositions of the present invention comprise aliphatic polycarbonate chains where the moiety

is derived from a triol. In certain embodiments, such aliphatic polycarbonate chains have the structure P3:

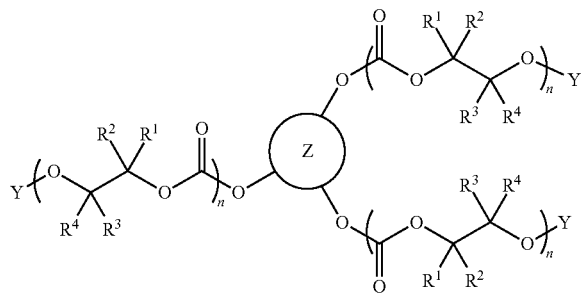

P3 wherein each of $R^1$, $R^2$, $R^3$, $R^4$, Y,

and n is as defined above and described in classes and subclasses herein.

In certain embodiments where is derived from a triol, the triol is selected from the group consisting of: glycerol, 1,2,4-butanetriol, 2-(hydroxymethyl)-1,3-propanediol; hexane triols, trimethylol propane, trimethylol ethane, trimethylolhexane, 1,4-cyclohexanetrimethanol, pentaerythritol mono esters, pentaerythritol mono ethers, and alkoxylated analogs of any of these. In certain embodiments, alkoxylated derivatives comprise ethoxylated or propoxylated compounds.

In certain embodiments,

is derived from an alkoxylated derivative of a trifunctional carboxylic acid or trifunctional hydroxy acid. In certain embodiments, alkoxylated derivatives comprise ethoxylated or propoxylated compounds.

In certain embodiments, where

is derived from a polymeric triol, the polymeric triol is selected from the group consisting of polyethers, polyesters, hydroxy-terminated polyolefins, polyether-copolyesters, polyether polycarbonates, polyoxymethylene polymers, polycarbonate-copolyesters, and alkoxylated analogs of any of these. In certain embodiments, the alkoxylated polymeric triols comprise ethoxylated or propoxylated compounds.

In certain embodiments,

is derived from a polyhydric alcohol with four hydroxy groups. In certain embodiments, aliphatic polycarbonate chains in polymer compositions of the present invention comprise aliphatic polycarbonate chains where the moiety

is derived from a tetraol. In certain embodiments, aliphatic polycarbonate chains in polymer compositions of the present invention comprise chains with the structure P4:

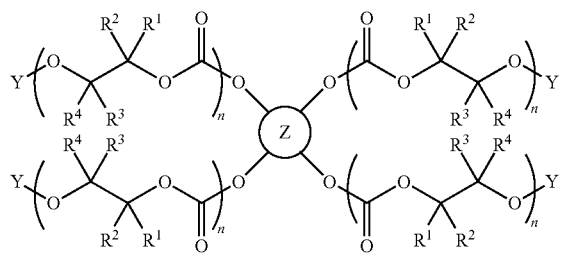

P4 wherein each of $R^1$, $R^2$, $R^3$, $R^4$, Y,

and n is as defined above and described in classes and subclasses herein.

In certain embodiments,

is derived from a polyhydric alcohol with more than four hydroxy groups. In certain embodiments,

is derived from a polyhydric alcohol with six hydroxy groups. In certain embodiments, a polyhydric alcohol is dipentaerithrotol or an alkoxylated analog thereof. In certain embodiments, a polyhydric alcohol is sorbitol or an alkoxylated analog thereof. In certain embodiments, aliphatic polycarbonate chains in polymer compositions of the present invention comprise chains with the structure P5:

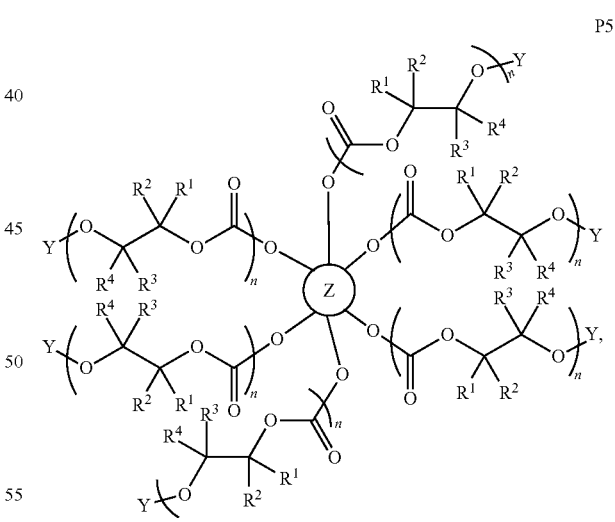

P5 wherein each of $R^1$, $R^2$, $R^3$, $R^4$, Y,

and n is as defined above and described in classes and subclasses herein.

In certain embodiments, aliphatic polycarbonates of the present invention comprise a combination of bifunctional chains (e.g. polycarbonates of formula P2) in combination with higher functional chains (e.g. one or more polycarbonates of formulae P3 to P5).

In certain embodiments,

is derived from a hydroxy acid. In certain embodiments, aliphatic polycarbonate chains in polymer compositions of the present invention comprise chains with the structure P6:

P6

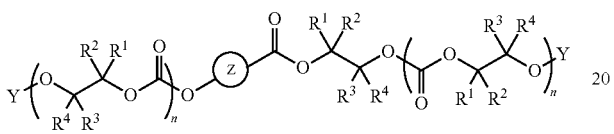

wherein each of $R^1$, $R^2$, $R^3$, $R^4$, Y,

and n is as defined above and described in classes and subclasses herein. In such instances,

represents the carbon-containing backbone of the hydroxy acid, while ester and carbonate linkages adjacent to

are derived from the —CO$_2$H group and the hydroxy group of the hydroxy acid. For example, if

were derived from 3-hydroxy propanoic acid, then

would be —CH$_2$CH$_2$— and P6 would have the following structure:

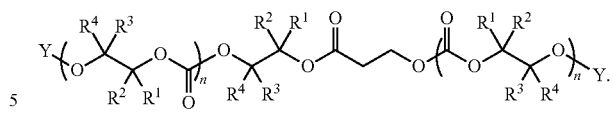

In certain embodiments,

is derived from an optionally substituted $C_{2-4}$ hydroxy acid. In certain embodiments,

is derived from a polyester. In certain embodiments, such polyesters have a molecular weight less than about 2000 g/mol.

In certain embodiments, a hydroxy acid is an alpha-hydroxy acid. In certain embodiments, a hydroxy acid is selected from the group consisting of: glycolic acid, DL-lactic acid, D-lactic acid, L-lactic, citric acid, and mandelic acid.

In certain embodiments, a hydroxy acid is a beta-hydroxy acid. In certain embodiments, a hydroxy acid is selected from the group consisting of: 3-hydroxypropionic acid, DL 3-hydroxybutryic acid, D-3 hydroxybutryic acid, L-3-hydroxybutyric acid, DL-3-hydroxy valeric acid, D-3-hydroxy valeric acid, L-3-hydroxy valeric acid, salicylic acid, and derivatives of salicylic acid.

In certain embodiments, a hydroxy acid is a α-ω hydroxy acid. In certain embodiments, a hydroxy acid is selected from the group consisting of: of optionally substituted $C_{3-20}$ aliphatic α-ω hydroxy acids and oligomeric esters.

In certain embodiments, a hydroxy acid is selected from the group consisting of:

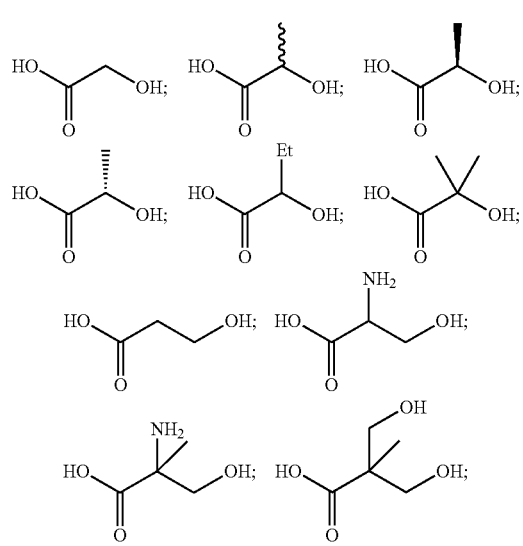

-continued

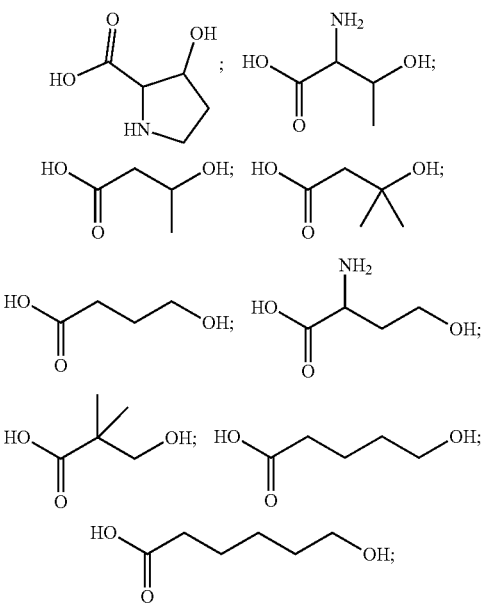

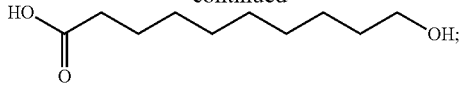

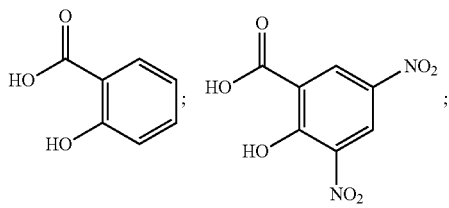

-continued

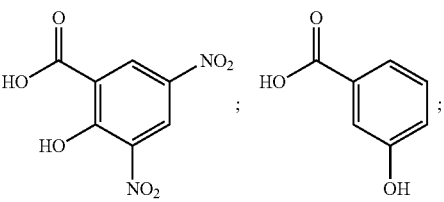

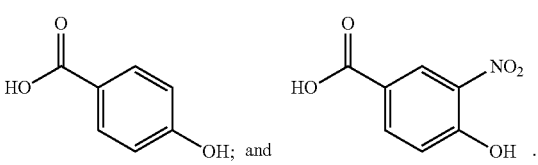

In certain embodiments, (Z)

is derived from a polycarboxylic acid. In certain embodiments, aliphatic polycarbonate chains in polymer compositions of the present invention comprise chains with the structure P7:

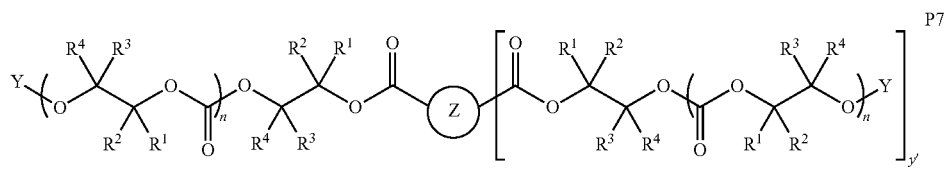

wherein each of $R^1$, $R^2$, $R^3$, $R^4$, Y, (Z)

and n is as defined above and described in classes and subclasses herein, and y' is an integer from 1 to 5 inclusive.

In embodiments where the aliphatic polycarbonate chains have a structure P7, (Z)

represents the carbon-containing backbone (or a bond in the case of oxalic acid) of a polycarboxylic acid, while ester groups adjacent to

are derived from —CO₂H groups of the polycarboxylic acid. For example, if

were derived from succinic acid (HO₂CCH₂CH₂CO₂H), then

would be —CH₂CH₂— and P7 would have the following structure:

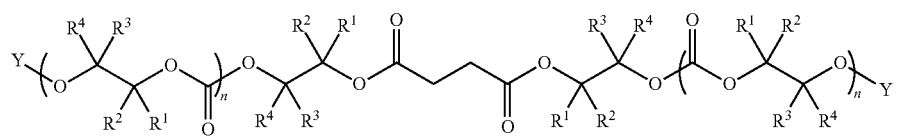

wherein each of $R^1$, $R^2$, $R^3$, $R^4$, Y, and n is as defined above and described in classes and subclasses herein.

In certain embodiments,

is derived from a dicarboxylic acid. In certain embodiments, aliphatic polycarbonate chains in polymer compositions of the present invention comprise chains with the structure P8:

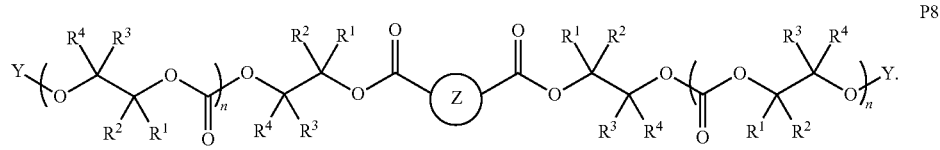

In certain embodiments,

is selected from the group consisting of: phthalic acid, isophthalic acid, terephthalic acid, maleic acid, succinic acid, malonic acid, glutaric acid, adipic acid, pimelic acid, suberic acid, and azelaic acid.

In certain embodiments,

is selected from the group consisting of:

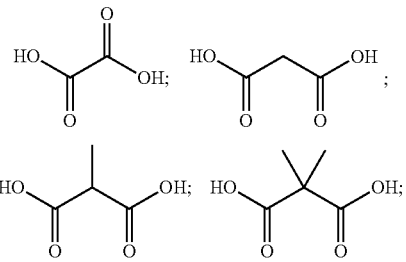

-continued

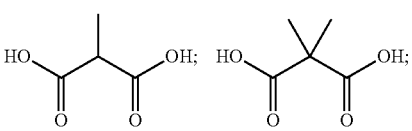

-continued

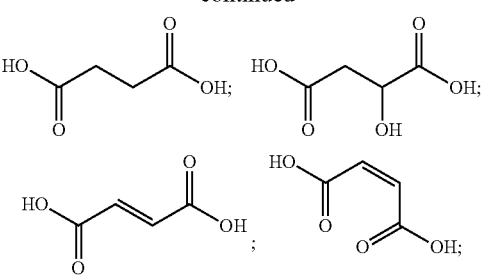

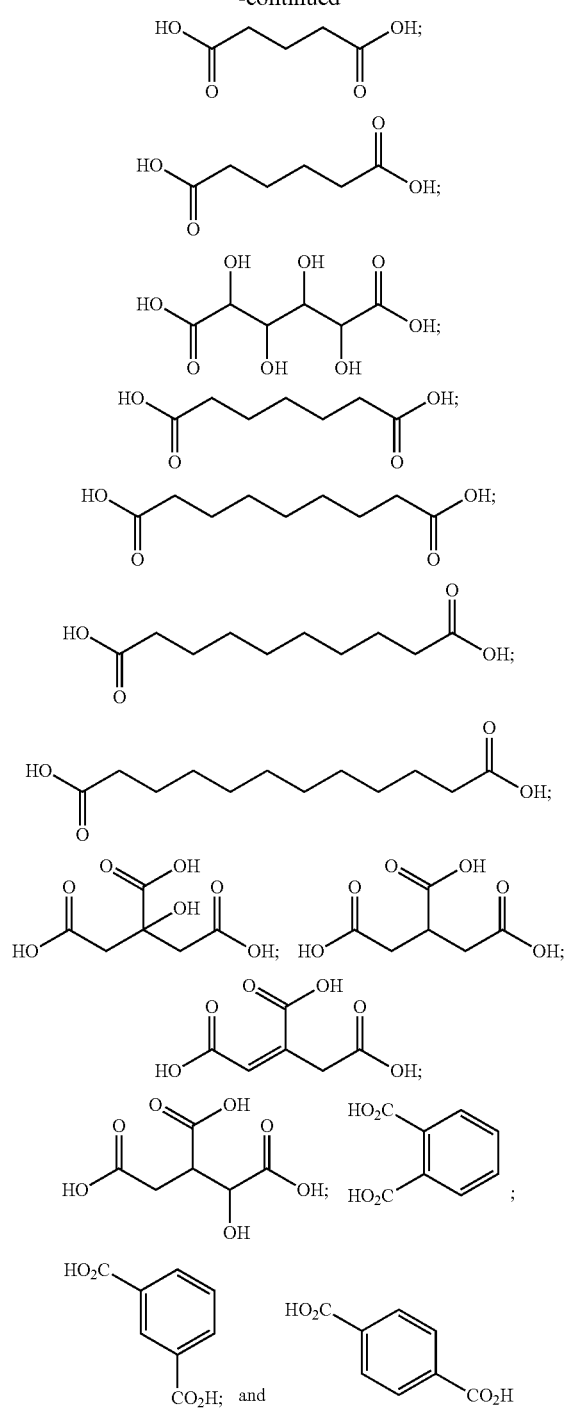
In certain embodiments, each
in the structures herein is independently selected from the group consisting of:

-continued

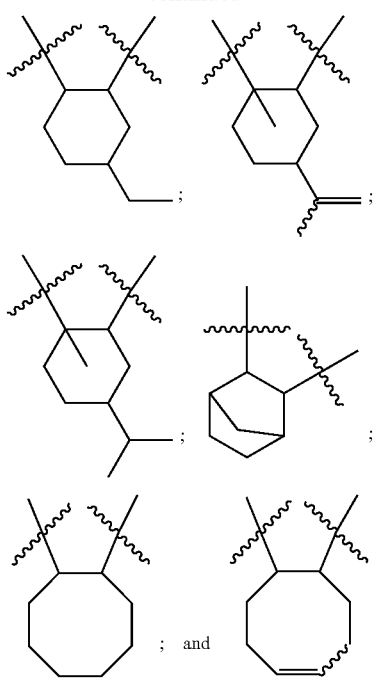

wherein each R$^x$ is independently an optionally substituted group selected from the group consisting of C$_{2-20}$ aliphatic, C$_{2-20}$ heteroaliphatic, 3- to 14-membered carbocyclic, 6- to 10-membered aryl, 5- to 10-membered heteroaryl, and 3- to 12-membered heterocyclic.

In certain embodiments, each

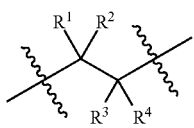

in the structures herein is independently selected from the group consisting of:

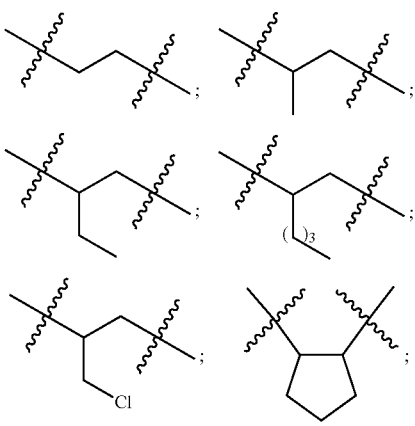

-continued

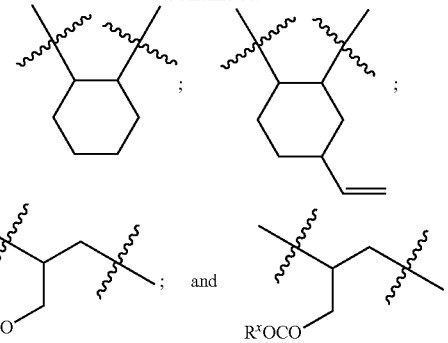

wherein R$^x$ is as defined above and described in classes and subclasses herein.

In certain embodiments, aliphatic polycarbonate chains comprise:

P2a

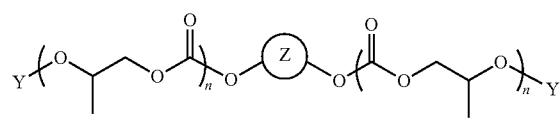

wherein each of

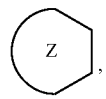

—Y, and n is as defined above and described in classes and subclasses herein.

In certain embodiments, aliphatic polycarbonate chains comprise

P2b

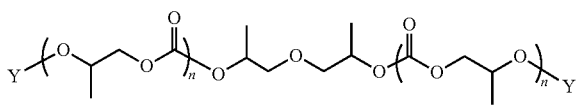

wherein each of —Y and n is as defined above and described in classes and subclasses herein.

In certain embodiments, aliphatic polycarbonate chains comprise

P2b'

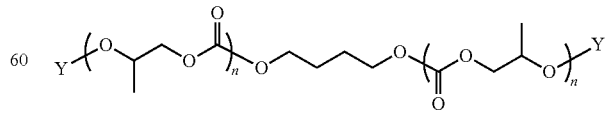

wherein each of —Y and n is as defined above and described in classes and subclasses herein.

In certain embodiments, aliphatic polycarbonate chains comprise

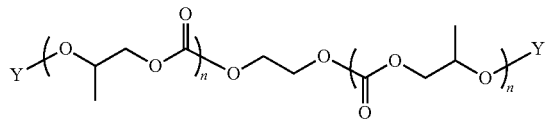
P2b″ wherein each of —Y and n is as defined above and described in classes and subclasses herein.

In certain embodiments, aliphatic polycarbonate chains comprise

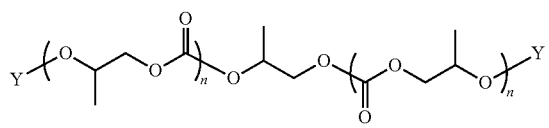
P2b‴ wherein each of —Y and n is as defined above and described in classes and subclasses herein.

In certain embodiments, aliphatic polycarbonate chains comprise

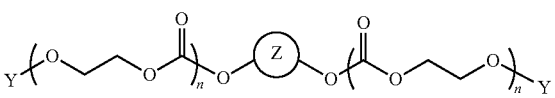
P2c wherein each of

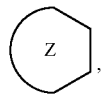

—Y, and n is as defined above and described in classes and subclasses herein.

In certain embodiments, aliphatic polycarbonate chains comprise

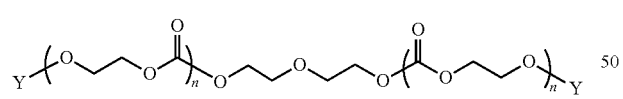
P2c′ wherein each of —Y and n is as defined above and described in classes and subclasses herein.

In certain embodiments, aliphatic polycarbonate chains comprise

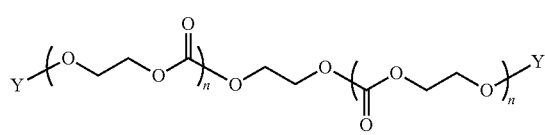
P2c″ wherein each of —Y and n is as defined above and described in classes and subclasses herein.

In certain embodiments, aliphatic polycarbonate chains comprise

P2c‴ wherein each of —Y and n is as defined above and described in classes and subclasses herein.

In certain embodiments, aliphatic polycarbonate chains comprise

P2d wherein each of

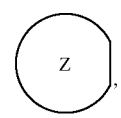

—Y and n is as defined above and described in classes and subclasses herein.

In certain embodiments, aliphatic polycarbonate chains comprise

P2e

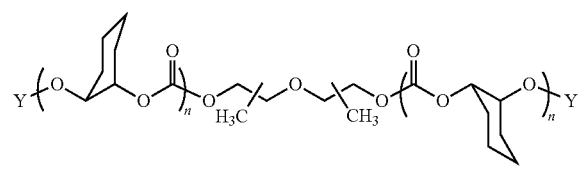

wherein each of —Y and n are is as defined above and described in classes and subclasses herein.

In certain embodiments, aliphatic polycarbonate chains comprise

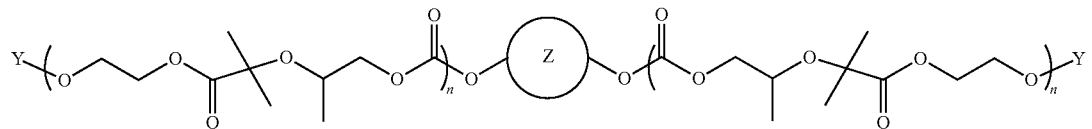

wherein each of

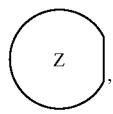

—Y, and n is as defined above and described in classes and subclasses herein.

In certain embodiments, aliphatic polycarbonate chains comprise

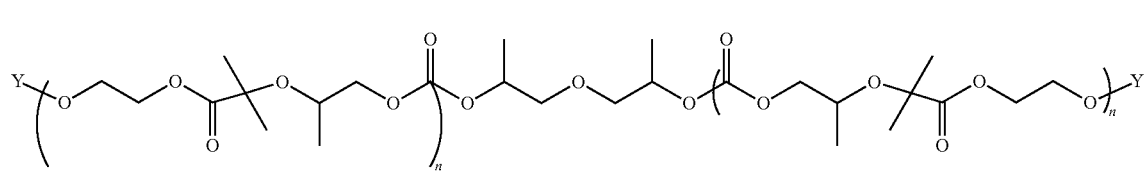

wherein each of —Y and n is as defined above and described in classes and subclasses herein.

In certain embodiments, aliphatic polycarbonate chains comprise

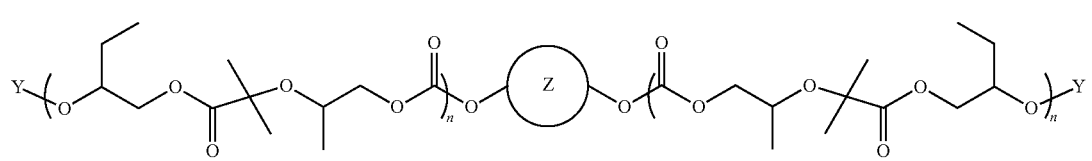

wherein each of

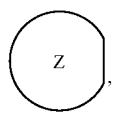

—Y, and n is as defined above and described in classes and subclasses herein.

In certain embodiments, aliphatic polycarbonate chains comprise

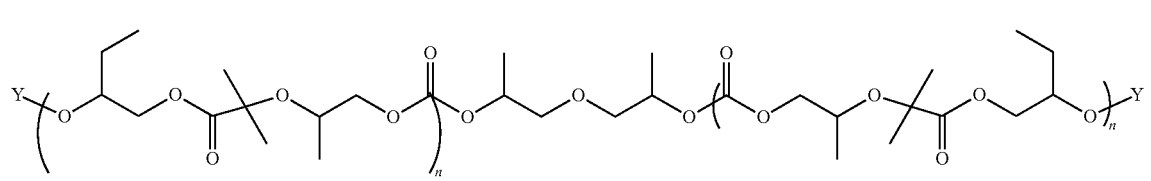

wherein each of —Y and n is as defined above and described in classes and subclasses herein.

In certain embodiments, aliphatic polycarbonate chains comprise

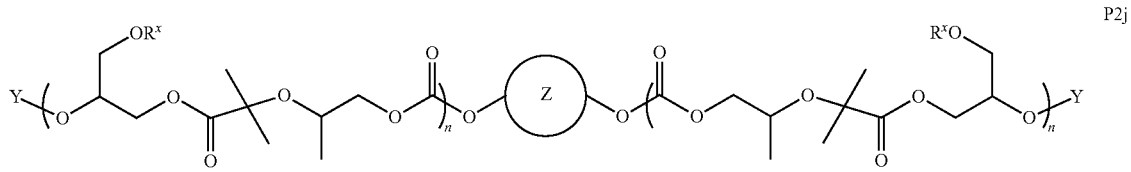

wherein each of

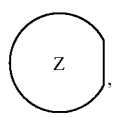

—Y, R$^x$, and n is as defined above and described in classes and subclasses herein.

In certain embodiments, aliphatic polycarbonate chains comprise

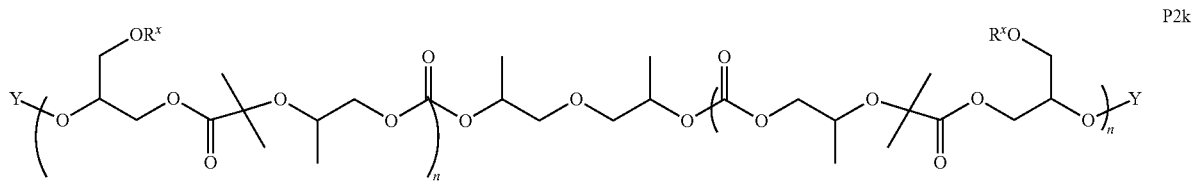

wherein each of —Y, R$^x$, and n is as defined above and described in classes and subclasses herein.

In certain embodiments, aliphatic polycarbonate chains comprise

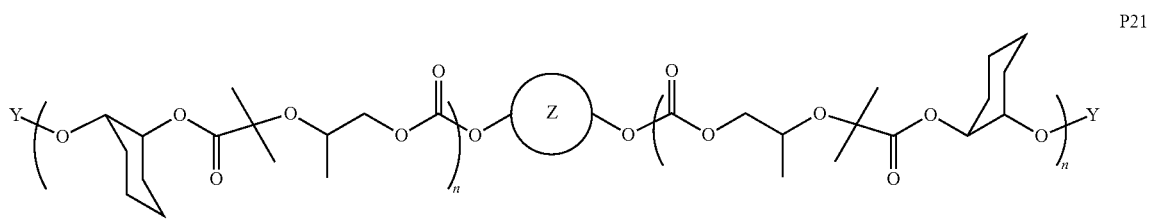

wherein each of

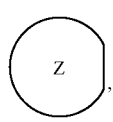

—Y, and n is as defined above and described in classes and subclasses herein.

In certain embodiments, aliphatic polycarbonate chains comprise

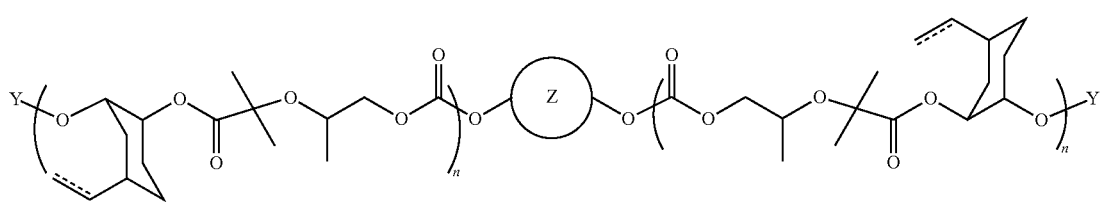

wherein each of

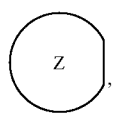

—Y, and n are is as defined above and described in classes and subclasses herein; and each ==== independently represents a single or double bond.

In certain embodiments, aliphatic polycarbonate chains comprise wherein each of

$R^x$, —Y and n is as defined above and described in classes and subclasses herein.

In certain embodiments, aliphatic polycarbonate chains comprise

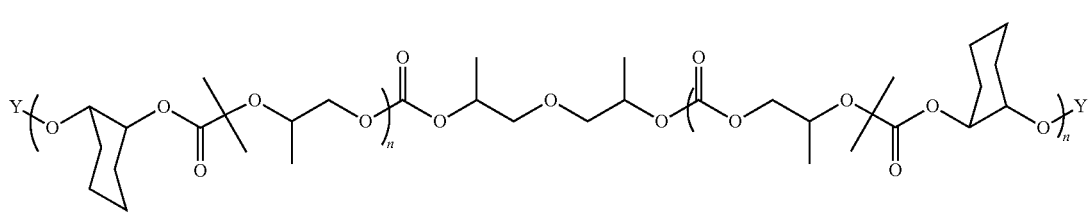

wherein each of —Y and n is as defined above and described in classes and subclasses herein.

In certain embodiments, aliphatic polycarbonate chains comprise

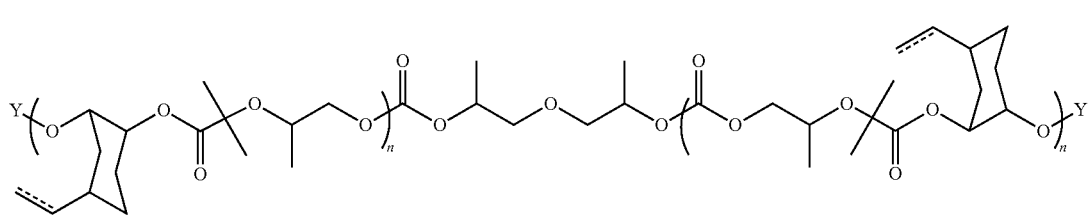

wherein each of —Y, ====, and n is as defined above and described in classes and subclasses herein.

In certain embodiments, aliphatic polycarbonate chains comprise

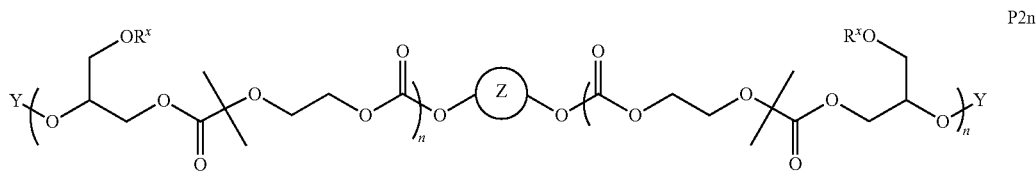

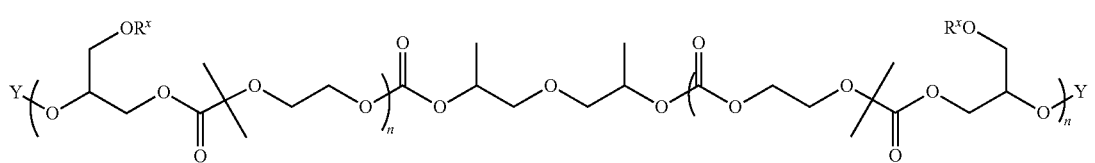

wherein each of —Y, $R^x$, and n is as defined above and described in classes and subclasses herein.

In certain embodiments, aliphatic polycarbonate chains comprise

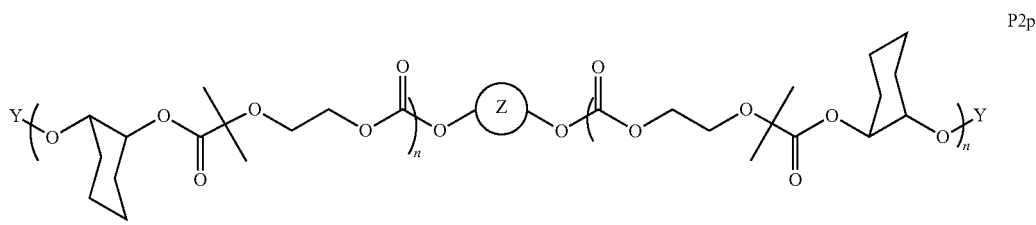

wherein each of

—Y, and n is as defined above and described in classes and subclasses herein.

In certain embodiments, aliphatic polycarbonate chains comprise

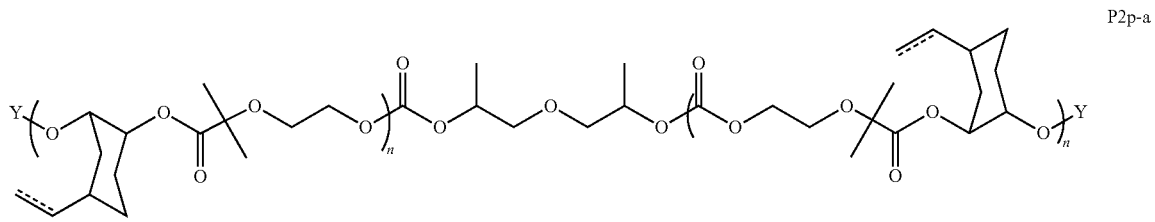

wherein each of —Y , and n is as defined above and described in classes and subclasses herein.

In certain embodiments, aliphatic polycarbonate chains comprise

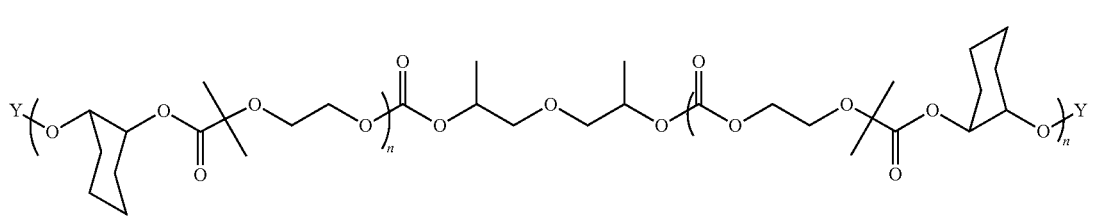

wherein each of —Y, and n is as defined above and described in classes and subclasses herein.

In certain embodiments, aliphatic polycarbonate chains comprise

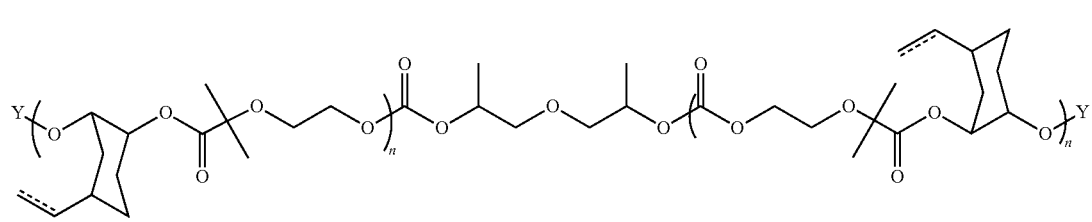

wherein each of —Y ====, and n is as defined above and described in classes and subclasses herein.

In certain embodiments, aliphatic polycarbonate chains comprise

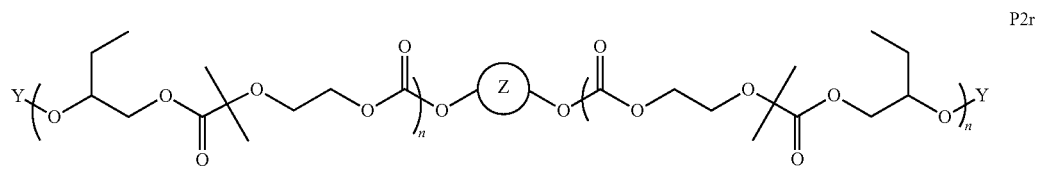

wherein each of

Y, and n is as defined above and described in classes and subclasses herein.

In certain embodiments, aliphatic polycarbonate chains comprise

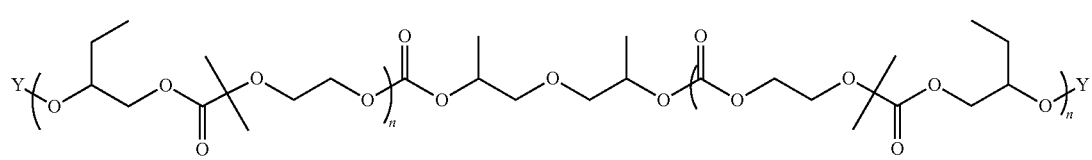

wherein each of —Y and n is as defined above and described in classes and subclasses herein.

In certain embodiments, in polycarbonates of structures P2a, P2c, P2d, P2f, P2h, P2j, P2l, P2l-a, P2n, P2p, and P2r,

is selected from the group consisting of: ethylene glycol; diethylene glycol, triethylene glycol, 1,3 propane diol; 1,4 butane diol, hexylene glycol, 1,6 hexane diol, propylene glycol, dipropylene glycol, tripopylene glycol, and alkoxylated derivatives of any of these.

For polycarbonates comprising repeat units derived from two or more epoxides, such as those represented by structures P2f through P2r, depicted above, it is to be understood that the structures drawn may represent mixtures of positional isomers or regioisomers that are not explicitly depicted. For example, the polymer repeat unit adjacent to either end group of the polycarbonate chains can be derived from either one of the two epoxides comprising the copolymers. Thus, while the polymers may be drawn with a particular repeat unit attached to an end group, the terminal repeat units might be derived from either of the two epoxides and a given polymer composition might comprise a mixture of all of the possibilities in varying ratios. The ratio of these end-groups can be influenced by several factors including the ratio of the differ rent epoxides used in the polymerization, the structure of the catalyst used, the reaction conditions used (i.e temperature pressure, etc.) as well as by the timing of addition of reaction components. Similarly, while the drawings above may show a defined regiochemistry for repeat units derived from substituted epoxides, the polymer compositions will, in some cases, contain mixtures of regioisomers. The regioselectivity of a given polymerization can be influenced by numerous factors including the structure of the catalyst used and the reaction conditions employed. To clarify, this means that the composition represented by structure P2r above, may contain a mixture of several compounds as shown in the diagram below. This diagram shows the isomers graphically for polymer P2r, where the structures below the depiction of the chain show each regio- and positional isomer possible for the monomer unit adjacent to the chain transfer agent and the end groups on each side of the main polymer chain. Each end group on the polymer may be independently selected from the groups shown on the left or right while the central portion of the polymer including the chain transfer agent and its two adjacent monomer units may be independently selected from the groups shown. In certain embodiments, the polymer composition comprises a mixture of all possible combinations of these. In other embodiments, the polymer composition is enriched in one or more of these.

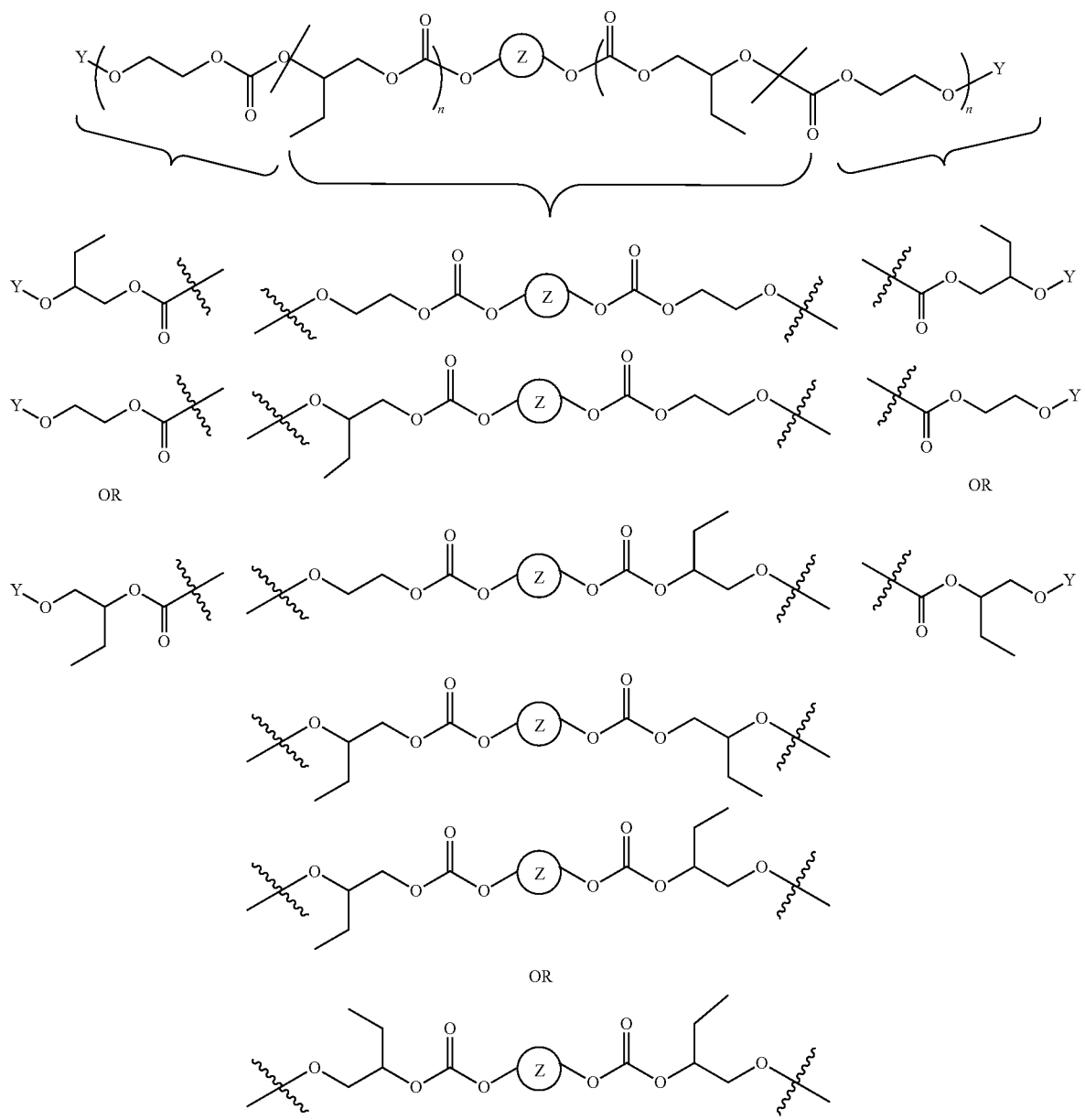
In certain embodiments, the aliphatic polycarbonate polyol is selected from the group consisting of Q1, Q2, Q3, Q4, Q5, Q6, and mixtures of any two or more of these.
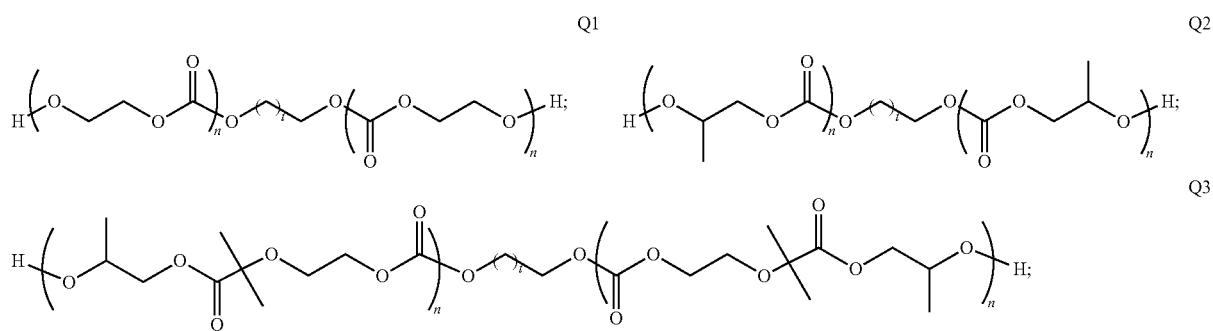

-continued

Q4
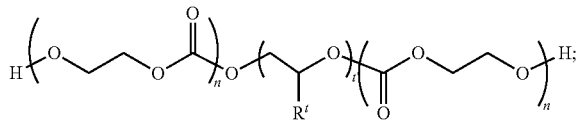

Q5
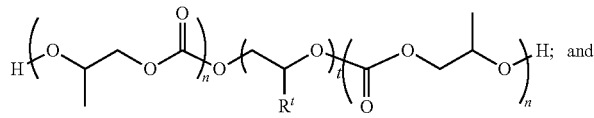 and

Q6
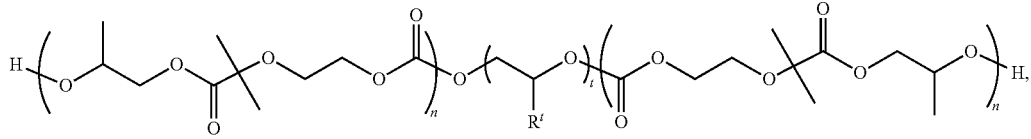

wherein, t is an integer from 1 to 12 inclusive, and $R^t$ is independently at each occurrence —H, or —CH$_3$.

In certain embodiments, the aliphatic polycarbonate polyol is selected from the group consisting of:

Poly(ethylene carbonate) of formula Q1 having an average molecular weight number of between about 500 g/mol and about 3,000 g/mol, a polydisperisty index less than about 1.25, at least 85% carbonate linkages, and at least 98% —OH end groups;

Poly(ethylene carbonate) of formula Q1 having an average molecular weight number of about 500 g/mol, a polydisperisty index less than about 1.25, at least 85% carbonate linkages, and at least 98% —OH end groups;

Poly(ethylene carbonate) of formula Q1 having an average molecular weight number of about 1,000 g/mol, a polydisperisty index less than about 1.25, at least 85% carbonate linkages, and at least 98% —OH end groups;

Poly(ethylene carbonate) of formula Q1 having an average molecular weight number of about 2,000 g/mol, a polydisperisty index less than about 1.25, at least 85% carbonate linkages, and at least 98% —OH end groups;

Poly(ethylene carbonate) of formula Q1 having an average molecular weight number of about 3,000 g/mol, a polydisperisty index less than about 1.25, at least 85% carbonate linkages, and at least 98% —OH end groups;

Poly(propylene carbonate) of formula Q2 having an average molecular weight number of between about 500 g/mol and about 3,000 g/mol, a polydisperisty index less than about 1.25, at least 95% carbonate linkages, and at least 98% —OH end groups;

Poly(propylene carbonate) of formula Q2 having an average molecular weight number of about 500 g/mol, a polydisperisty index less than about 1.25, at least 95% carbonate linkages, and at least 98% —OH end groups;

Poly(propylene carbonate) of formula Q2 having an average molecular weight number of about 1,000 g/mol, a polydisperisty index less than about 1.25, at least 95% carbonate linkages, and at least 98% —OH end groups;

Poly(propylene carbonate) of formula Q2 having an average molecular weight number of about 2,000 g/mol, a polydisperisty index less than about 1.25, at least 95% carbonate linkages, and at least 98% —OH end groups;

Poly(propylene carbonate) of formula Q2 having an average molecular weight number of about 3,000 g/mol, a polydisperisty index less than about 1.25, at least 95% carbonate linkages, and at least 98% —OH end groups;

Poly(ethylene-co-propylene carbonate) of formula Q3 having an average molecular weight number of between about 500 g/mol and about 3,000 g/mol, a polydisperisty index less than about 1.25, at least 90% carbonate linkages, and at least 98% —OH end groups;

Poly(ethylene-co-propylene carbonate) of formula Q3 having an average molecular weight number of about 500 g/mol, a polydisperisty index less than about 1.25, at least 90% carbonate linkages, and at least 98% —OH end groups;

Poly(ethylene-co-propylene carbonate) of formula Q3 having an average molecular weight number of about 1,000 g/mol, a polydisperisty index less than about 1.25, at least 90% carbonate linkages, and at least 98% —OH end groups;

Poly(ethylene-co-propylene carbonate) of formula Q3 having an average molecular weight number of about 2,000 g/mol (e.g. n is on average between about 10 and about 11), a polydisperisty index less than about 1.25, at least 90% carbonate linkages, and at least 98% —OH end groups;

Poly(ethylene-co-propylene carbonate) of formula Q3 having an average molecular weight number of about 3,000 g/mol, a polydisperisty index less than about 1.25, at least 95% carbonate linkages, and at least 98% —OH end groups;

Poly(ethylene carbonate) of formula Q4 having an average molecular weight number of between about 500 g/mol and about 3,000 g/mol (e.g. each n is between about 4 and about 16), a polydisperisty index less than about 1.25, at least 95% carbonate linkages, and at least 98% —OH end groups;

Poly(ethylene carbonate) of formula Q4 having an average molecular weight number of about 500 g/mol, a polydisperisty index less than about 1.25, at least 85% carbonate linkages, and at least 98% —OH end groups;

Poly(ethylene carbonate) of formula Q4 having an average molecular weight number of about 1,000 g/mol, a polydisperisty index less than about 1.25, at least 85% carbonate linkages, and at least 98% —OH end groups;

Poly(ethylene carbonate) of formula Q4 having an average molecular weight number of about 2,000 g/mol, a polydisperisty index less than about 1.25, at least 85% carbonate linkages, and at least 98% —OH end groups;

Poly(ethylene carbonate) of formula Q4 having an average molecular weight number of about 3,000 g/mol, a polydisperisty index less than about 1.25, at least 85% carbonate linkages, and at least 98% —OH end groups.

Poly(propylene carbonate) of formula Q5 having an average molecular weight number of between about 500 g/mol and about 3,000 g/mol, a polydisperisty index less than about 1.25, at least 95% carbonate linkages, and at least 98% —OH end groups;

Poly(propylene carbonate) of formula Q5 having an average molecular weight number of about 500 g/mol, a polydisperisty index less than about 1.25, at least 95% carbonate linkages, and at least 98% —OH end groups;

Poly(propylene carbonate) of formula Q5 having an average molecular weight number of about 1,000 g/mol, a polydisperisty index less than about 1.25, at least 95% carbonate linkages, and at least 98% —OH end groups;

Poly(propylene carbonate) of formula Q5 having an average molecular weight number of about 2,000 g/mol, a polydisperisty index less than about 1.25, at least 95% carbonate linkages, and at least 98% —OH end groups;

Poly(propylene carbonate) of formula Q5 having an average molecular weight number of about 3,000 g/mol, a polydisperisty index less than about 1.25, at least 95% carbonate linkages, and at least 98% —OH end groups;

Poly(ethylene-co-propylene carbonate) of formula Q6 having an average molecular weight number of between about 500 g/mol and about 3,000 g/mol, a polydisperisty index less than about 1.25, at least 90% carbonate linkages, and at least 98% —OH end groups;

Poly(ethylene-co-propylene carbonate) of formula Q6 having an average molecular weight number of about 500 g/mol, a polydisperisty index less than about 1.25, at least 90% carbonate linkages, and at least 98% —OH end groups;

Poly(ethylene-co-propylene carbonate) of formula Q6 having an average molecular weight number of about 1,000 g/mol, a polydisperisty index less than about 1.25, at least 90% carbonate linkages, and at least 98% —OH end groups;

Poly(ethylene-co-propylene carbonate) of formula Q6 having an average molecular weight number of about 2,000 g/mol (e.g. n is on average between about 10 and about 11), a polydisperisty index less than about 1.25, at least 90% carbonate linkages, and at least 98% —OH end groups; and Poly(ethylene-co-propylene carbonate) of formula Q6 having an average molecular weight number of about 3,000 g/mol, a polydisperisty index less than about 1.25, at least 95% carbonate linkages, and at least 98% —OH end groups.

In certain embodiments, the embedded chain transfer agent

is a moiety derived from a polymeric diol or higher polyhydric alcohol. In certain embodiments, such polymeric alcohols are polyether or polyester polyols. In certain embodiments

is a polyether polyol comprising ethylene glycol or propylene glycol repeating units (—OCH$_2$CH$_2$O—, or —OCH$_2$CH(CH$_3$)O—) or combinations of these. In certain embodiments,

is a polyester polyol comprising the reaction product of a diol and a diacid, or a material derived from ring-opening polymerization of lactones.

In certain embodiments where

comprises a polyether diol, the aliphatic polycarbonate polyol has a structure Q7:

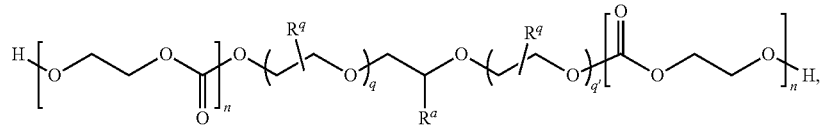

wherein,

R$^q$ is at each occurrence in the polymer chain independently —H or —CH$_3$;

R$^a$ is —H, or —CH$_3$;

q and q' are independently an integer from about 2 to about 40; and and n is as defined above and in the examples and embodiments herein.

In certain embodiments, an aliphatic polycarbonate polyol is selected from the group consisting of:

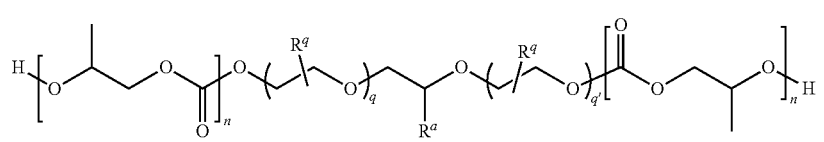

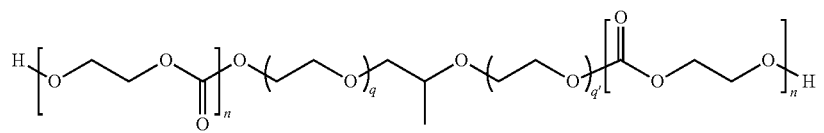

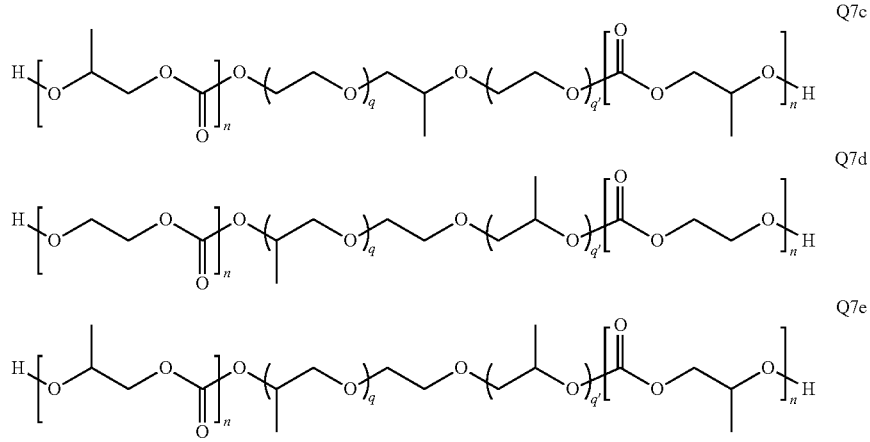

wherein each of $R^a$, $R^q$, q, q', and n is as defined above and described in classes and subclasses herein.

In certain embodiments, where aliphatic polycarbonate polyols comprise compounds conforming to structure Q7, the moiety (Z)

is derived from a commercially available polyether polyol such as those typically used in the formulation of polyurethane foam compositions.

In certain embodiments where (Z)

comprises a polyester diol, the aliphatic polycarbonate polyol has a structure Q8:

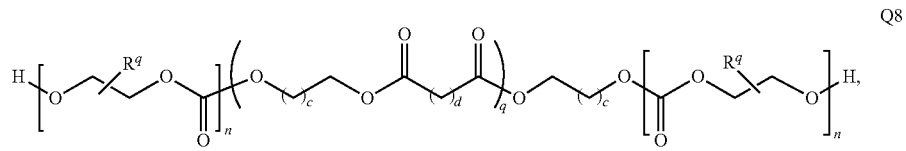

wherein,
c is at each occurrence in the polymer chain independently an integer from 0 to 6;
d is at each occurrence in the polymer chain independently an integer from 1 to 11; and
each of $R^q$, n, q, and q' is as defined above and described in classes and subclasses herein.

In certain embodiments, an aliphatic polycarbonate polyol is selected from the group consisting of:

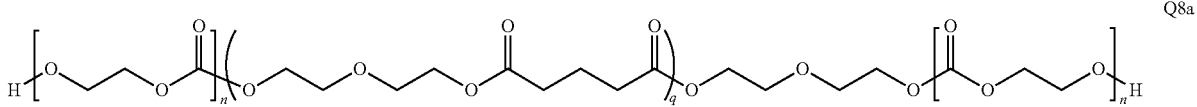

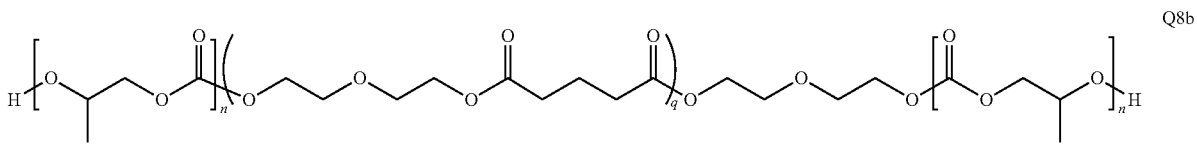

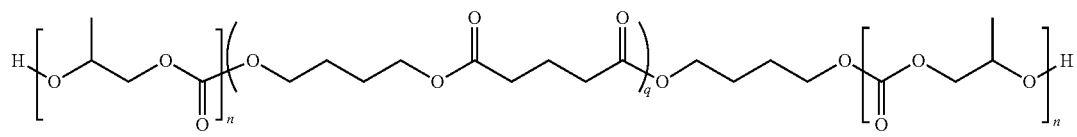

Q8c

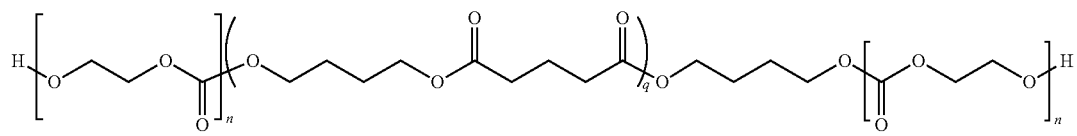

Q8d

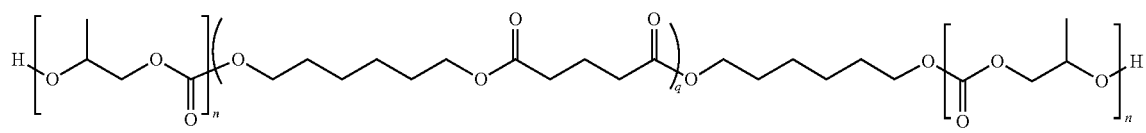

Q8e

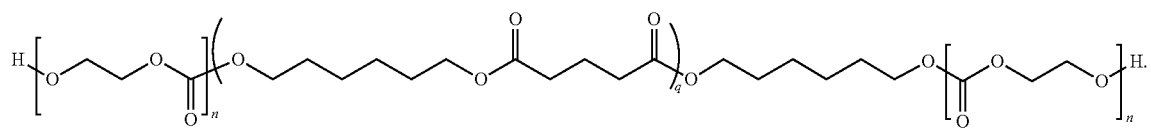

Q8f wherein each of n and q is as defined above and described in classes and subclasses herein.

In certain embodiments, where aliphatic polycarbonate polyols comprise compounds conforming to structure Q8, the moiety $$\text{\textcircled{Z}}$$

is derived from a commercially available polyester polyol such as those typically used in the formulation of polyurethane foam compositions.

II. Isocyanate Reagents

As described above, the compositions of the present invention comprise isocyanate reagents. The purpose of these isocyanate reagents is to react with the reactive end groups on the aliphatic polycarbonate polyols to form higher molecular weight structures through chain extension and/or cross-linking.

The art of polyurethane synthesis is well advanced and a very large number of isocyanates and related polyurethane precursors are known in the art and available commercially. While this section of the specification describes isocyanates suitable for use in certain embodiments of the present invention, it is to be understood that it is within the capabilities of one skilled in the art of polyurethane formulation to use alternative isocyanates along with the teachings of this disclosure to formulate additional compositions of matter within the scope of the present invention. Descriptions of suitable isocyanate compounds and related methods can be found in: *Chemistry and Technology of Polyols for Polyurethanes* Ionescu, Mihail 2005 (ISBN 978-1-84735-035-0), and H. Ulrich, "Urethane Polymers," Kirk-*Othmer Encyclopedia of Chemical Technology*, 1997 the entirety of each of which is incorporated herein by reference.

In certain embodiments, the isocyanate reagents comprise two or more isocyanate groups per molecule. In certain embodiments the isocyanate reagents are diisocyanates. In other embodiments, the isocyanate reagents are higher polyisocyanates such as triisocyanates, tetraisocyanates, isocyanate polymers or oligomers, and the like. In certain embodiments, the isocyanate reagents are aliphatic polyisocyanates or derivatives or oligomers of aliphatic polyisocyanates. In other embodiments, the isocyanates are aromatic polyisocyanates or derivatives or oligomers of aromatic polyisocyanates. In certain embodiments, the compositions may comprise mixtures of any two or more of the above types of isocyanates.

In certain embodiments, the isocyanate component used in the formulation of the novel materials of the present invention have a functionality of 2 or more. In certain embodiments, the isocyanate component of the inventive materials comprise a mixture of diisocyanates and higher isocyanates formulated to achieve a particular functionality number for a given application. In certain embodiments, where the inventive composition is a flexible foam or a soft elastomer, the isocyanate employed has a functionality of about 2. In certain embodiments, such isocyanates have a functionality between about 2 and about 2.7. In certain embodiments, such isocyanates have a functionality between about 2 and about 2.5. In certain embodiments, such isocyanates have a functionality between about 2 and about 2.3. In certain embodiments, such isocyanates have a functionality between about 2 and about 2.2.

In other embodiments, where the inventive composition is a rigid foam or a thermoplastic, the isocyanate employed has a functionality greater than 2. In certain embodiments, such isocyanates have a functionality between about 2.3 and about 4. In certain embodiments, such isocyanates have a functionality between about 2.5 and about 3.5. In certain embodiments, such isocyanates have a functionality between about 2.6 and about 3.1. In certain embodiments, such isocyanates have a functionality of about 3.

In certain embodiments, an isocyanate reagent is selected from the group consisting of: 1,6-hexamethylaminediisocyanate (HDI), isophorone diisocyanate (IPDI), 4,4' methylene-bis(cyclohexyl isocyanate) ($H_{12}$MDI), 2,4-toluene diisocyanate (TDI), 2,6-toluene diisocyanate (TDI), diphenylmethane-4,4'-diisocyanate (MDI), diphenylmethane-2,4'-diisocyanate (MDI), xylylene diisocyanate (XDI), 1,3-Bis (isocyanatomethyl)cyclohexane (H6-XDI), 2,2,4-trimethylhexamethylene diisocyanate, 2,4,4-trimethylhexamethylene diisocyanate (TMDI), m-tetramethylxylylene diisocyanate (TMXDI), p-tetramethylxylylene diisocyanate (TMXDI), isocyanatomethyl-1,8-ictane diisocyanate (TIN), triphenylmethane-4,4',4''triisocyanate, Tris(p-isocyanatomethyl)thiosulfate, 1,3-Bis(isocyanatomethyl)benzene, 1,4-tetramethylene diisocyanate, trimethylhexane diisocyanate, 1,6-hexamethylene diisocyanate, 1,4-cyclohexyl diisocyanate, lysine diisocyanate, and mixtures of any two or more of these.

Isocyanates suitable for certain embodiments of the present invention are available commercially under various trade names. Examples of suitable commercially available isocyanates include materials sold under trade names: Desmodur® (Bayer Material Science), Tolonate® (Perstorp), Takenate® (Takeda), Vestanat® (Evonik), Desmotherm® (Bayer Material Science), Bayhydur® (Bayer Material Science), Mondur (Bayer Material Science), Suprasec (Huntsman Inc.), Lupranate® (BASF), Trixene (Baxenden), Hartben® (Benasedo), Ucopol® (Sapici), and Basonat® (BASF). Each of these trade names encompasses a variety of isocyanate materials available in various grades and formulations.

The selection of suitable commercially-available isocyanate materials as reagents to produce polyurethane compositions for a particular application is within the capability of one skilled in the art of polyurethane technology using the teachings and disclosure of this patent application along with the information provided in the product data sheets supplied by the above-mentioned suppliers.

Additional isocyanates suitable for certain embodiments of the present invention are sold under the trade name Lupranate® (BASF). In certain embodiments, the isocyanates are selected from the group consisting of the materials shown in Table 1:

TABLE 1

| Products | Description | % NCO | Nominal Funct. |
|---|---|---|---|
| Lupranate M | 4,4' MDI | 33.5 | 2 |
| Lupranate MS | 4,4' MDI | 33.5 | 2 |
| Lupranate MI | 2,4' and 4,4' MDI Blend | 33.5 | 2 |
| Lupranate LP30 | Liquid Pure 4,4' MDI | 33.1 | 2 |
| Lupranate 227 | Monomeric/Modified MDI Blend Carbodiimide Modified MDI | 32.1 | 2 |
| Lupranate 5143 | Carbodiimide Modified 4,4' MDI | 29.2 | 2.2 |
| Lupranate MM103 | Carbodiimide Modified 4,4' MDI | 29.5 | 2.2 |

TABLE 1-continued

| Products | Description | % NCO | Nominal Funct. |
|---|---|---|---|
| Lupranate 219 | Carbodiimide Modified 4,4' MDI | 29.2 | 2.2 |
| Lupranate 81 | Carbodiimide Modified MDI | 29.5 | 2.2 |
| Lupranate 218 | Carbodiimide Modified MDI | 29.5 | 2.2 |
| Polymeric MDI (PMDI) | | | |
| Lupranate M10 | Low Funct. Polymeric | 31.7 | 2.2 |
| Lupranate R2500U | Polymeric MDI Variant | 31.5 | 2.7 |
| Lupranate M20S | Mid-Functionality Polymeric | 31.5 | 2.7 |
| Lupranate M20FB | Mid-Functionality Polymeric | 31.5 | 2.7 |
| Lupranate M70L | High-Functionality Polymeric | 31 | 3 |
| Lupranate M200 | High-Functionality Polymeric | 30 | 3.1 |
| Polymeric MDI Blends and Derivatives | | | |
| Lupranate 241 | Low Functionality Polymeric | 32.6 | 2.3 |
| Lupranate 230 | Low Viscosity Polymeric | 32.5 | 2.3 |
| Lupranate 245 | Low Viscosity Polymeric | 32.3 | 2.3 |
| Lupranate TF2115 | Mid Functionality Polymeric | 32.3 | 2.4 |
| Lupranate 78 | Mid Functionality Polymeric | 32 | 2.3 |
| Lupranate 234 | Low Functionality Polymeric | 32 | 2.4 |
| Lupranate 273 | Low Viscosity Polymeric | 32 | 2.5 |
| Lupranate 266 | Low Viscosity Polymeric | 32 | 2.5 |
| Lupranate 261 | Low Viscosity Polymeric | 32 | 2.5 |
| Lupranate 255 | Low Viscosity Polymeric | 31.9 | 2.5 |
| Lupranate 268 | Low Viscosity Polymeric | 30.6 | 2.4 |
| Select MDI Prepolymers | | | |
| Lupranate 5010 | Higher Functional Prepolymer | 28.6 | 2.3 |
| Lupranate 223 | Low Visc. Derivative of Pure MDI | 27.5 | 2.2 |
| Lupranate 5040 | Mid Functional, Low Viscosity | 26.3 | 2.1 |
| Lupranate 5110 | Polymeric MDI Prepolymer | 25.4 | 2.3 |
| Lupranate MP102 | 4,4' MDI Prepolymer | 23 | 2 |
| Lupranate 5090 | Special 4,4' MDI Prepolymer | 23 | 2.1 |
| Lupranate 5050 | Mid Functional, Mid NCO Prepol | 21.5 | 2.1 |
| Lupranate 5030 | Special MDI Prepolymer | 18.9 | NA |
| Lupranate 5080 | 2,4'-MDI Enhanced Prepolymer | 15.9 | 2 |
| Lupranate 5060 | Low Funct, Higher MW Prepol | 15.5 | 2 |
| Lupranate 279 | Low Funct, Special Prepolymer | 14 | 2 |
| Lupranate 5070 | Special MDI Prepolymer | 13 | 2 |
| Lupranate 5020 | Low Functionality, Low NCO | 9.5 | 2 |
| Toluene Diisocyanate (TDI) | | | |
| Lupranate T80- | 80/20:2,4/2,6 TDI | 48.3 | 2 |
| Lupranate T80- | High Acidity TDI | 48.3 | 2 |
| Lupranate 8020 | 80/20:TDI/Polymeric MDI | 44.6 | 2.1 |

Other isocyanates suitable for certain embodiments of the present invention are sold under the trade name Desmondur available from Bayer Material Science. In certain embodiments, the isocyanates are selected from the group consisting of the materials shown in Table 2:

TABLE 2

| Trade Name | Description |
|---|---|
| Desmodur ® 2460 M | Monomeric diphenylmethane diisocyanate with high 2,4'-isomer content |
| Desmodur ® 44 M | A monomeric diphenylmethane-4,4'-diisocyanate (MDI). |
| Desmodur ® 44 MC | Desmodur 44 MC Flakes is a monomeric diphenylmethane-4,4'-diisocyanate (MDI). |
| Desmodur ® BL 1100/1 | Blocked aromatic polyisocyanate based on TDI |
| Desmodur ® BL 1265 MPA/X | Blocked aromatic polyisocyanate based on TDI |
| Desmodur ® BL 3175 SN | Blocked, aliphatic polyisocyanate based on HDI |
| Desmodur ® BL 3272 MPA | Blocked aliphatic polyisocyanate based on HDI |
| Desmodur ® BL 3370 MPA | Blocked aliphatic polyisocyanate based on HDI |
| Desmodur ® BL 3475 BA/SN | Aliphatic crosslinking stoving urethane resin based on HDI/IPDI |
| Desmodur ® BL 3575/1 MPA/SN | Blocked aliphatic polyisocyanate based on HDI |
| Desmodur ® BL 4265 SN | Blocked, aliphatic polyisocyanate based on IPDI |
| Desmodur ® BL 5375 | Blocked aliphatic polyisocyanate based on H 12 MDI |
| Desmodur ® CD-L | Desmodur CD-L is a modified isocyanate based on diphenylmethane-4,4'-diisocyanate. |

TABLE 2-continued

| Trade Name | Description |
| --- | --- |
| Desmodur ® CD-S | Desmodur CD-S is a modified isocyanate based on diphenylmethane-4,4'-diisocyanate. |
| Desmodur ® D XP 2725 | Hydrophilically modified polyisocyanate |
| Desmodur ® DA-L | Hydrophilic aliphatic polyisocyanate based on hexamethylene diisocyanate |
| Desmodur ® DN | Aliphatic polyisocyanate of low volatility |
| Desmodur ® E 1160 | Aromatic polyisocyanate prepolymer based on toluene diisocyanate |
| Desmodur ® E 1361 BA | Aromatic polyisocyanate prepolymer based on toluylene diisocyanate |
| Desmodur ® E 1361 MPA/X | Aromatic polyisocyanate prepolymer based on toluene diisocyanate |
| Desmodur ® E 14 | Aromatic polyisocyanate prepolymer based on toluene diisocyanate |
| Desmodur ® E 15 | Aromatic polyisocyanate prepolymer based on toluene diisocyanate. |
| Desmodur ® E 1660 | Aromatic polyisocyanate prepolymer based on toluene diisocyanate. |
| Desmodur ® E 1750 PR | Polyisocyanate prepolymer based on toluene diisocyanate |
| Desmodur ® E 20100 | Modified polyisocyanate prepolymer based on diphenylmethane diisocyanate. |
| Desmodur ® E 21 | Aromatic polyisocyanate prepolymer based on diphenylmethane diisocyanate (MDI). |
| Desmodur ® E 2190 X | Aromatic polyisocyanate prepolymer based on diphenylmethane diisocyanate (MDI) |
| Desmodur ® E 22 | Aromatic polyisocyanate prepolymer based on diphenylmethane diisocyanate. |
| Desmodur ® E 2200/76 | Desmodur E 2200/76 is a prepolymer based on (MDI) with isomers. |
| Desmodur ® E 23 | Aromatic polyisocyanate prepolymer based on diphenylmethane diisocyanate (MDI). |
| Desmodur ® E 29 | Polyisocyanate prepolymer based on diphenylmethane diisocyanate. |
| Desmodur ® E 305 | Desmodur E 305 is a largely linear aliphatic NCO prepolymer based on hexamethylene diisocyanate. |
| Desmodur ® E 3265 MPA/SN | Aliphatic polyisocyanate prepolymer based on hexamethylene diisocyanate (HDI) |
| Desmodur ® E 3370 | Aliphatic polyisocyanate prepolymer based on hexamethylene diisocyanate |
| Desmodur ® E XP 2605 | Polyisocyanate prepolymer based on toluene diisocyanate and diphenylmethan diisocyanate |
| Desmodur ® E XP 2605 | Polyisocyanate prepolymer based on toluene diisocyanate and diphenylmethan diisocyanate |
| Desmodur ® E XP 2715 | Aromatic polyisocyanate prepolymer based on 2,4'-diphenylmethane diisocyanate (2,4'-MDI) and a hexanediol adipate |
| Desmodur ® E XP 2723 | Aromatic polyisocyanate prepolymer based on diphenylmethane diisocyanate (MDI). |
| Desmodur ® E XP 2726 | Aromatic polyisocyanate prepolymer based on 2,4'-diphenylmethane diisocyanate (2,4'-MDI) |
| Desmodur ® E XP 2727 | Aromatic polyisocyanate prepolymer based on diphenylmethane diisocyanate. |
| Desmodur ® E XP 2762 | Aromatic polyisocyanate prepolymer based on diphenylmethane diisocyanate (MDI). |
| Desmodur ® H | Monomeric aliphatic diisocyanate |
| Desmodur ® HL | Aromatic/aliphatic polyisocyanate based on toluylene diisocyanate/hexamethylene diisocyanate |
| Desmodur ® I | Monomeric cycloaliphatic diisocyanate. |
| Desmodur ® IL 1351 | Aromatic polyisocyanate based on toluene diisocyanate |
| Desmodur ® IL 1451 | Aromatic polyisocyanate based on toluene diisocyanate |
| Desmodur ® IL BA | Aromatic polyisocyanate based on toluene diisocyanate |
| Desmodur ® IL EA | Aromatic polyisocyante resin based on toluylene diisocyanate |
| Desmodur ® L 1470 | Aromatic polyisocyanate based on toluene diisocyanate |
| Desmodur ® L 67 BA | Aromatic polyisocyanate based on tolulene diisocyanate |
| Desmodur ® L 67 MPA/X | Aromatic polyisocyanate based on tolulene diisocyanate |
| Desmodur ® L 75 | Aromatic polyisocyanate based on tolulene diisocyanate |
| Desmodur ® LD | Low-functionality isocyanate based on hexamethylene diisocyanate (HDI) |
| Desmodur ® LS 2424 | Monomeric diphenylmethane diisocyanate with high 2,4'-isomer content |
| Desmodur ® MT | Polyisocyanate prepolymer based on diphenylmethane diisocyanate |
| Desmodur ® N 100 | Aliphatic polyisocyanate (HDI biuret) |
| Desmodur ® N 3200 | Aliphatic polyisocyanate (low-viscosity HDI biuret) |
| Desmodur ® N 3300 | Aliphatic polyisocyanate (HDI trimer) |
| Desmodur ® N 3368 BA/SN | Aliphatic polyisocyanate (HDI trimer) |
| Desmodur ® N 3368 SN | Aliphatic polyisocyanate (HDI trimer) |
| Desmodur ® N 3386 BA/SN | Aliphatic polyisocyanate (HDI trimer) |

TABLE 2-continued

| Trade Name | Description |
|---|---|
| Desmodur ® N 3390 BA | Aliphatic polyisocyanate (HDI trimer) |
| Desmodur ® N 3390 BA/SN | Aliphatic polyisocyanate (HDI trimer) |
| Desmodur ® N 3400 | Aliphatic polyisocyanate (HDI uretdione) |
| Desmodur ® N 3600 | Aliphatic polyisocyanate (low-viscosity HDI trimer) |
| Desmodur ® N 3790 BA | Aliphatic polyisocyanate (high functional HDI trimer) |
| Desmodur ® N 3800 | Aliphatic polyisocyanate (flexibilizing HDI trimer) |
| Desmodur ® N 3900 | Low-viscosity, aliphatic polyisocyanate resin based on hexamethylene diisocyanate |
| Desmodur ® N 50 BA/MPA | Aliphatic polyisocyanate (HDI biuret) |
| Desmodur ® N 75 BA | Aliphatic polyisocyanate (HDI biuret) |
| Desmodur ® N 75 MPA | Aliphatic polyisocyanate (HDI biuret) |
| Desmodur ® N 75 MPA/X | Aliphatic polyisocyanate (HDI biuret) |
| Desmodur ® NZ 1 | Aliphatic polyisocyanate |
| Desmodur ® PC-N | Desmodur PC-N is a modified diphenyl-methane-4,4'-diisocyanate (MDI). |
| Desmodur ® PF | Desmodur PF is a modified diphenyl-methane-4,4'-diisocyanate (MDI). |
| Desmodur ® PL 340, 60% BA/SN | Blocked aliphatic polyisocyanate based on IPDI |
| Desmodur ® PL 350 | Blocked aliphatic polyisocyanate based on HDI |
| Desmodur ® RC | Solution of a polyisocyanurate of toluene diisocyanate (TDI) in ethyl acetate. |
| Desmodur ® RE | Solution of triphenylmethane-4,4',4''-triisocyanate in ethyl acetate |
| Desmodur ® RFE | Solution of tris(p-isocyanatophenyl) thiophosphate in ethyl acetate |
| Desmodur ® RN | Solution of a polyisocyanurate with aliphatic and aromatic NCO groups in ethyl acetate. |
| Desmodur ® T 100 | Pure 2,4'-toluene diisocyanate (TDI) |
| Desmodur ® T 65 N | 2,4- and 2,6-toluene diisocyanate (TDI) in the ratio 67:33 |
| Desmodur ® T 80 | 2,4- and 2,6-toluene diisocyanate (TDI) in the ratio 80:20 |
| Desmodur ® T 80 P | 2,4- and 2,6-toluene diisocyanate (TDI) in the ratio 80:20 with an increased content of hydrolysable chlorine |
| Desmodur ® VH 20 N | Polyisocyanate based on diphenylmethane diisocyanate |
| Desmodur ® VK | Desmodur VK products re mixtures of diphenylmethane-4,4'-diisocyanate (MDI) with isomers and higher functional homologues |
| Desmodur ® VKP 79 | Desmodur VKP 79 is a modified diphenylmethane-4,4'-diisocyanate (MDI) with isomers and homologues. |
| Desmodur ® VKS 10 | Desmodur VKS 10 is a mixture of diphenylmethane-4,4'-diisocyanate (MDI) with isomers and higher functional homologues (PMDI). |
| Desmodur ® VKS 20 | Desmodur VKS 20 is a mixture of diphenylmethane-4,4'-diisocyanate (MDI) with isomers and higher functional homologues (PMDI). |
| Desmodur ® VKS 20 F | Desmodur VKS 20 F is a mixture of diphenylmethane-4,4'-diisocyanate (MDI) with isomers and higher functional homologues |
| Desmodur ® VKS 70 | Desmodur VKS 70 is a mixture of diphenylmethane-4,4'-diisocyanate (MDI) with isomers and homologues. |
| Desmodur ® VL | Aromatic polyisocyanate based on diphenylmethane diisocyanate |
| Desmodur ® VP LS 2078/2 | Blocked aliphatic polyisocyanate based on IPDI |
| Desmodur ® VP LS 2086 | Aromatic polyisocyanate prepolymer based on diphenylmethane diisocyanate |
| Desmodur ® VP LS 2257 | Blocked aliphatic polyisocyanate based on HDI |
| Desmodur ® VP LS 2371 | Aliphatic polyisocyanate prepolymer based on isophorone diisocyanate. |
| Desmodur ® VP LS 2397 | Desmodur VP LS 2397 is a linear prepolymer based on polypropylene ether glycol and diphenylmethane diisocyanate (MDI). It contains |
| Desmodur ® W | Monomeric cycloaliphatic diisocyanate |
| Desmodur ® W/1 | Monomeric cycloaliphatic diisocyanate |
| Desmodur ® XP 2404 | Desmodur XP 2404 is a mixture of monomeric polyisocyanates |
| Desmodur ® XP 2406 | Aliphatic polyisocyanate prepolymer based on isophorone diisocyanate |
| Desmodur ® XP 2489 | Aliphatic polyisocyanate |
| Desmodur ® XP 2505 | Desmodur XP 2505 is a prepolymer containing ether groups based on diphenylmethane-4,4'-diisocyanates (MDI) with isomers and higher |
| Desmodur ® XP 2551 | Aromatic polyisocyanate based on diphenylmethane diisocyanate |
| Desmodur ® XP 2565 | Low-viscosity, aliphatic polyisocyanate resin based on isophorone diisocyanate. |
| Desmodur ® XP 2580 | Aliphatic polyisocyanate based on hexamethylene diisocyanate |
| Desmodur ® XP 2599 | Aliphatic prepolymer containing ether groups and based on hexamethylene-1,6-diisocyanate (HDI) |
| Desmodur ® XP 2617 | Desmodur XP 2617 is a largely linear NCO prepolymer based on hexamethylene diisocyanate. |
| Desmodur ® XP 2665 | Aromatic polyisocyanate prepolymer based on diphenylmethane diisocyanate (MDI). |

TABLE 2-continued

| Trade Name | Description |
|---|---|
| Desmodur ® XP 2675 | Aliphatic polyisocyanate (highly functional HDI trimer) |
| Desmodur ® XP 2679 | Aliphatic polyisocyanate (HDI allophanate trimer) |
| Desmodur ® XP 2714 | Silane-functional aliphatic polyisocyanate based on hexamethylene diisocyanate |
| Desmodur ® XP 2730 | Low-viscosity, aliphatic polyisocyanate (HDI uretdione) |
| Desmodur ® XP 2731 | Aliphatic polyisocyanate (HDI allophanate trimer) |
| Desmodur ® XP 2742 | Modified aliphatic Polyisocyanate (HDI-Trimer), contains SiO2 - nanoparticles |

Additional isocyanates suitable for certain embodiments of the present invention are sold under the trade name Tolonate® (Perstorp). In certain embodiments, the isocyanates are selected from the group consisting of the materials shown in Table 3:

TABLE 3

| Tolonate ™ D2 | a blocked aliphatic polyisocyanate, supplied at 75% solids in aromatic solvent |
|---|---|
| Tolonate ™ HDB | a viscous solvent-free aliphatic polyisocyanate |
| Tolonate ™ HDB-LV | a solvent free low viscosity aliphatic polyisocyanate |
| Tolonate ™ HDB 75 B | an aliphatic polyisocyanate, supplied at 75% solids in methoxy propyl acetate |
| Tolonate ™ HDB 75 BX | an aliphatic polyisocyanate, supplied at 75% solids |
| Tolonate ™ HDT | a medium viscosity, solvent-free aliphatic polyisocyanate |
| Tolonate ™ HDT-LV | is a solvent free low viscosity aliphatic polyisocyanate |
| Tolonate ™ HDT-LV2 | a solvent free, very low viscosity aliphatic polyisocyanate |
| Tolonate ™ HDT 90 | an aliphatic polyisocyanate, based on HDI-trimer (isocyanurate), supplied at 90% solids |
| Tolonate ™ HDT 90 B | an aliphatic polyisocyanate, based on HDI-trimer (isocyanurate), supplied at 90% solids |
| Tolonate ™ IDT 70 B | an aliphatic polyisocyanate, based on HDI-trimer (isocyanurate), supplied at 70% solids |
| Tolonate ™ IDT 70 S | an aliphatic polyisocyanate, based on HDI-trimer (isocyanurate), supplied at 70% solids |
| Tolonate ™ X FD 90 B | a high functionality, fast drying aliphatic polyisocyanate based on HDI-trimer, supplied at 90% solids |

Other isocyanates suitable for certain embodiments of the present invention are sold under the trade name Mondur® available from Bayer Material Science. In certain embodiments, the isocyanates are selected from the group consisting of the materials shown in Table 4:

TABLE 4

| Trade Name | Description |
|---|---|
| MONDUR 445 | TDI/MDI blend polyisocyanate; blend of toluene diisocyanate and polymeric diphenylmethane diisocyanate; NCO weight 44.5-45.2% |
| MONDUR 448 | modified polymeric diphenylmethane diisocyanate (pMDI) prepolymer; NCO weight 27.7%; viscosity 140 mPa · s @ 25° C.; equivalent weight 152; functionality 2.2 |
| MONDUR 489 | modified polymeric diphenylmethane diisocyanate (pMDI); NCO weight 31.5%; viscosity 700 mPa · s @ 25° C.; equivalent weight 133; functionality 3.0 |
| MONDUR 501 | modified monomeric diphenylmethane diisocyanate (mMDI); isocyanate-terminated polyester prepolymer; NCO weight 19.0%; viscosity 1,100 mPa · s @ 25° C.; equivalent weight 221; functionality 2 |
| MONDUR 541 | polymeric diphenylmethane diisocyanate (pMDI); binder for composite wood products and as a raw material in adhesive formulations; NCO weight 31.5%; viscosity 200 mPa · s @ 25° C. |
| MONDUR 582 | polymeric diphenylmethane diisocyanate (pMDI); binder for composite wood products and as a raw material in adhesive formulations; NCO weight 31.0%; viscosity 200 mPa · s @ 25° C. |
| MONDUR 541-Light | polymeric diphenylmethane diisocyanate (pMDI); NCO weight 32.0%; viscosity 70 mPa · s @ 25° C.; equivalent weight 131; functionality 2.5 |
| MONDUR 841 | modified polymeric MDI prepolymer; NCO, Wt 30.5%; Acidity, Wt 0.02%; Amine Equivalent 132; Viscosity at 25° C., mPa · s 350; Specific gravity at 25° C. 1.24; Flash Point, PMCC, ° F. >200 |
| MONDUR 1437 | modified diphenylmethane diisocyanate (mMDI); isocyanate-terminated polyether prepolymer; NCO weight 10.0%; viscosity 2,500 mPa · s @ 25° C.; equivalent weight 420; functionality 2 |
| MONDUR 1453 | modified diphenylmethane diisocyanate (mMDI); isocyanate-terminated polyether prepolymer based on polypropylene ether glycol (PPG); NCO weight 16.5%; viscosity 600 mPa · s @ 25° C.; equivalent weight 254; functionality 2 |
| MONDUR 1515 | modified polymeric diphenylmethane diisocyanate (pMDI) prepolymer; used in the production of rigid polyurethane foams, especially for the appliance industry; NCO weight 30.5%; viscosity 350 mPa · s @ 25° C. |
| MONDUR 1522 | modified monomeric 4,4-diphenylmethane diisocyanate (mMDI); NCO weight 29.5%; viscosity 50 mPa · s @ 25° C.; equivalent weight 143; functionality 2.2 |
| MONDUR MA-2300 | modified monomeric MDI, allophanate-modified 4,4'-diphenylmethane diisocyanate (mMDI); NCO weight 23.0%; viscosity 450 mPa · s @ 25° C.; equivalent weight 183; functionality 2.0 |
| MONDUR MA 2600 | modified monomeric MDI, allophanate-modified 4,4'-diphenylmethane diisocyanate (mMDI); NCO weight 26.0%; viscosity 100 mPa · s @ 25° C.; equivalent weight 162; functionality 2.0 |

TABLE 4-continued

| Trade Name | Description |
|---|---|
| MONDUR MA 2601 | aromatic diisocyanate blend, allophanate-modified 4,4'-diphenylmethane diisocyanate (MDI) blended with polymeric diphenylmethane diisocyanate (pMDI) containing 2,4'-isomer; NCO weight 29.0%; viscosity 60 mPa · s @ 25° C.; equivalent weight 145; functionality 2.2 |
| MONDUR MA 2603 | MDI prepolymer; isocyanate-terminated (MDI) prepolymer blended with an allophanate-modified 4,4'-diphenylmethane diisocyanate (MDI); NCO weight 16.0%; viscosity 1,050 mPa · s @ 25° C.; equivalent weight 263; functionality 2.0 |
| MONDUR MA-2902 | modified monomeric MDI, allophanate-modified 4,4'-diphenylmethane diisocyanate (mMDI); NCO weight 29.0%; viscosity 40 mPa · s @ 25° C.; equivalent weight 145; functionality 2.0 |
| MONDUR MA-2903 | modified monomeric MDI; isocyanate-terminated (MDI) prepolymer; NCO weight 19.0%; viscosity 400 mPa · s @ 25° C.; equivalent weight 221; functionality 2.0 |
| MONDUR MA-2904 | Allophanate-modified MDI polyether prepolymer; NCO weight 12.0%; viscosity 1,800 mPa · s @ 25° C.; equivalent weight 350; functionality of 2.0 |
| MONDUR MB | high-purity grade difunctional isocyanante, diphenylmethane 4,4'-diisocyanate; used in production of polyurethane elastomers, adhesives, coatings and intermediate polyurethane products; appearance colorless solid or liquid; specific gravity @ 50° C. ± 15.5 1.19; flash point 202° C. PMCC; viscosity (in molten form) 4.1 mPa · s; bult density 10 lb/gal (fused) or 9.93 lb/gal (molten); freezing temperature 39° C. |
| MONDUR MLQ | monomeric diphenylmethan diisocyanate; used in a foams, cast elastomers, coatings and ahdesives; appearance light yellow clear liquid, NCO 33.4% wt; 1.19 specific gravity at 25° C., 196° C. flash point, DIN 51758; 11-15° C. freezing temperature |
| MONDUR MQ | high-purity-grade difunctional isocyanate, diphenylmethane 4,4'-diisocyanate (MDI); used in production of solid polyurethane elastomers, adhesives, coatings and in intermediate polyurethane products; appearance colorless solid or liquid; specific gravity 1.19 @ 50° C.; flash point 202° C. PMCC; viscosity 4.1 mPa · s; bulk density 10 lb./gal (fused) or 9.93 lb./gal (molten); freezing temperature 39° C. |
| MONDUR MR | polymeric diphenylmethane diisocyanate (pMDI); NCO weight 31.5%; viscosity 200 mPa · s @ 25° C.; equivalent weight 133; functionality 2.8 |
| MONDUR MR LIGHT | polymeric diphenylmethane diisocyanate (pMDI); NCO weight 31.5%; viscosity 200 mPa · s @ 25° C.; equivalent weight 133; functionality 2.8 |
| MONDUR MR-5 | polymeric diphenylmethane diisocyanate (pMDI); NCO weight 32.5%; viscosity 50 mPa · s @ 25° C.; equivalent weight 129; functionality 2.4 |
| MONDUR MRS | 2,4' rich polymeric diphenylmethane diisocyanate (pMDI); NCO weight 31.5%; viscosity 200 mPa · s @ 25° C.; equivalent weight 133; functionality2.6 |
| MONDUR MRS 2 | 2,4' rich polymeric diphenylmethane diisocyanate (pMDI); NCO weight 33.0%; viscosity 25 mPa · s @ 25° C.; equivalent weight 127; functionality2.2 |
| MONDUR MRS-4 | 2,4' rich polymeric diphenylmethane diisocyanate (pMDI); NCO weight 32.5%; viscosity 40 mPa · s @ 25° C.; equivalent weight 129; functionality 2.4 |
| MONDUR MRS-5 | 2,4' rich polymeric diphenylmethane diisocyanate (pMDI); NCO weight 32.3%; viscosity 55 mPa · s @ 25° C.; equivalent weight 130; functionality 2.4 |
| MONDUR PC | modified 4,4' diphenylmethane diisocyanate (mMDI); NCO weight 25.8%; viscosity 145 mPa · s @ 25° C.; equivalent weight 163; functionality 2.1 |
| MONDUR PF | modified 4,4' diphenylmethane diisocyanate (mMDI) prepolymer; NCO weight 22.9%; viscosity 650 mPa · s @ 25° C.; equivalent weight 183; functionality 2 |
| MONDUR TD-65 | monomeric toluene diisocyanate (TDI); 65/35 mixture of 2,4 and 2.6 TDI; NCO weight 48%; viscosity 3 mPa · s @ 25° C.; equivalent weight 87.5; functionality 2 |
| MONDUR TD-80 GRADE A | monomeric toluene diisocyanate (TDI); 80/20 mixture of the 2,4 and 2,6 isomer; NCO weight 48%; viscosity 5 mPa · s @ 25° C.; equivalent weight 87.5; functionality 2 |
| MONDUR TD-80 GRADE A/GRADE B | monomeric toluene diisocyanate (TDI); 80/20 mixture of the 2,4 and 2,6 isomer; NCO weight 48%; viscosity 5 mPa · s @ 25° C.; equivalent weight 87.5; functionality 2 |

In certain embodiments, one or more of the above-described isocyanate compositions is provided in a formulation typical of an A-side mixture known in the art of polyurethane foam manufacture. Such A side mixtures may comprise prepolymers formed by the reaction of a molar excess of one or more polyisocyanates with reactive molecules comprising reactive functional groups such as alcohols, amines, thiols, carboxylates and the like. A-side mixtures may also comprise solvents, surfactants, stabilizers, and other additives known in the art.

III. B-Side Mixtures

As described above, in some embodiments, compositions of the present invention comprise so-called B-side mixtures comprising one or more of the aliphatic polycarbonate polyols described in Section I above. Additional aliphatic polycarbonate polyols suitable for the formulation of B-side mixtures of the present invention are disclosed in PCT/US2010/028362, published as WO/2010/028362.

In certain embodiments, the B-side mixture comprises the aliphatic polycarbonate polyols in combination with one or more additional polyols and/or one or more additives. In certain embodiments, the additives are selected from the group consisting of: solvents, water, catalysts, surfactants, blowing agents, colorants, UV stabilizers, flame retardants, antimicrobials, plasticizers, cell-openers, antistatic compositions, compatibilizers, and the like. In certain embodiments, the B-side mixtures comprise additional reactive small molecules such as amines, alcohols, thiols or carboxylic acids that participate in bond-forming reactions with isocyanates.

Additional Polyols

In certain embodiments, the B-side mixtures of the present invention comprise aliphatic polycarbonate polyols as described above in combination with one or more additional polyols such as are traditionally used in polyurethane foam compositions. In embodiments where additional polyols are present, they may comprise up to about 95 weight percent of the total polyol content with the balance of the polyol mixture made up of one or more aliphatic polycarbonate polyols described in Section I above and in the examples and specific embodiments herein.

In embodiments where B-side mixtures of the present invention comprise or derived from a mixture of one or more aliphatic polycarbonate polyols and one or more additional polyols, the additional polyols are selected from the group consisting of polyether polyols, polyester polyols, polystyrene polyols, polyether-carbonate polyols, polyether-ester carbonates, and mixtures of any two or more of these. In certain embodiments, B-side mixtures of the present invention comprise or derived from a mixture of one or more aliphatic polycarbonate polyols as described herein and one or more other polyols selected from the group consisting of materials available commercially under the trade names: Voranol® (Dow), SpecFlex® (Dow), Tercarol® (Dow), Caradol® (Shell), Hyperliter®, Acclaim® (Bayer Material Science), Ultracel® (Bayer Material Science), Desmophen® (Bayer Material Science), and Arcol® (Bayer Material Science).

In certain embodiments, B-side mixtures of the present invention comprise mixtures containing polyether polyols in combination with one or more aliphatic polycarbonate polyols as described herein. In certain embodiments, such polyether polyols are characterized in that they have an Mn between about 500 and about 10,000 g/mol. In certain embodiments, such polyether polyols have an Mn between about 500 and about 5,000 g/mol. In certain embodiments, the polyether polyols comprise polyethylene glycol. In certain embodiments, the polyether polyols comprise polypropylene glycol.

Polyether polyols that may be present include those which can be obtained by known methods, for example, polyether polyols can be produced by anionic polymerization with alkali hydroxides such as sodium hydroxide or potassium hydroxide or alkali alcoholates, such as sodium methylate, sodium ethylate, potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical. Any suitable alkylene oxide may be used such as 1,3-propylene oxide, 1,2- and 2,3 butylene oxide, amylene oxides, styrene oxide, and preferably ethylene oxide and propylene oxide and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups, preferably secondary hydroxyl groups from the addition of propylene oxide onto an initiator because these groups are slower to react. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramefhylene and polyoxyethylene glycols, and copolymer glycols prepared from blends or sequential addition of two or more alkylene oxides. The polyalkylene polyether polyols may be prepared by any known process such as, for example, the process disclosed by Wurtz in *Encyclopedia of Chemical Technology*, Vol. 7, pp. 257-262, published by Interscience Publishers, Inc. (1951) or in U.S. Pat. No. 1,922,459. Polyethers include the alkylene oxide addition products of polyhydric alcohols such as ethylene glycol, propylene glycol, dipropylene glycol, trimethylene glycol, 1,2-butanediol, 1,5-pentanediol, 1,6hexanediol, 1,7-heptanediol, hydroquinone, resorcinol glycerol, glycerine, 1,1,1-trimethylol-propane, 1,1,1trimethylolethane, pentaerythritol, 1,2,6-hexanetriol, a-methyl glucoside, sucrose, and sorbitol. Also included within the term "polyhydric alcohol" are compounds derived from phenol such as 2,2-bis(4-hydroxyphenyl)-propane, commonly known as Bisphenol A. Particularly preferred in the polyol composition is at least one polyol which is initiated with a compound having at least two primary or secondary amine groups, a polyhydric alcohol having 4 or more hydroxyl groups, such as sucrose, or a mixture of initiators employing a polyhydric alcohol having at least 4 hydroxyl groups and compounds having at least two primary or secondary amine groups. Suitable organic amine initiators which may be condensed with alkylene oxides include aromatic amines-such as aniline, N-alkylphenylene-diamines, 2,4'-, 2,2'-, and 4,4'-methylenedianiline, 2,6- or 2,4-toluenediamine, vicinal toluenediamines, o-chloroaniline, p-aminoaniline, 1,5-diaminonaphthalene, methylene dianiline, the various condensation products of aniline and formaldehyde, and the isomeric diaminotoluenes; and aliphatic amines such as mono-, di-, and trialkanolamines, ethylene diamine, propylene diamine, diethylenetriamine, methylamine, triisopropanolamine, 1,3-diaminopropane, 1,3-diaminobutane, and 1,4-diaminobutane. Preferable amines include monoethanolamine, vicinal toluenediamines, ethylenediamines, and propylenediamine. Yet another class of aromatic polyether polyols contemplated for use in this invention are the Mannich-based polyol an alkylene oxide adduct of phenol/formaldehyde/alkanolamine resin, frequently called a "Mannich" polyol such as disclosed in U.S. Pat. Nos. 4,883,826; 4,939,182; and 5,120, 815.

In certain embodiments where additional polyols are present, they comprise from about 5 weight percent to about 95 weight percent of the total polyol content with the balance of the polyol mixture made up of one or more aliphatic polycarbonate polyols described in Section I above and in the examples and specific embodiments herein. In certain embodiments, up to about 75 weight percent of the total polyol content of the B-side mixture is aliphatic polycarbonate polyol. In certain embodiments, up to about 50 weight percent of the total polyol content of the B-side mixture is aliphatic polycarbonate polyol. In certain embodiments, up to about 40 weight percent, up to about 30 weight percent, up to about 25 weight percent, up to about 20 weight percent, up to about 15 weight percent, or up to about 10 weight percent of the total polyol content of the B-side mixture is aliphatic polycarbonate polyol. In certain embodiments, at least about 5 weight percent of the total polyol content of the B-side mixture is aliphatic polycarbonate polyol. In certain embodiments, at least about 10 weight percent of the total polyol content of the B-side mixture is aliphatic polycarbonate polyol. In certain embodiments, at least about 15 weight percent, at least about 20 weight percent, at least about 25 weight percent, at least about 40 weight percent, or at least about 50 weight percent, of the total polyol content of the B-side mixture is aliphatic polycarbonate polyol.

Catalysts

In certain embodiments, B-side mixtures contain one or more catalysts for the reaction of the polyol (and water, if present) with the polyisocyanate. Any suitable urethane catalyst may be used, including tertiary amine compounds and organometallic compounds. Exemplary tertiary amine compounds include triethylenediamine, N-methylmorpholine, N,N-dimethylcyclohexylamine, pentamethyldiethylenetriamine, tetramethylethylenediamine, 1-methyl-4-dimethylaminoethylpiperazine, 3-methoxy-N-dimethylpropylamine, N-ethylmorpholine, diethylethanolamine, N-cocomorpholine, N,N-dimethyl-N', N'-dimethyl isopropylpropylenediamine, N,N-diethyl-3-diethylaminopropylamine dimethylbenzylamine, 1,8-Diazabicycloundec-7-ene (DBU), 1,4-diazabicyclo[2.2.2]octane (DABCO) triazabicyclodecene (TBD), and N-methyltriazabicyclodecene. (MTBD) Exemplary organometallic catalysts include organomercury, organolead, organoferric and organotin catalysts, with organotin catalysts being preferred among these. Suitable tin catalysts include stannous chloride, tin salts of carboxylic acids such as dibutyltin dilaurate, as well as other organometallic compounds such as are disclosed in U.S. Pat. No. 2,846,408 and elsewhere. A catalyst for the trimerization of polyisocyanates, resulting in a polyisocyanurate, such as an alkali metal alkoxide may also optionally be employed herein. Such catalysts are used in an amount which measurably increases the rate of polyurethane or polyisocyanurate formation.

In certain embodiments, where B-side mixtures of the present invention comprise catalysts, the catalysts comprise tin based materials. In certain embodiments, tin catalysts included in the B-side mixtures are selected from the group consisting of: di-butyl tin dilaurate, dibutylbis(laurylthio)stannate, dibutyltinbis(isooctylmercapto acetate) and dibutyltinbis(isooctylmaleate), tin octanoate and mixtures of any two or more of these.

In certain embodiments, catalysts included in the B-side mixtures comprise tertiary amines. In certain embodiments, catalysts included in the B-side mixtures are selected from the group consisting of: DABCO, pentametyldipropylenetriamine, bis(dimethylamino ethyl ether), pentamethyldiethylenetriamine, DBU phenol salt, dimethylcyclohexylamine, 2,4,6-tris(N,N-dimethylaminomethyl)phenol (DMT-30), 1,3,5-tris(3-dimethylaminopropyl)hexahydro-s-triazine, ammonium salts and combinations or formulations of any of these.

Typical amounts of catalyst are 0.001 to 10 parts of catalyst per 100 parts by weight of total polyol in the B-side mixture. In certain embodiments, catalyst levels in the formulation, when used, range between about 0.001 pph (weight parts per hundred) and about 3 pph based on the amount of polyol present in the B-side mixture. In certain embodiments, catalyst levels range between about 0.05 pph and about 1 pph, or between about 0.1 pph and about 0.5 pph.

Blowing Agents

In certain embodiments, B-side mixtures of the present invention contain blowing agents. Blowing agents may be chemical blowing agents (typically molecules that react with A-side components to liberate $CO_2$ or other volatile compounds) or they may be physical blowing agents (typically molecules with a low boiling point that vaporize during the foam formation. Many blowing agents are known in the art and may be applied to B-side compositions of the present invention according to conventional methodology. The choice of blowing agent and the amounts added can be a matter of routine experimentation.

In certain embodiments, the blowing agent comprises a chemical blowing agent. In certain embodiments, water is present as a blowing agent. Water functions as a blowing agent by reacting with a portion of the isocyanate in the A-side mixture to produce carbon dioxide gas. Similarly, formic acid can be included as a blowing agent. Formic acid functions as a blowing agent by reacting with a portion of the isocyanate to produce carbon dioxide and carbon monoxide gas.

In certain embodiments, water is present in an amount of from 0.5 to 20 parts per 100 parts by weight of the polyol in the B-side composition. In certain embodiments, water is present from about 1 to 10 parts, from about 2 to 8 parts, or from about 4 to 6 parts per 100 parts by weight of polyol in the B-side composition. In certain embodiments, it is advantageous not to exceed 2 parts of water, not-to exceed 1.5 parts of water, or not to exceed 0.75 parts of water. In certain embodiments, it is advantageous to have water absent.

In certain embodiments, formic acid is present in an amount of from 0.5 to 20 parts per 100 parts by weight of the polyol in the B-side composition. In certain embodiments, formic acid is present from about 1 to 10 parts, from about 2 to 8 parts, or from about 4 to 6 parts per 100 parts by weight of polyol in the B-side composition.

In certain embodiments physical blowing agents can be used. Suitable physical blowing agents include hydrocarbons, fluorine-containing organic molecules hydrocarbons, chlorocarbons, acetone, methyl formate and carbon dioxide. In some embodiments, fluorine-containing organic molecules comprise perfluorinated compounds, chlorofluorocarbons, hydrochlorofluorocarbons, and hydrofluorocarbons. Suitable hydrofluoroalkanes are $C_{1-4}$ compounds including difiuoromethane (R-32), 1,1,1,2-tetrafluoroethane (R-134a), 1,1-difluoroethane (R-152a), difiuorochloroethane (R-142b), trifiuoromethane (R-23), heptafluoropropane (R-227a), hexafluoropropane (R136), 1,1,1-trifluoroefhane (R-133), fluoroethane (R-161), 1,1,1,2,2-pentafluoropropane (R-245fa), pentafluoropropylene (R2125a), 1,1,1,3-tetrafiuoropropane, tetrafhioropropylene (R-2134a), 1,1,2,3, 3-pentafluoropropane and 1,1,1,3,3-pentafiuoro-n-butane.

In certain embodiments, when a hydrofluorocarbon blowing agent is present in the B-side mixture, it is selected from the group consisting of: tetrafluoroethane (R-134a), pentafluoropropane (R-245fa) and pentafluorobutane (R-365).

Suitable hydrocarbons for use as blowing agent include nonhalogenated hydrocarbons such as butane, isobutane, 2,3-dimethylbutane, n- and i-pentane isomers, hexane isomers, heptane isomers and cycloalkanes including cyclopentane, cyclohexane and cycloheptane. Preferred hydrocarbons for use as blowing agents include cyclopentane and notably n-pentane an iso-pentane. In a certain embodiments the B-side composition comprises a physical blowing agent selected from the group consisting of tetrafluoroethane (R-134a), pentafluoropropane (R-245fa), pentafluorobutane (R-365), cyclopentane, n-pentane and iso-pentane.

In certain embodiments where a physical blowing agent is present, it is used in an amount of from about 1 to about 20 parts per 100 parts by weight of the polyol in the B-side composition. In certain embodiments, the physical blowing agent is present from 2 to 15 parts, or from 4 to 10 parts per 100 parts by weight of the polyol in the B-side composition.

Reactive Small Molecules

In certain embodiments, B-side mixtures of the present invention include one or more small molecules reactive toward isocyanates. In certain embodiments, reactive small molecules included in the inventive B-side mixtures comprise organic molecules having one or more functional groups selected from the group consisting of alcohols, amines, carboxylic acids, thiols, and combinations of any two or more of these. In some embodiments, a non-polymeric small molecule has a molecular weight less than 1,000 g/mol, or less than 1,500 g/mol.

In certain embodiments, B-side mixtures of the present invention include one or more alcohols. In certain embodiments, the B-side mixtures include polyhydric alcohols.

In certain embodiments, reactive small molecules included in the inventive B-side mixtures comprise dihydric alcohols. In certain embodiments, the dihydric alcohol comprises a $C_{2-40}$ diol. In certain embodiments, the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 2-methyl-2,4-pentane diol, 2-ethyl-1,3-hexane diol, 2-methyl-1,3-propane diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, isosorbide, glycerol monoesters, glycerol monoethers, trimethylolpropane monoesters, trimethylolpropane monoethers, pentaerythritol diesters, pentaerythritol diethers, and alkoxylated derivatives of any of these.

In certain embodiments, a reactive small molecule included in the inventive B-side mixtures comprises a dihydric alcohol selected from the group consisting of: diethylene glycol, triethylene glycol, tetraethylene glycol, higher poly(ethylene glycol), such as those having number average molecular weights of from 220 to about 2000 g/mol, dipropylene glycol, tripropylene glycol, and higher poly(propylene glycols) such as those having number average molecular weights of from 234 to about 2000 g/mol.

In certain embodiments, a reactive small molecule included in the inventive B-side mixtures comprises an alkoxylated derivative of a compound selected from the group consisting of: a diacid, a diol, or a hydroxy acid. In certain embodiments, the alkoxylated derivatives comprise ethoxylated or propoxylated compounds.

In certain embodiments, a reactive small molecule included in the inventive B-side mixtures comprises a polymeric diol. In certain embodiments, a polymeric diol is selected from the group consisting of polyethers, polyesters, hydroxy-terminated polyolefins, polyether-copolyesters, polyether polycarbonates, polycarbonate-copolyesters, and alkoxylated analogs of any of these. In certain embodiments, the polymeric diol has an average molecular weight less than about 2000 g/mol.

In some embodiments, a reactive small molecule included in the inventive B-side mixtures comprises a triol or higher polyhydric alcohol. In certain embodiments, a reactive small molecule is selected from the group consisting of: glycerol, 1,2,4-butanetriol, 2-(hydroxymethyl)-1,3-propanediol; hexane triols, trimethylol propane, trimethylol ethane, trimethylolhexane, 1,4-cyclohexanetrimethanol, pentaerythritol mono esters, pentaerythritol mono ethers, and alkoxylated analogs of any of these. In certain embodiments, alkoxylated derivatives comprise ethoxylated or propoxylated compounds.

In some embodiments, a reactive small molecule comprises a polyhydric alcohol with four to six hydroxy groups. In certain embodiments, a coreactant comprises dipentaerithrotol or an alkoxylated analog thereof. In certain embodiments, coreactant comprises sorbitol or an alkoxylated analog thereof.

In certain embodiments, a reactive small molecule comprises a hydroxy-carboxylic acid having the general formula $(HO)_xQ(COOH)_y$, wherein Q is a straight or branched hydrocarbon radical containing 1 to 12 carbon atoms, and x and y are each integers from 1 to 3. In certain embodiments, a coreactant comprises a diol carboxylic acid. In certain embodiments, a coreactant comprises a bis(hydroxylalkyl) alkanoic acid. In certain embodiments, a coreactant comprises a bis(hydroxylmethyl) alkanoic acid. In certain embodiments the diol carboxylic acid is selected from the group consisting of 2,2 bis-(hydroxymethyl)-propanoic acid (dimethylolpropionic acid, DMPA) 2,2-bis(hydroxymethyl) butanoic acid (dimethylolbutanoic acid; DMBA), dihydroxysuccinic acid (tartaric acid), and 4,4'-bis(hydroxyphenyl) valeric acid. In certain embodiments, a coreactant comprises an N,N-bis(2-hydroxyalkyl)carboxylic acid.

In certain embodiments, a reactive small molecule comprises a polyhydric alcohol comprising one or more amino groups. In certain embodiments, a reactive small molecule comprises an amino diol. In certain embodiments, a reactive small molecule comprises a diol containing a tertiary amino group. In certain embodiments, an amino diol is selected from the group consisting of: diethanolamine (DEA), N-methyldiethanolamine (MDEA), N-ethyldiethanolamine (EDEA), N-butyldiethanolamine (BDEA), N,N-bis(hydroxyethyl)-α-amino pyridine, dipropanolamine, diisopropanolamine (DIPA), N-methyldiisopropanolamine, Diisopropanol-p-toluidine, N,N-Bis(hydroxyethyl)-3-chloroaniline, 3-diethylaminopropane-1,2-diol, 3-dimethylaminopropane-1,2-diol and N-hydroxyethylpiperidine. In certain embodiments, a coreactant comprises a diol containing a quaternary amino group. In certain embodiments, a coreactant comprising a quaternary amino group is an acid salt or quatemized derivative of any of the amino alcohols described above.

In certain embodiments, a reactive small molecule is selected from the group consisting of: inorganic or organic polyamines having an average of about 2 or more primary and/or secondary amine groups, polyalcohols, ureas, and combinations of any two or more of these. In certain embodiments, a reactive small molecule is selected from the group consisting of: diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for practice in the present invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, and sulfonated primary and/or secondary amines. In certain embodiments, reactive small molecule is selected from the group consisting of: hydrazine, substituted hydrazines, hydrazine reaction products, and the like, and mixtures thereof. In certain embodiments, a reactive small molecule is a polyalcohol including those having from 2 to 12 carbon atoms, preferably from 2 to 8 carbon atoms, such as ethylene glycol, diethylene glycol, neopentyl glycol, butanediols, hexanediol, and the like, and mixtures thereof. Suitable ureas include urea and its derivatives, and the like, and mixtures thereof.

In certain embodiments, reactive small molecules containing at least one basic nitrogen atom are selected from the group consisting of: mono-, bis- or polyalkoxylated aliphatic, cycloaliphatic, aromatic or heterocyclic primary amines, N-methyl diethanolamine, N-ethyl diethanolamine, N-propyl diethanolamine, N-isopropyl diethanolamine, N-butyl diethanolamine, N-isobutyl diethanolamine, N-oleyl diethanolamine, N-stearyl diethanolamine, ethoxylated coconut oil fatty amine, N-allyl diethanolamine, N-methyl diisopropanolamine, N-ethyl diisopropanolamine, N-propyl diisopropanolamine, N-butyl diisopropanolamine, cyclohexyl diisopropanolamine, N,N-diethoxylaniline, N,N-diethoxyl toluidine, N,N-diethoxyl-1-aminopyridine, N,N'-diethoxyl piperazine, dimethyl-bis-ethoxyl hydrazine, N,N'-bis-(2-hydroxyethyl)-N,N'-diethylhexahydr op-phenylenediamine, N-12-hydroxyethyl piperazine, polyalkoxylated amines, propoxylated methyl diethanolamine, N-methyl-N,N-bis-3-aminopropylamine, N-(3-aminopropyl)-N,N'-dimethyl ethylenediamine, N-(3-aminopropyl)-N-methyl ethanolamine, N,N'-bis-(3-aminopropyl)-N,N'-dimethyl ethylenediamine, N,N'-bis-(3-aminopropyl)-piperazine, N-(2-aminoethyl)-piperazine, N, N'-bisoxyethyl propylenediamine, 2,6-diaminopyridine, diethanolaminoacetamide, diethanolamidopropionamide, N,N-bisoxyethylphenyl thiosemicarbazide, N,N-bis-oxyethylmethyl semicarbazide, p,p'-bis-aminomethyl dibenzyl methylamine, 2,6-diaminopyridine, 2-dimethylaminomethyl-2-methylpropanel, 3-diol. In certain embodiments, chain-extending agents are compounds that contain two amino groups. In certain embodiments, chain-extending agents are selected from the group consisting of: ethylene diamine, 1,6-hexamethylene diamine, and 1,5-diamino-1-methylpentane.

Additives

In addition to the above components, B-side mixtures of the present invention may optionally contain various additives as are known in the art of polyurethane foam technology. Such additives may include, but are not limited to compatibilizers, colorants, surfactants, flame retardants, antistatic compounds, antimicrobials, UV stabilizers, plasticizers, and cell openers.

—Colorants

In certain embodiments, B-side mixtures of the present invention comprise one or more suitable colorants. Many foam products are color coded during manufacture to identify product grade, to conceal yellowing, or to make a consumer product. The historical method of coloring foam was to blend in traditional pigments or dyes. Typical inorganic coloring agents included titanium dioxide, iron oxides and chromium oxide. Organic pigments originated from the azo/diazo dyes, phthalocyanines and dioxazines, as well as carbon black. Typical problems encountered with these colorants included high viscosity, abrasive tendencies, foam instability, foam scorch, migrating color and a limited range of available colors. Recent advances in the development of polyol-bound colorants are described in:

Miley, J. W.; Moore, P. D. "Reactive Polymeric Colorants For Polyurethane", Proceedings Of The SPI-26th Annual Technical Conference; Technomic: Lancaster, Pa., 1981; 83-86.

Moore, P. D.; Miley, J. W.; Bates, S. H.; "New Uses For Highly Miscible Liquid Polymeric Colorants In The Manufacture of Colored Urethane Systems"; Proceedings of the SPI-27th Annual Technical/Marketing Conference; Technomic: Lancaster, Pa., 1982; 255-261.

Bates, S. H.; Miley, J. W. "Polyol-Bound Colorants Solve Polyurethane Color Problems"; Proceedings Of The SPI-30th Annual Technical/Marketing Conference; Technomic: Lancaster, Pa., 1986; 160-165

Vielee, R. C.; Haney, T. V. "Polyurethanes"; In Coloring of Plastics; Webber, T. G., Ed., Wiley-Interscience: New York, 1979, 191-204.

—UV Stabilizers

In certain embodiments, B-side mixtures of the present invention comprise one or more suitable UV stabilizers. Polyurethanes based on aromatic isocyanates will typically turn dark shades of yellow upon aging with exposure to light. A review of polyurethane weathering phenomena is presented in: Davis, A.; Sims, D. Weathering Of Polymers; Applied Science: London, 1983, 222-237. The yellowing is not a problem for most foam applications. Light protection agents, such as hydroxybenzotriazoles, zinc dibutyl thiocarbamate, 2,6-ditertiary butylcatechol, hydroxybenzophenones, hindered amines and phosphites have been used to improve the light stability of polyurethanes. Color pigments have also been used successfully.

—Flame Retardants

In certain embodiments, B-side mixtures of the present invention comprise one or more suitable flame retardants. Low-density, open-celled flexible polyurethane foams have a large surface area and high permeability to air and thus will burn given the application of sufficient ignition source and oxygen. Flame retardants are often added to reduce this flammability. The choice of flame retardant for any specific foam often depends upon the intended service application of that foam and the attendant flammability testing scenario governing that application. Aspects of flammability that may be influenced by additives include the initial ignitability, burning rate and smoke evolution.

The most widely used flame retardants are the chlorinated phosphate esters, chlorinated paraffins and melamine powders. These and many other compositions are available from specialty chemical suppliers. A review of this subject has been given: Kuryla, W. C.; Papa, A. J. Flame Retardancy of Polymeric Materials, Vol. 3; Marcel Dekker: New York, 1975, 1-133.

—Bacteriostats

Under certain conditions of warmth and high humidity, polyurethane foams are susceptible to attack by microorganisms. When this is a concern, additives against bacteria, yeast or fungi are added to the foam during manufacture. In certain embodiments, B-side mixtures of the present invention comprise one or more suitable bacteriostats.

—Plasticizers

In certain embodiments, B-side mixtures of the present invention comprise one or more suitable plasticizers. Non-reactive liquids have been used to soften a foam or to reduce viscosity for improved processing. The softening effect can be compensated for by using a polyol of lower equivalent weight, so that a higher cross-linked polymer structure is obtained. These materials increase foam density and often adversely affect physical properties.

—Cell-Openers

In certain embodiments, B-side mixtures of the present invention comprise one or more suitable cell openers. In some polyurethane foams it is necessary to add cell-openers to obtain foam that does not shrink upon cooling. Known additives for inducing cell-opening include silicone-based antifoamers, waxes, finely divided solids, liquid perfluocarbons, paraffin oils, long-chain fatty acids and certain polyether polyols made using high concentrations of ethylene oxide.

—Antistatic Agents

In certain embodiments, B-side mixtures of the present invention comprise one or more suitable antistatic compounds. Some flexible foams are used in packaging, clothing and other applications where it is desired to minimize the electrical resistance of the foam so that buildup of static electrical charges is minimized. This has traditionally been accomplished through the addition of ionizable metal salts, carboxylic acid salts, phosphate esters and mixtures thereof. These agents function either by being inherently conductive or by absorbing moisture from the air. The desired net result is orders of magnitude reduction in foam surface resistivity.

—Compatibilizers

In certain embodiments, B-side mixtures of the present invention comprise one or more suitable compatibilizers. Compatibilizers are molecules that allow two or more non-miscible ingredients to come together and give a homogeneous liquid phase. Many such molecules are known to the polyurethane industry, these include: amides, amines, hydrocarbon oils, phthalates, polybutyleneglycols, and ureas.

Compositions of Specific B-Side Mixtures

In certain embodiments, the present invention encompasses B-side mixtures suitable for the formation of polyurethane foams wherein the B-side mixtures comprise:

100 parts by weight of a polyol component, wherein the polyol component comprises from about 5 weight percent to 100 weight percent of one or more of the aliphatic polycarbonate polyols described above and in the specific embodiments and examples herein;

0.01 to 20 parts by weight of one or more blowing agents as described above and in the specific embodiments and examples herein;

0 to 1 parts by weight of one or more catalysts as described above and in the specific embodiments and examples herein;

0 to 20 parts by weight of one or more reactive small molecules, wherein the reactive small molecules are substantially as described above and in the specific embodiments and examples herein; and 0 to 10 parts by weight of one or more additives, wherein the additives are selected from the group consisting of: compatibilizers, colorants, surfactants, flame retardants, antistatic compounds, antimicrobials, UV stabilizers, plasticizers, and cell openers substantially as described above and in the specific embodiments and examples herein.

In certain embodiments, the present invention encompasses a B-side mixture denoted PEC-1 wherein the polyol component comprises 5 to 100 weight percent poly(ethylene carbonate) polyol, said poly(ethylene carbonate) characterized in that it has an Mn less than about 7000 g/mol and greater than 99% hydroxyl end groups.

In certain embodiments, B-side mixtures PEC-B1 are characterized in that the poly(ethylene carbonate) polyol has an Mn less than about 5,000 g/mol, less than about 4,000 g/mol, less than about 3,000 g/mol, less than about 2,500 g/mol, or less than about 2,000 g/mol. In certain embodiments, the poly(ethylene carbonate) polyol has an Mn of between about 500 g/mol and about 3,000 g/mol. In certain embodiments, the poly(ethylene carbonate) polyol has an Mn of between about 500 g/mol and about 2,500 g/mol. In certain embodiments, the poly(ethylene carbonate) polyol has an Mn of between about 500 g/mol and about 2,000 g/mol.

In certain embodiments, B-side mixtures PEC-B1 are characterized in that the poly(ethylene carbonate) polyol has greater than 99%, greater than 99.5%, greater than 99.7%, greater than 99.8% or greater than about 99.9% —OH end groups.

In certain embodiments, B-side mixtures PEC-B1 are characterized in that the poly(ethylene carbonate) polyol has a polydispersity index (PDI) less than about 1.8. In certain embodiments, the poly(ethylene carbonate) polyol has a PDI less than about 1.5, less than about 1.4, less than about 1.3, or less than about 1.2. In certain embodiments, the poly(ethylene carbonate) polyol is characterized in that it has a PDI between about 1.05 and about 1.2.

In certain embodiments, B-side mixtures PEC-B1 are characterized in that the poly(ethylene carbonate) polyol contains, on average, greater than about 80% carbonate linkages. In certain embodiments, the poly(ethylene carbonate) polyol contains, on average, greater than about 85%, greater than about 90%, greater than about 92%, greater than about 95%, greater than about 97%, greater than about 98%, or greater than about 99% carbonate linkages. In certain embodiments, the poly(ethylene carbonate) polyol contains, on average, less than about 15% ether linkages. In certain embodiments, the % carbonate linkage and/or percent ether linkage characteristics are defined as being exclusive of any embedded chain transfer agent that may be embedded in the polycarbonate polyol chain.

In certain embodiments, B-side mixtures PEC-B1 are characterized in that the included poly(ethylene carbonate) polyol has a viscosity below 100,000 centipoise at 20 degrees celcius. In certain embodiments, poly(ethylene carbonate) polyol has a viscosity below 15,000 centipoise at 20 degrees celcius. In certain embodiments, the poly(ethylene carbonate) polyol has a viscosity below 10,000 centipoise, below 6,000 centipoise, or below 4,000 centipoise, all at 20 degrees celcius. In certain embodiments, the poly(ethylene carbonate) poly has a viscosity below 2,000 centipoise at 20 degrees celcius.

In certain embodiments, B-side mixtures PEC-B1 are further characterized in that the poly(ethylene carbonate) polyol has a formula P2c:

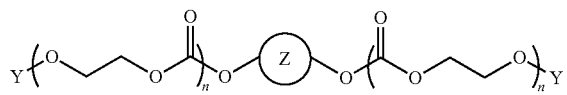

P2c wherein each —Y is —H, and each of

and n is as defined above and described in classes and subclasses herein.

In certain embodiments, B-side mixtures PEC-B1 are characterized in that the poly(ethylene carbonate) polyol has a formula Q1:

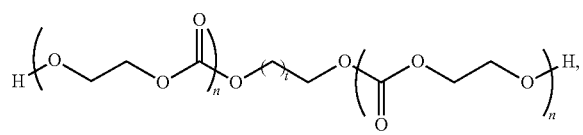

Q1 wherein t is an integer from 1 to 11 and n is as defined above and in the specific embodiments and examples herein.

In certain embodiments, where B-side compositions comprise polyols of formula Q1, t is an integer between 1 and 5. In certain embodiments, t is 1. In certain embodiments, t is 2. In certain embodiments, t is 3. In certain embodiments, t is 4. In certain embodiments, t is 5.

In certain embodiments, B-side mixtures PEC-B1 are characterized in that the poly(ethylene carbonate) polyol has a formula Q4:

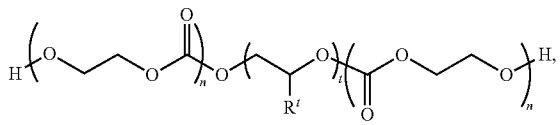

Q4 wherein $R^t$ is independently at each occurrence —H, or —CH$_3$, and each of n and t is as defined above and described in the specific examples and embodiments herein.

In certain embodiments, where B-side compositions comprise polyols of formula Q4, t is an integer between 1 and 3. In certain embodiments, t is 1. In certain embodiments, t is 2. In certain embodiments, t is 3.

In certain embodiments, the present invention encompasses a B-side mixture denoted PPC-1 containing 100 parts by weight of a polyol component, wherein the polyol component comprises 5 to 100 weight percent poly(propylene carbonate) polyol, said poly(propylene carbonate) characterized in that it has an Mn less than about 7000 g/mol and greater than 99% hydroxyl end groups.

In certain embodiments, B-side mixtures PPC-B1 are characterized in that the poly(propylene carbonate) polyol has an Mn less than about 5,000 g/mol, less than about 4,000 g/mol, less than about 3,000 g/mol, less than about 2,500 g/mol, or less than about 2,000 g/mol. In certain embodiments, the poly(propylene carbonate) polyol has an Mn of between about 500 g/mol and about 3,000 g/mol. In certain embodiments, the poly(propylene carbonate) polyol has an Mn of between about 500 g/mol and about 2,500 g/mol. In certain embodiments, the poly(propylene carbonate) polyol has an Mn of between about 500 g/mol and about 2,000 g/mol.

In certain embodiments, B-side mixtures PPC-B1 are characterized in that the poly(propylene carbonate) polyol has greater than 99%, greater than 99.5%, greater than 99.7%, greater than 99.8% or greater than about 99.9% —OH end groups.

In certain embodiments, B-side mixtures PPC-B1 are further characterized in that the poly(propylene carbonate) polyol has a polydispersity index (PDI) less than about 1.8. In certain embodiments, the poly(propylene carbonate) polyol has a PDI less than about 1.5, less than about 1.4, less than about 1.3, or less than about 1.2. In certain embodiments, the poly(propylene carbonate) polyol is characterized in that it has a PDI between about 1.05 and about 1.2.

In certain embodiments, B-side mixtures PPC-B1 are further characterized in that the poly(propylene carbonate) polyol contains, on average, greater than about 90% carbonate linkages. In certain embodiments, the poly(ethylene carbonate) polyol contains, on average, greater than about 95%, greater than about 97%, greater than about 98%, greater than about 99%, greater than about 99.5%, or greater than about 99.9%, carbonate linkages.

In certain embodiments, the poly(propylene carbonate) polyol contains no detectable ether linkages. In certain embodiments, the % carbonate linkage and/or percent ether linkage characteristics are defined as being exclusive of any embedded chain transfer agent that may be embedded in the polycarbonate polyol chain.

In certain embodiments, B-side mixtures PPC-B1 are further characterized in that the included poly(propylene carbonate) polyol has a viscosity below about 100,000 centipoise at 20 degrees celcius. In certain embodiments, the poly(ethylene carbonate) polyol has a viscosity below 30,000 centipoise, below 15,000 centipoise, or below 12,000 centipoise, all at 20 degrees celcius. In certain embodiments, the poly(ethylene carbonate) poly has a viscosity below 10,000 centipoise, 8,000 centipoise, or 6,000 centipoise at 20 degrees celcius.

In certain embodiments, B-side mixtures PPC-B1 are further characterized in that the poly(propylene carbonate) polyol has a formula P2a:

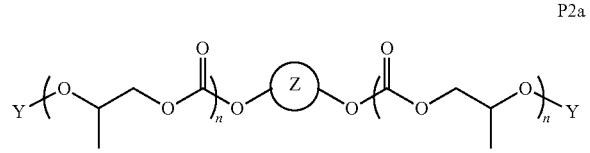

P2a wherein each —Y is —H, and each of

and n is as defined above and described in classes and subclasses herein.

In certain embodiments, B-side mixtures PPC-B1 are characterized in that the poly(ethylene carbonate) polyol has a formula Q2:

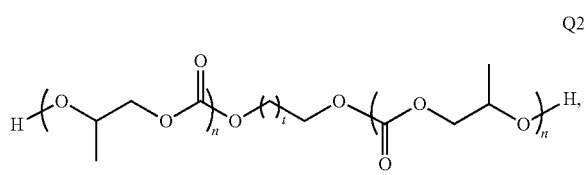

Q2 wherein each of t and n is as defined above and in the specific embodiments and examples herein.

In certain embodiments, where B-side compositions comprise polyols of formula Q2, t is an integer between 1 and 5. In certain embodiments, t is 1. In certain embodiments, t is 2. In certain embodiments, t is 3. In certain embodiments, t is 4. In certain embodiments, t is 5.

In certain embodiments, B-side mixtures PPC-B1 are characterized in that the poly(ethylene carbonate) polyol has a formula Q5:

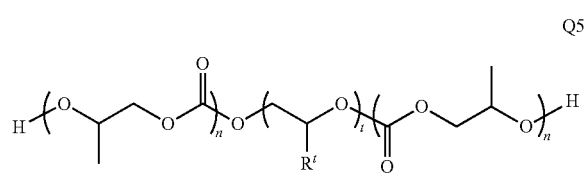

Q5 wherein $R^t$ is independently at each occurrence —H, or —CH$_3$, and each of n and t is as defined above and described in the specific examples and embodiments herein.

In certain embodiments, where B-side compositions comprise polyols of formula Q5, t is an integer between 1 and 3. In certain embodiments, t is 1. In certain embodiments, t is 2. In certain embodiments, t is 3.

In certain embodiments B-side mixtures PEC-B1 and PPC-B1 are characterized in that polyol component of the mixtures contain from about 5% to 100% of the described aliphatic polycarbonate polyol, with the balance (if any) comprising one or more polyols typically used for polyurethane foam formulation.

In certain embodiments where B-side mixtures PEC-B1 and PPC-B1 contain less than 100% aliphatic polycarbonate polyol, the balance comprises a polyol selected from the group consisting of polyether polyols, polyester polyols, and combinations of these. In certain embodiments, the balance comprises a polyether polyol. In certain embodiments, the balance comprises a polyester polyol.

IV. Foam Compositions

In another aspect, the present invention encompasses foams derived from one or more of aliphatic polycarbonate polyol compositions described above and in the specific embodiments and examples disclosed herein. In certain embodiments, the foam compositions comprise the reaction product of one or more polyisocyanates and a B-side mixture containing one or more of the aliphatic polycarbonate polyol compositions defined above.

A. Flexible Foam Compositions

In one aspect, the present invention encompasses flexible foam compositions. In certain embodiments, such flexible foam compositions are derived from a B-side mixture containing one or more of the aliphatic polycarbonate polyol compositions as defined above and in the embodiments and examples herein.

In certain embodiments the flexible foam compositions comprise the reaction product of an A-side composition comprising polyfunctional isocyanates with a B-side mixture of type PEC-B1, described above.

In certain embodiments the flexible foam compositions comprise the reaction product of an A-side composition comprising polyfunctional isocyanates with a B-side mixture of type PPC-B1, described above.

Preferred B-side formulations for flexible foams have viscosities below 100,000 centipoise, preferably below 6,000 centipoise at 20 degrees celcius. Preferred B-side polyols have OH numbers between 28 and 112. Preferred B-side polyols have acid numbers below 1. Preferred B-side polyols have functionalities between 1.9 and 3.0. Preferred A-side formulations have isocyanate functionalities below 2.7.

Preferred finished flexible foams have Indentation Force Deflection values targeted for specific end markets. The preferred force in pounds required to indent a 50 square inch round indentor to 25% on a 15" by 15" by 4" foam sample are: 6-12 pounds for bed pillows and thick back pillows; 12-18 pounds for back pillows, upholstery padding, and wraps; 18-24 pounds for thin back pillows, tufting matrix, very thick seat cushions, and wraps. In some embodiments, finished foams have compression set values below 20%, and more preferred below 15%, with most preferred below 10%. Typical densities for finished flexible molded foams are between 2 and 3 pounds per cubic foot, and typical densities for finished flexible slabstock foams between 1 and 4 pounds per cubic foot, with most applications between 1 and 2 pounds per cubic foot.

B. Microcellular Foam Compositions

In one aspect, the present invention encompasses microcellular foam compositions. In certain embodiments, such microcellular foam compositions are derived from a B-side mixture containing one or more of the aliphatic polycarbonate polyol compositions as defined above and in the embodiments and examples herein.

In certain embodiments the microcellular foam compositions comprise the reaction product of an A-side composition comprising polyfunctional isocyanates with a B-side mixture of type PEC-B1, described above.

In certain embodiments the microcellular foam compositions comprise the reaction product of an A-side composition comprising polyfunctional isocyanates with a B-side mixture of type PPC-B1, described above.

In certain embodiments, B-side formulations for microcellular foams have viscosities below 100,000 centipoise, preferably below 6,000 centipoise at 20 degrees celcius. Preferred B-side polyols have OH numbers between 28 and 112. Preferred B-side polyols have acid numbers below 1. Preferred B-side polyols have functionalities between 1.9 and 3.0. Preferred A-side formulations have isocyanate functionalities below 2.7, most preferred between 2.0 and 2.5. Preferred finished microcellular foams have closed cells and are between 0.2-0.7 grams per cubic centimeter.

C. Rigid Foam Compositions

In one aspect, the present invention encompasses rigid foam compositions. In certain embodiments, such rigid foam compositions are derived from a B-side mixture containing one or more of the aliphatic polycarbonate polyol compositions as defined above and in the embodiments and examples herein.

In certain embodiments the rigid foam compositions comprise the reaction product of an A-side composition comprising polyfunctional isocyanates with a B-side mixture of type PEC-B1, described above.

In certain embodiments the rigid foam compositions comprise the reaction product of an A-side composition comprising polyfunctional isocyanates with a B-side mixture of type PPC-B1, described above.

In certain embodiments, B-side formulations for rigid foams have viscosities below 100,000 centipoise, preferably below 40,000 centipoise, and most preferably below 12,000 centipoise. Preferred B-side formulations have OH numbers between approximately 250 and 500. Typical B-side polyols have functionalities between 2 and 8. Preferred A-side formulations have isocyanate functionalities between 2.3 and 3.5.

In some embodiments, finished rigid foams have high insulating values, typically expressed as a "k value." Preferably, these k values are <0.25 watts/(mK), more preferred k vales of <0.20 watts/(mK), most preferred <0.15 watts/(mK). Some preferred rigid foams have combustion modification requirements, such as achieving a Class 1 Flammability performance on the UL 723 test.

D. Elastomer Compositions

In another aspect, the present invention encompasses polyurethane elastomers derived from one or more of aliphatic polycarbonate polyol compositions described above and in the specific embodiments and examples disclosed herein. In certain embodiments, the polyurethane elastomer compositions comprise the reaction product of one or more polyisocyanates and a B-side mixture containing one or more of the aliphatic polycarbonate polyol compositions defined above.

In certain embodiments, B-side formulations for elastomers have viscosities below 100,000 centipoise, preferably below 6,000 centipoise at 20 degrees celcius. Preferred B-side polyols have OH numbers between 28 and 112. Preferred B-side polyols have acid numbers below 1. Preferred B-side polyols have functionalities between 1.9 and 3.0. Preferred A-side formulations have isocyanate functionalities below 2.7.

E. Thermoplastic Compositions

In another aspect, the present invention encompasses thermoplastic compositions derived from one or more of aliphatic polycarbonate polyol compositions described above.

In certain embodiments, B-side formulations for thermoplastic elastomers have viscosities below 1,000,000 centipoise, preferably below 6,000 centipoise at 20 degrees celcius. Preferred B-side polyols have OH numbers between 28 and 112. Preferred B-side polyols have acid numbers below 1. Preferred B-side polyols have functionalities between 1.9 and 2.1. Preferred A-side formulations have isocyanate functionalities between 1.9 and 2.1.

EXAMPLES

The present invention is illustrated by the following examples. It is to be understood that the particular examples, materials, amounts, and procedures are to be interpreted broadly in accordance with the scope and spirit of the invention as set forth herein.

Presented below are the formulations of a variety of polyurethane foams and elastomers. These materials were made using aliphatic polycarbonate polyols as defined hereinabove. Specifically, the aliphatic polycarbonate polyols used and identified in the examples below have the following properties:

NOV-61-151 is a poly(propylene carbonate) polyol initiated with dipropylene glycol and having an Mn of 807 g/mol, a PDI of 1.276, greater than 99% —OH end groups, greater than 99% carbonate linkages (exclusive of the ether bond in the dipropylene glycol). This polyol conforms to formula P2B:

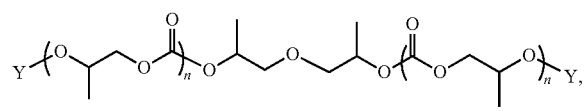

where each —Y is —H, and n is on average in the composition approximately 3.3.

NOV-53-047 is a poly(ethylene carbonate) polyol initiated with Fomrez® 11-112, a commercially available polyester polyol (~1,000 g/mol poly(diethylene glycol adipate)). The PEC polyol has an Mn of 1748 g/mol, a PDI of 1.76, contains greater than 99% —OH end groups and contains approximately 85% carbonate linkages (excluding the starter). This material conforms to formula Q8a:

where q is, on average in the composition, approximately 4.4, and n is, on average in the composition, approximately 4.3.

NOV-53-053 is a poly(ethylene carbonate) polyol initiated with Fomrez® 11-112 and having an Mn of 2486 g/mol, a PDI of 1.41, containing greater than 99% —OH end groups and having approximately 85% carbonate linkages (excluding the starter). This material conforms to formula Q8a, where q is, on average in the composition, approximately 4.4, and n is on average in the composition approximately 8.4.

NOV-53-050 is a poly(ethylene carbonate) polyol initiated with Voranol® 220-110N a polyether polyol (polypropylene oxide capped with polyethylene oxide ~1,000 g/mol). The polyol has an Mn of 2656 g/mol, a PDI of 1.10, contains greater than 99% —OH end groups and approximately 85% carbonate linkages (excluding the starter). This material conforms to formula Q7b:

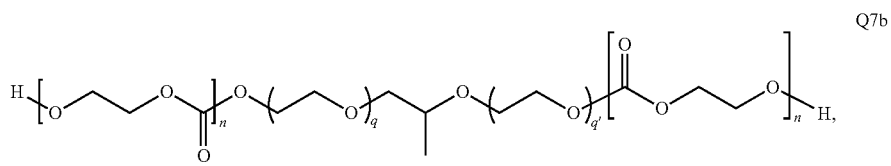

where q and q' are, on average in the composition, approximately 8, and n is on average in the composition approximately 5.3.

NOV-53-052 is a poly(ethylene carbonate) polyol initiated with Voranol® 220-110N and having an Mn of 1938 g/mol, a PDI of 1.11, containing greater than 99% —OH end groups and approximately 85% carbonate linkages (excluding the starter). This material conforms to formula Q7b, where q and q' are, on average in the composition, approximately 8, and n is on average in the composition approximately 9.4.

Example 1, Flexible Foam Formulations

In Example 1, a series of flexible polyurethane foams were formulated and a qualitative assessment of their performance was completed. In all cases, the procedure for making these foams is as follows. First, all B-side components were dispensed in precise quantities into a cup, including all polyols, catalysts and other additives, and water as a blowing agent. They were then hand-mixed using a wooden stirring tool at room temperature for a minimum of 30 seconds, until the mixture was fully uniform. After the B-side was uniform, the A-side was added and the mixture was again mixed by hand for a minimum of 15 seconds. After the full formulation was well mixed, the mixture was transferred to a new cup and allowed to rise. The foams were then allowed to cure at room temperature. In the tables below, "Time to Cream" refers to the time elapsed after the

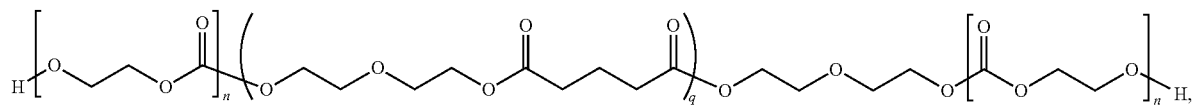

A-side was added to complete the mixture until the mixture began to bubble, as indicated by the mixture becoming opaque. "Time to Gel" is the amount of time after the A-side was added until the polyurethane foam network began to form, as indicated by pressing on the foam with the mixing tool. "Time to Rise" is the amount of time after the A-side was added until the foam completed its full rise.

larger samples 2L, 2M, and 2N, a mechanical mixer at 1,100 RPM was used to complete the mixing of the B-side. After the B-side was uniform, the A-side was added and the mixture was again mixed for a minimum of 15 seconds, by hand in most cases and using the 1,100 RPM mechanical mixer for samples 2L, 2M, and 2N. After the full formulation was well-mixed, the mixture was poured into a cup or,

| Flexible Foam Example 1A | | | Flexible Foam Example 1B | | |
|---|---|---|---|---|---|
| Component | Description | Grams | Component | Description | Grams |
| Mondur MRS | Polymeric MDI rich in 2,4'-MDI isomer, 2.6 functional | 40.85 | Mondur MRS | Polymeric MDI rich in 2,4'-MDI isomer, 2.6 functional | 38.95 |
| Nov-53-052 | PEC Polyol, 1940 Mw, 1.1 PDI, 2.0 Functional | 56.95 | Nov-53-052 | PEC Polyol, 1940 Mw, 1.1 PDI, 2.0 Functional | 56.95 |
| water | Water as a blowing agent | 2.28 | water | Water as a blowing agent | 2.28 |
| T12 | Gelling catalyst, dibutyl tin dilaurate | 0.09 | T12 | Gelling catalyst, dibutyl tin dilaurate | 0.09 |
| Dabco 33LV | Blowing catalyst, 33% Triethylene diamine in 67% dipropylene glycol | 0.16 | Dabco 33LV | Blowing catalyst, 33% Triethylene diamine in 67% dipropylene glycol | 0.16 |
| DC5160 | Silicon surfactant, general polyurethane foam use | 0.57 | DC5160 | Silicon surfactant, general polyurethane foam use | 0.57 |
| Results | | | Results | | |
| 55 | Time to cream | | 45 | Time to cream | |
| 2:40 | Time to gel | | 2:30 | Time to gel | |
| 3:20 | Time to rise | | 2:50 | Time to rise | |
| | Foam reacts and rises OK, some shrinkage 1 hour, much shrinkage overnight | | | Foam reacts and rises OK, some shrinkage 1 hour, much shrinkage overnight | |

| Flexible Foam Example 1C | | | Flexible Foam Example 1D | | |
|---|---|---|---|---|---|
| Component | Description | Grams | Component | Description | Grams |
| Mondur MRS | Polymeric MDI rich in 2,4'-MDI isomer, 2.6 functional | 38.40 | Mondur MRS | Polymeric MDI rich in 2,4'-MDI isomer, 2.6 functional | 38.25 |
| | | | PEC | 3500 Mw PEC, 1.1 PDI, 2.0 functional | 28.48 |
| Nov-53-050 | PEC Polyol, 2660 Mw, 1.1 PDI, 2.0 Functional | 56.95 | Nov-53-053 | PEC Polyol, 2500 Mw, 1.4 PDI, 2.0 Functional | 28.48 |
| water | Water as a blowing agent | 2.28 | water | Water as a blowing agent | 2.28 |
| T12 | Gelling catalyst, dibutyl tin dilaurate | 0.09 | T12 | Gelling catalyst, dibutyl tin dilaurate | 0.09 |
| Dabco 33LV | Blowing catalyst, 33% Triethylene diamine in 67% dipropylene glycol | 0.16 | Dabco 33LV | Blowing catalyst, 33% Triethylene diamine in 67% dipropylene glycol | 0.16 |
| DC 5160 | Silicon surfactant, general polyurethane foam use | 0.57 | DC 5160 | Silicon surfactant, general polyurethane foam use | 0.57 |
| Results | | | Results | | |
| 35 | Time to cream | | 40 | Time to cream | |
| 2:09 | Time to gel | | 2:02 | Time to gel | |
| 2:35 | Time to rise | | 0:00 | Time to rise | |
| | Foam reacts and rises OK, some shrinkage 1 hour, much shrinkage overnight | | | Foams nicely, no shrinkage, probably foam is too stiff to shrink | |

Example 2, Microcellular Foam Formulations

In Example 2, a series of microcellular polyurethane foams were formulated and a qualitative assessment of their performance was completed. The procedure for making these foams is as follows. First, all B-side components were dispensed in precise quantities into a cup, including all polyols, catalysts and other additives, and water as a blowing agent. Most of the samples were then hand-mixed using a wooden stirring tool at room temperature for a minimum of 30 seconds, until the mixture was fully uniform. For the larger samples 2L, 2M, and 2N, a mechanical mixer at 1,100 RPM was used to complete the mixing of the B-side. After the B-side was uniform, the A-side was added and the mixture was again mixed for a minimum of 15 seconds, by hand in most cases and using the 1,100 RPM mechanical mixer for samples 2L, 2M, and 2N. After the full formulation was well-mixed, the mixture was poured into a cup or, in the cases of 2L, 2M, and 2N, into an aluminum mold. The foams were then allowed to cure at room temperature. In the tables below, "Time to Cream" refers to the time elapsed after the A-side was added to complete the mixture until the mixture began to bubble, as indicated by the mixture becoming opaque. "Time to Gel" is the amount of time after the A-side was added until the polyurethane foam network began to form, as indicated by pressing on the foam with the mixing tool. "Time to Rise" is the amount of time after the A-side was added until the foam completed its full rise.

| Microcellular Foam Example 2A | | | |
|---|---|---|---|
| Component | Description | Grams | |
| Suprasec 9612 | MDI prepolymer w/polyester polyol, 2.01 functional | 29.64 | |
| Nov-53-047 | PEC Polyol, 1750 Mw, 1.76 PDI, 2.0 Functional | 40.00 | |
| water | Water as a blowing agent | 0.12 | |
| EG | Ethylene Glycol | 2.00 | |
| BD | Butanediol | 0.00 | |
| T12 | Gelling catalyst, dibutyl tin dilaurate | 0.04 | |
| Dabco 1027 | Blowing catalyst, tertiary amine in 30% ethylene glycol | 0.04 | |
| Dabco 1028 | Blowing catalyst, tertiary amine catalyst in butane diol | 0.00 | |
| DC193 | Silicone surfactant, used primarily in shoe soles | 0.40 | |
| DC3043 | Silicone surfactant, used for microcellular foam | 0.00 | |

| Results | |
|---|---|
| 39 | Time to cream |
| 0 | Time to gel |
| 3:00 | Time to rise |
| | Foam rises ok, shrinks back in less than 1 hour, 50% shrinkage overnight. |

| Microcellular Foam Example 2B | | |
|---|---|---|
| Component | Description | Grams |
| Suprasec 9612 | MDI prepolymer w/polyester polyol, 2.01 functional | 29.64 |
| Nov-53-047 | PEC Polyol, 1750 Mw, 1.76 PDI, 2.0 Functional | 40.00 |
| water | Water as a blowing agent | 0.12 |
| EG | Ethylene Glycol | 2.00 |
| BD | Butanediol | 0.00 |
| T12 | Gelling catalyst, dibutyl tin dilaurate | 0.04 |
| Dabco 1027 | Blowing catalyst, tertiary amine in 30% ethylene glycol | 0.03 |
| Dabco 1028 | Blowing catalyst, tertiary amine catalyst in butane diol | 0.00 |
| DC193 | Silicone surfactant, used primarily in shoe soles | 0.40 |
| DC3043 | Silicone surfactant, used for microcellular foam | 0.00 |

| Results | |
|---|---|
| 29 | Time to cream |
| 0 | Time to gel |
| 2:00 | Time to rise |
| | Foam rises ok, shrinks back in less than 1 hour, 50% shrinkage overnight, with cracks in foam. |

| Microcellular Foam Example 2C | | |
|---|---|---|
| Component | Description | Grams |
| Suprasec 9612 | MDI prepolymer w/polyester polyol, 2.01 functional | 26.50 |
| Nov-53-053 | PEC Polyol, 2500 Mw, 1.4 PDI, 2.0 Functional | 40.00 |
| water | Water as a blowing agent | 0.12 |
| EG | Ethylene Glycol | 2.00 |
| BD | Butanediol | 0.00 |
| T12 | Gelling catalyst, dibutyl tin dilaurate | 0.04 |
| Dabco 1027 | Blowing catalyst, tertiary amine in 30% ethylene glycol | 0.04 |
| Dabco 1028 | Blowing catalyst, tertiary amine catalyst in butane diol | 0.00 |
| DC193 | Silicone surfactant, used primarily in shoe soles | 0.00 |
| DC3043 | Silicone surfactant, used for microcellular foam | 0.40 |

| Results | |
|---|---|
| 39 | Time to cream |
| 1.28 | Time to gel |
| 2:20 | Time to rise |
| | Foam rises Ok, shows shrink within an hour shrinks back 50% overnight |

| Microcellular Foam Example 2D | | |
|---|---|---|
| Component | Description | Grams |
| Suprasec 9612 | MDI prepolymer w/polyester polyol, 2.01 functional | 26.50 |
| Nov-53-053 | PEC Polyol, 2500 Mw, 1.4 PDI, 2.0 Functional | 40.00 |
| water | Water as a blowing agent | 0.12 |
| EG | Ethylene Glycol | 2.00 |
| BD | Butanediol | 0.00 |
| T12 | Gelling catalyst, dibutyl tin dilaurate | 0.03 |
| Dabco 1027 | Blowing catalyst, tertiary amine in 30% ethylene glycol | 0.04 |
| Dabco 1028 | Blowing catalyst, tertiary amine catalyst in butane diol | 0.00 |
| DC193 | Silicone surfactant, used primarily in shoe soles | 0.00 |
| DC3043 | Silicone surfactant, used for microcellular foam | 0.40 |

| Results | |
|---|---|
| 39 | Time to cream |
| 1.23 | Time to gel |
| 2:10 | Time to rise |
| | Foam rises OK, shrinks 50% overnight |

| Microcellular Foam Example 2E | | |
|---|---|---|
| Component | Description | Grams |
| Suprasec 9612 | MDI prepolymer w/polyester polyol, 2.01 functional | 16.00 |
| Mondur MRS | Polymeric MDI rich in 2,4'-MDI isomer, 2.6 functional | 6.50 |
| Nov-53-053 | PEC Polyol, 2500 Mw, 1.4 PDI, 2.0 Functional | 40.00 |
| water | Water as a blowing agent | 0.12 |
| EG | Ethylene Glycol | 2.00 |
| BD | Butanediol | 0.00 |
| T12 | Gelling catalyst, dibutyl tin dilaurate | 0.04 |
| Dabco 1027 | Blowing catalyst, tertiary amine in 30% ethylene glycol | 0.04 |
| Dabco 1028 | Blowing catalyst, tertiary amine catalyst in butane diol | 0.00 |

| Microcellular Foam Example 2F | | |
|---|---|---|
| Component | Description | Grams |
| Suprasec 9612 | MDI prepolymer w/polyester polyol, 2.01 functional | 25.69 |
| Nov-53-050 | PEC Polyol, 2660 Mw, 1.1 PDI, 2.0 Functional | 40.00 |
| water | Water as a blowing agent | 0.12 |
| EG | Ethylene Glycol | 2.00 |
| BD | Butanediol | 0.00 |
| T12 | Gelling catalyst, dibutyl tin dilaurate | 0.04 |
| Dabco 1027 | Blowing catalyst, tertiary amine in 30% ethylene glycol | 0.04 |
| Dabco 1028 | Blowing catalyst, tertiary amine catalyst in butane diol | 0.00 |

-continued

| | | | | | | |
|---|---|---|---|---|---|---|
| DC193 | Silicone surfactant, used primarily in shoe soles | 0.00 | DC193 | Silicone surfactant, used primarily in shoe soles | 0.00 |
| DC3043 | Silicone surfactant, used for microcellular foam | 0.40 | DC3043 | Silicone surfactant, used for microcellular foam | 0.40 |

| Results | | | Results | | |
|---|---|---|---|---|---|
| 36 | Time to cream | | 38 | Time to cream | |
| 1:22 | Time to gel | | 0 | Time to gel | |
| 2:00 | Time to rise | | 1:35 | Time to rise | |
| | Foam looks good, shrinks 30% overnight | | | Foam looks good, shrinks about 20% overnight | |

| Microcellular Foam Example 2G | | | Microcellular Foam Example 2H | | |
|---|---|---|---|---|---|
| Component | Description | Grams | Component | Description | Grams |
| Suprasec 9612 | MDI prepolymer w/polyester polyol, 2.01 functional | 28.86 | Suprasec 9612 | MDI prepolymer w/polyester polyol, 2.01 functional | 17.86 |
| | | | MM103 | Modified MDI, 2.15 functional | 7.15 |
| Nov-53-052 | PEC Polyol, 1940 Mw, 1.1 PDI, 2.0 Functional | 40.00 | Nov-53-052 | PEC Polyol, 1940 Mw, 1.1 PDI, 2.0 Functional | 40.00 |
| water | Water as a blowing agent | 0.12 | water | Water as a blowing agent | 0.12 |
| EG | Ethylene Glycol | 2.00 | EG | Ethylene Glycol | 2.00 |
| BD | Butanediol | 0.00 | BD | Butanediol | 0.00 |
| T12 | Gelling catalyst, dibutyl tin dilaurate | 0.04 | T12 | Gelling catalyst, dibutyl tin dilaurate | 0.04 |
| Dabco 1027 | Blowing catalyst, tertiary amine in 30% ethylene glycol | 0.04 | Dabco 1027 | Blowing catalyst, tertiary amine in 30% ethylene glycol | 0.04 |
| Dabco 1028 | Blowing catalyst, tertiary amine catalyst in butane diol | 0.00 | Dabco 1028 | Blowing catalyst, tertiary amine catalyst in butane diol | 0.00 |
| DC193 | Silicone surfactant, used primarily in shoe soles | 0.00 | DC193 | Silicone surfactant, used primarily in shoe soles | 0.40 |
| DC3043 | Silicone surfactant, used for microcellular foam | 0.40 | DC3043 | Silicone surfactant, used for microcellular foam | 0.00 |

| Results | | | Results | | |
|---|---|---|---|---|---|
| 36 | Time to cream | | 40 | Time to cream | |
| 1:08 | Time to gel | | 1:08 | Time to gel | |
| 1:40 | Time to rise | | 1:35 | Time to rise | |
| | Foam rises ok, shrinks 30-40% overnight, soft and crumbly | | | Foam looked good, but shrank 30-40% overnight | |

| Microcellular Foam Example 2I | | | Microcellular Foam Example 2J | | |
|---|---|---|---|---|---|
| Component | Description | Grams | Component | Description | Grams |
| Suprasec 9612 | MDI prepolymer w/polyester polyol, 2.01 functional | 0.00 | Suprasec 9612 | MDI prepolymer w/polyester polyol, 2.01 functional | 0.00 |
| MM103 | Modified MDI, 2.15 functional | 17.04 | MM103 | Modified MDI, 2.15 functional | 19.05 |
| Nov-53-053 | PEC Polyol, 2500 Mw, 1.4 PDI, 2.0 Functional | 40.00 | Nov-53-053 | PEC Polyol, 2500 Mw, 1.4 PDI, 2.0 Functional | 40.00 |
| water | Water as a blowing agent | 0.12 | water | Water as a blowing agent | 0.24 |
| EG | Ethylene Glycol | 2.00 | EG | Ethylene Glycol | 2.00 |
| BD | Butanediol | 0.00 | BD | Butanediol | 0.00 |
| T12 | Gelling catalyst, dibutyl tin dilaurate | 0.04 | T12 | Gelling catalyst, dibutyl tin dilaurate | 0.04 |
| Dabco 1027 | Blowing catalyst, tertiary amine in 30% ethylene glycol | 0.04 | Dabco 1027 | Blowing catalyst, tertiary amine in 30% ethylene glycol | 0.04 |
| Dabco 1028 | Blowing catalyst, tertiary amine catalyst in butane diol | 0.00 | Dabco 1028 | Blowing catalyst, tertiary amine catalyst in butane diol | 0.00 |
| DC193 | Silicone surfactant, used primarily in shoe soles | 0.40 | DC193 | Silicone surfactant, used primarily in shoe soles | 0.40 |
| DC3043 | Silicone surfactant, used for microcellular foam | 0.00 | DC3043 | Silicone surfactant, used for microcellular foam | 0.00 |

| Results | | | Results | | |
|---|---|---|---|---|---|
| 36 | Time to cream | | 36 | Time to cream | |
| 52 | Time to gel | | 53 | Time to gel | |
| 1:15 | Time to rise | | 1:20 | Time to rise | |
| | Reacts fast, tough to pour after mixing. 10% shrinkage overnight | | | Foam looks OK, still tacky after 10 min. 10% shrinkage overnight | |

|  | Microcellular Foam Example 2K | | | Microcellular Foam Example 2L | | |
|---|---|---|---|---|---|---|
| Component | Description | Grams | Component | Description | | Grams |
| Suprasec 9612 | MDI prepolymer w/polyester polyol, 2.01 functional | 24.33 | Suprasec 9612 | MDI prepolymer w/polyester polyol, 2.01 functional | | 87.53 |
| MM103 | Modified MDI, 2.15 functional | 2.80 | MM103 | Modified MDI, 2.15 functional | | 10.50 |
| Nov-53-050 | PEC Polyol, 2660 Mw, 1.1 PDI, 2.0 Functional | 40.00 | Nov-53-050 | PEC Polyol, 2660 Mw, 1.1 PDI, 2.0 Functional | | 150.00 |
| water | Water as a blowing agent | 0.24 | water | Water as a blowing agent | | 0.75 |
| EG | Ethylene Glycol | 2.00 | EG | Ethylene Glycol | | 7.50 |
| BD | Butanediol | 0.00 | BD | Butanediol | | 0.00 |
| T12 | Gelling catalyst, dibutyl tin dilaurate | 0.04 | T12 | Gelling catalyst, dibutyl tin dilaurate | | 0.08 |
| Dabco 1027 | Blowing catalyst, tertiary amine in 30% ethylene glycol | 0.04 | Dabco 1027 | Blowing catalyst, tertiary amine in 30% ethylene glycol | | 0.15 |
| Dabco 1028 | Blowing catalyst, tertiary amine catalyst in butane diol | 0.00 | Dabco 1028 | Blowing catalyst, tertiary amine catalyst in butane diol | | 0.00 |
| DC193 | Silicone surfactant, used primarily in shoe soles | 0.40 | DC193 | Silicone surfactant, used primarily in shoe soles | | 1.65 |
| DC3043 | Silicone surfactant, used for microcellular foam | 0.00 | DC3043 | Silicone surfactant, used for microcellular foam | | 0.00 |
| Results | | | Results | | | |
| 43 | Time to cream | | 0 | Time to cream | | |
| 1:07 | Time to gel | | 0 | Time to gel | | |
| 2:10 | Time to rise | | 0:00 | Time to rise | | |
| | Foam looks good, <10% shrinkage overnight | | | Pouring plaque mold. Plaque looks good, small shrinkage <10% noted on demold | | |

|  | Microcellular Foam Example 2M | | | Microcellular Foam Example 2N | | |
|---|---|---|---|---|---|---|
| Component | Description | Grams | Component | Description | | Grams |
| Suprasec 9612 | MDI prepolymer w/polyester polyol, 2.01 functional | 99.38 | Suprasec 9612 | MDI prepolymer w/polyester polyol, 2.01 functional | | 0.00 |
| MM103 | Modified MDI, 2.15 functional | 10.50 | MM103 | Modified MDI, 2.15 functional | | 69.02 |
| Nov-53-052 | PEC Polyol, 1940 Mw, 1.1 PDI, 2.0 Functional | 150.00 | Nov-53-053 | PEC Polyol, 2500 Mw, 1.4 PDI, 2.0 Functional | | 150.00 |
| water | Water as a blowing agent | 0.75 | water | Water as a blowing agent | | 0.75 |
| EG | Ethylene Glycol | 7.50 | EG | Ethylene Glycol | | 7.50 |
| BD | Butanediol | 0.00 | BD | Butanediol | | 0.00 |
| T12 | Gelling catalyst, dibutyl tin dilaurate | 0.08 | T12 | Gelling catalyst, dibutyl tin dilaurate | | 0.05 |
| Dabco 1027 | Blowing catalyst, tertiary amine in 30% ethylene glycol | 0.15 | Dabco 1027 | Blowing catalyst, tertiary amine in 30% ethylene glycol | | 0.10 |
| Dabco 1028 | Blowing catalyst, tertiary amine catalyst in butane diol | 0.00 | Dabco 1028 | Blowing catalyst, tertiary amine catalyst in butane diol | | 0.00 |
| DC193 | Silicone surfactant, used primarily in shoe soles | 1.65 | DC193 | Silicone surfactant, used primarily in shoe soles | | 1.65 |
| DC3043 | Silicone surfactant, used for microcellular foam | 0.00 | DC3043 | Silicone surfactant, used for microcellular foam | | 0.00 |
| Results | | | Results | | | |
| 0 | Time to cream | | 0 | Time to cream | | |
| 0 | Time to gel | | 0 | Time to gel | | |
| 0:00 | Time to rise | | 0:00 | Time to rise | | |
| | Pouring plaque mold. Plaque looks good, small shrinkage <10% noted on demold | | | Pouring plaque mold. Reaction was fast, material did not rise to the full mold thickness. | | |

Example 3, Rigid Foam Formulations

In Example 3, a series of rigid polyurethane foams were formulated and a qualitative assessment of their performance was completed. In all cases, the procedure for making these foams is as follows. First, all B-side components were dispensed in precise quantities into a cup, including all polyols, catalysts and other additives, and water as a blowing agent. They were then hand-mixed using a wooden stirring tool at room temperature for a minimum of 30 seconds, until the mixture was fully uniform. After the B-side was uniform, the A-side was added and the mixture was again mixed by hand for a minimum of 15 seconds. After the full formulation was well-mixed, the mixture was transferred to a new cup and allowed to rise. The foams were then allowed to cure at room temperature. In the tables below, "Time to Cream" refers to the time elapsed after the A-side was added to complete the mixture until the mixture began to bubble, as indicated by the mixture becoming opaque. "Time to Gel" is the amount of time after the A-side was added until the polyurethane foam network began to form, as indicated by pressing on the foam with the mixing tool. "Time to Rise" is the amount of time after the A-side was added until the foam completed its full rise.

| Rigid Foam Example 3A | | | | Rigid Foam Example 3B | | |
|---|---|---|---|---|---|---|
| Component | Description | Grams | Component | Description | | Grams |
| Mondur 489 | Polymeric MDI, 3.0 Functional | 25.10 | Mondur 489 | Polymeric MDI, 3.0 Functional | | 23.55 |
| Nov-53-052 | PEC Polyol, 1940 Mw, 1.1 PDI, 2.0 Functional | 30.00 | Nov-53-050 | PEC Polyol, 2660 Mw, 1.1 PDI, 2.0 Functional | | 30.00 |
| water | Water as a blowing agent | 1.14 | water | Water as a blowing agent | | 1.14 |
| Dabco BL11 | Blowing catalyst, 70% bis(2-dimethylamino-ethyl) ether in 30% dipropylene glycol | 0.39 | Dabco BL11 | Blowing catalyst, 70% bis(2-dimethylamino-ethyl) ether in 30% dipropylene glycol | | 0.39 |
| Dabco 33LV | Blowing catalyst, 33% Triethylene diamine in 67% dipropylene glycol | 0.15 | Dabco 33LV | Blowing catalyst, 33% Triethylene diamine in 67% dipropylene glycol | | 0.15 |
| DC5160 | Silicone surfactant, general polyurethane foam use | 0.36 | DC5160 | Silicone surfactant, general polyurethane foam use | | 0.36 |
| Results | | | Results | | | |
| 1:00 | Time to cream | | 1:00 | Time to cream | | |
| 2:27 | Time to gel | | <2:00 | Time to gel | | |
| | Foams will, shrinks overnight | | | Foams OK, shrinks overnight | | |

| Rigid Foam Example 3C | | | | Rigid Foam Example 3D | | |
|---|---|---|---|---|---|---|
| Component | Description | Grams | Component | Description | | Grams |
| Mondur 489 | Polymeric MDI, 3.0 Functional | 23.90 | Mondur 489 | Polymeric MDI, 3.0 Functional | | 30.76 |
| Nov-53-053 | PEC Polyol, 2500 Mw, 1.4 PDI, 2.0 Functional | 30.00 | Nov-61-151 | PEC Polyol, 800 Mw, 1.3 PDI, 2.0 Functional | | 30.00 |
| water | Water as a blowing agent | 1.14 | water | Water as a blowing agent | | 1.20 |
| Dabco BL11 | Blowing catalyst, 70% bis(2-dimethylamino-ethyl) ether in 30% dipropylene glycol | 0.39 | Dabco 1028 | Blowing catalyst, tertiary amine catalyst in butane diol | | 0.45 |
| Dabco 33LV | Blowing catalyst, 33% Triethylene diamine in 67% dipropylene glycol | 0.15 | Dabco 33LV | Blowing catalyst, 33% Triethylene diamine in 67% dipropylene glycol | | 0.15 |
| DC5160 | Silicone surfactant, general polyurethane foam use | 0.36 | DC5160 | Silicone surfactant, general polyurethane foam use | | 0.36 |
| Results | | | Results | | | |
| 1:15 | Time to cream | | 0:00 | Time to cream | | |
| 0:00 | Time to gel | | 0:00 | Time to gel | | |
| | Foam boils, collapses, like network did not develop strength until long after blowing done | | | Foam starts to rise, then boils and collapses | | |

| Rigid Foam Example 3E | | | | Rigid Foam Example 3F | | |
|---|---|---|---|---|---|---|
| Component | Description | Grams | Component | Description | | Grams |
| Mondur 489 | Polymeric MDI, 3.0 Functional | 30.76 | Mondur 489 | Polymeric MDI, 3.0 Functional | | 30.76 |
| | | | Nov-53-050 | PEC Polyol, 2660 Mw, 1.1 PDI, 2.0 Functional | | 5.00 |
| Nov-61-151 | PEC Polyol, 800 Mw, 1.3 PDI, 2.0 Functional | 30.00 | Nov-61-151 | PEC Polyol, 800 Mw, 1.3 PDI, 2.0 Functional | | 30.00 |
| water | Water as a blowing agent | 1.20 | water | Water as a blowing agent | | 1.20 |
| Dabco 1028 | Blowing catalyst, tertiary amine catalyst in butane diol | 0.45 | Dabco 1028 | Blowing catalyst, tertiary amine catalyst in butane diol | | 0.45 |
| Dabco 33LV | Blowing catalyst, 33% Triethylene diamine in 67% dipropylene glycol | 0.15 | Dabco 33LV | Blowing catalyst, 33% Triethylene diamine in 67% dipropylene glycol | | 0.15 |
| DC5160 | Silicone surfactant, general polyurethane foam use | 0.36 | DC5160 | Silicone surfactant, general polyurethane foam use | | 0.36 |
| Results | | | Results | | | |
| 0:00 | Time to cream | | 0:00 | Time to cream | | |
| 0:00 | Time to gel | | <1:40 | Time to gel | | |
| | Foam rises with no shrink. Cells are coarse, foam is friable | | | Foam rises with no shrink. Cells are coarse, foam is friable | | |

Example 4, Elastomer Formulations

In Example 4, a series of elastomers were formulated and a qualitative assessment of their performance was completed. In all cases, the procedure for making these elastomers is as follows. First, all B-side components were dispensed in precise quantities into a cup, including all polyols, catalysts and other additives. They were then hand-mixed using a wooden stirring tool at room temperature for a minimum of 30 seconds, until the mixture was fully uniform. After the B-side was uniform, the A-side was added and the mixture was again mixed by hand for a minimum of 15 seconds. After the full formulation was well-mixed, the mixture was poured into an aluminum mold and cured at 65 degrees celcius for one hour.

| Elastomer Example 4A | | | | | |
|---|---|---|---|---|---|
| Component | Description | Grams | Component | Description | Grams |
| Vibrathane 8000 | MDI prepolymer w/polyester polyol, 2.0 functional | 35.20 | | | |
| Nov-53-050 | PEC Polyol, 2660 Mw, 1.1 PDI, 2.0 Functional | 50.00 | | | |
| water | Water as a blowing agent | 0.00 | | | |
| EG | Ethylene Glycol | 0.00 | | | |
| BD | Butanediol | 4.00 | | | |
| T12 | Gelling catalyst, dibutyl tin dilaurate | 0.05 | | | |
| Dabco 1027 | Blowing catalyst, tertiary amine in 30% ethylene glycol | 0.00 | | | |
| Dabco 1028 | Blowing catalyst, tertiary amine catalyst in butane diol | 0.03 | | | |
| DC193 | Silicone surfactant, used primarily in shoe soles | 0.00 | | | |
| DC3043 | Silicone surfactant, used for microcellular foam | 0.00 | | | |

Results

Reacts fine. After overnight cure, elastomer is week, maybe 100% elongation

| Elastomer Example 4B | | |
|---|---|---|
| Component | Description | Grams |
| Vibrathane 8000 | MDI prepolymer w/polyester polyol, 2.0 functional | 36.40 |
| Nov-53-053 | PEC Polyol, 2500 Mw, 1.4 PDI, 2.0 Functional | 50.00 |
| water | Water as a blowing agent | 0.00 |
| EG | Ethylene Glycol | 0.00 |
| BD | Butanediol | 4.00 |
| T12 | Gelling catalyst, dibutyl tin dilaurate | 0.05 |
| Dabco 1027 | Blowing catalyst, tertiary amine in 30% ethylene glycol | 0.00 |
| Dabco 1028 | Blowing catalyst, tertiary amine catalyst in butane diol | 0.03 |
| DC193 | Silicone surfactant, used primarily in shoe soles | 0.00 |
| DC3043 | Silicone surfactant, used for microcellular foam | 0.00 |

Results

Reacts fine. After overnight cure, elastomer is week, maybe 100% elongation

| Elastomer Example 4C | | |
|---|---|---|
| Component | Description | Grams |
| Vibrathane 8000 | MDI prepolymer w/polyester polyol, 2.0 functional | 39.80 |
| Nov-53-052 | PEC Polyol, 1940 Mw, 1.1 PDI, 2.0 Functional | 50.00 |
| water | Water as a blowing agent | 0.00 |
| EG | Ethylene Glycol | 0.00 |
| BD | Butanediol | 4.00 |
| T12 | Gelling catalyst, dibutyl tin dilaurate | 0.05 |
| Dabco 1027 | Blowing catalyst, tertiary amine in 30% ethylene glycol | 0.00 |
| Dabco 1028 | Blowing catalyst, tertiary amine catalyst in butane diol | 0.03 |
| DC193 | Silicone surfactant, used primarily in shoe soles | 0.00 |
| DC3043 | Silicone surfactant, used for microcellular foam | 0.00 |

Results reacts very slowly, cannot demold after 1 hour, leave overnight; elastomer sample is brittle, little strength; After RT cure 2 months, the elastomer seems tougher, maybe 100% elongation

| Elastomer Example 4D | | |
|---|---|---|
| Component | Description | Grams |
| Vibrathane 8000 | MDI prepolymer w/polyester polyol, 2.0 functional | 39.80 |
| Nov-53-052 | PEC Polyol, 1940 Mw, 1.1 PDI, 2.0 Functional | 50.00 |
| water | Water as a blowing agent | 0.00 |
| EG | Ethylene Glycol | 0.00 |
| BD | Butanediol | 4.00 |
| T12 | Gelling catalyst, dibutyl tin dilaurate | 0.11 |
| Dabco 1027 | Blowing catalyst, tertiary amine in 30% ethylene glycol | 0.00 |
| Dabco 1028 | Blowing catalyst, tertiary amine catalyst in butane diol | 0.04 |
| DC193 | Silicone surfactant, used primarily in shoe soles | 0.00 |
| DC3043 | Silicone surfactant, used for microcellular foam | 0.00 |

Results reacts very slowly, cannot demold after 1 hour, leave overnight; elastomer sample is brittle, little strength; After RT cure 2 months, the elastomer seems tougher, maybe 100% elongation

OTHER EMBODIMENTS

The foregoing has been a description of certain non-limiting embodiments of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A reaction mixture for preparing a flexible polyurethane foam composition comprising:
    (a) a B-side mixture comprising
        an aliphatic polycarbonate polyol derived from copolymerization of carbon dioxide and one or more epoxides, wherein the aliphatic polycarbonate polyol is characterized in that, on average in the composition, the percentage of carbonate linkages is 85% or greater;
        one or more additional polyols selected from the group consisting of polyether polyols, polyester polyols, and mixtures of thereof; and
        optionally one or more additives selected from a group consisting of colorants, UV stabilizers, flame retardants, antimicrobials, plasticizers, bacteriostats, cell-openers, antistatic agents, compatibilizers, blowing agents, surfactants, and catalysts for the reaction of a polyol with a polyisocyanate; and
    (b) an A side mixture comprising one or more isocyanate compounds having two or more isocyanate groups per molecule, and optionally comprising one or more diluents, solvents, surfactants, or coreactants.

2. The reaction mixture according to claim 1, wherein the aliphatic polycarbonate polyol comprises a primary repeating unit having a structure:

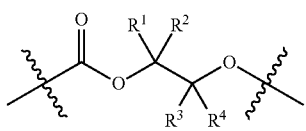

where $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms.

3. The reaction mixture according to claim 1, wherein the aliphatic polycarbonate polyol is poly(ethylene carbonate) derived from copolymerization of ethylene oxide and carbon dioxide.

4. The reaction mixture according to claim 1, wherein the aliphatic polycarbonate polyol is poly(propylene carbonate) derived from copolymerization of propylene oxide and carbon dioxide.

5. The reaction mixture according to claim 1, wherein the aliphatic polycarbonate polyol has a number average molecular weight ($M_n$) in the range of 500 g/mol to 10,000 g/mol.

6. The reaction mixture according to claim 1, wherein the aliphatic polycarbonate polyol is characterized in that it has a polydispersity index less than 2.0.

7. The reaction mixture according to claim 4, wherein the aliphatic polycarbonate polyol has a head-to-tail ratio greater than 80%.

8. The reaction mixture according to claim 1, wherein the one or more additional polyols comprise from 5 weight percent to 95 weight percent of the total polyol content of the B-side mixture.

9. The reaction mixture according to claim 1, wherein the aliphatic polycarbonate polyol is characterized in that it has a Tg less than 20° C.

10. The reaction mixture according to claim 1, wherein the aliphatic polycarbonate polyol is characterized in that it has a viscosity less than 30,000 cps at 25° C.

11. The reaction mixture according to claim 1, wherein the aliphatic polycarbonate polyol is characterized in that at least 95% of the end groups are OH groups.

12. The reaction mixture according to claim 1, wherein the B-side mixture comprises a catalyst for the reaction of a polyol with a polyisocyanate selected from a group consisting of triethylenediamine, N-methylmorpholine, N,N-dimethylcyclohexylamine, pentamethyldiethylenetriamine, tetramethylethylenediamine, 1-methyl-4-dimethylaminoethylpiperazine, 3-methoxy-N-dimethylpropylamine, N-ethyl-morpholine, diethylethanolamine, N-cocomorpholine, N,N-dimethyl-N',N'-dimethylisopropylpropylenediamine, N,N-diethyl-3-diethylaminopropylamine dimethylbenzylamine, 1,8-Diazabicycloundec-7-ene (DBU), 1,4-diazabicyclo[2.2.2]octane (DABCO), triazabicyclodecene (TBD), N-methyltriazabicyclodecene, (MTBD), organomercury catalysts, organolead catalysts, organoferric catalysts, and organotin catalysts.

13. The reaction mixture according to claim 1, wherein the A-side mixture comprises an isocyanate compound selected from a group consisting of 1,6-hexamethylaminediisocyanate (HDI), isophorone diisocyanate (IPDI), 4,4'methylene-bis(cyclohexyl isocyanate) ($H_{12}MDI$), 2,4-toluene diisocyanate (2,4-TDI), 2,6-toluene diisocyanate (2,6-TDI), diphenylmethane-4,4'-diisocyanate (4,4'-MDI), diphenylmethane-2,4'-diisocyanate (2,4'-MDI), xylylene diisocyanate (XDI), 1,3-Bis(isocyanatomethyl)cyclohexane (H6-XDI), 2,2,4-trimethylhexamethylene diisocyanate, 2,4,4-trimethylhexamethylene diisocyanate (TMDI), m-tetramethylxylylene diisocyanate (TMXDI), p-tetramethylxylylene diisocyanate (TMXDI), isocyanatomethyl-1,8-ictane diisocyanate (TIN), triphenylmethane-4,4',4"triisocyanate, Tris(p-isocyanatomethyl)thiosulfate, 1,3-Bis(isocyanatomethyl)benzene, 1,4-tetramethylene diisocyanate, trimethylhexane diisocyanate, 1,6-hexamethylene diisocyanate, 1,4-cyclohexyl diisocyanate, lysine diisocyanate, and mixtures of any two or more of these.

14. The reaction mixture according to claim 1, wherein the B-side mixture comprises polyols having OH numbers between 28 and 112.

15. The reaction mixture according to claim 1, wherein the aliphatic polycarbonate polyol has a structure P1:

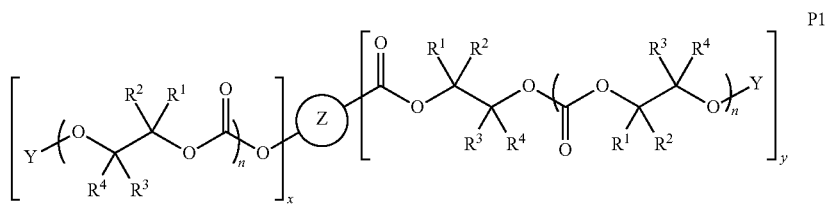

wherein, $R^1$, $R^2$, $R^3$, and $R^4$ are, at each occurrence in the polymer chain, independently selected from the group consisting of —H, fluorine, an optionally substituted $C_{1-30}$ aliphatic group, and an optionally substituted $C_{1-20}$ heteroaliphatic group, and an optionally substituted $C_{6-10}$ aryl group, where any two or more of $R^1$, $R^2$, $R^3$, and $R^4$ may optionally be taken together with intervening atoms to form one or more optionally substituted rings optionally containing one or more heteroatoms;

Y is, at each occurrence, independently —H or the site of attachment to any of the chain-extending moieties described in the classes and subclasses herein;

n is at each occurrence, independently an integer from about 3 to about 1,000;

is a multivalent moiety; and x and y are each independently an integer from 0 to 6, where the sum of x and y is between 2 and 6.

16. The reaction mixture according to claim 15, wherein

is derived from a dihydric alcohol.

17. The reaction mixture according to claim 16, wherein the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 2-methyl-2,4-pentane diol, 2-ethyl-1,3-hexane diol, 2-methyl-1,3-propane diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, isosorbide, glycerol monoesters, glycerol monoethers, trimethylolpropane monoesters, trimethylolpropane monoethers, pentaerythritol diesters, pentaerythritol diethers, and alkoxylated derivatives of any of these;

wherein the dihydric alcohol is selected from the group consisting of: diethylene glycol, triethylene glycol, tetraethylene glycol, higher poly(ethylene glycol), such as those having number average molecular weights of from 220 to about 2000 g/mol, dipropylene glycol, tripropylene glycol, and higher poly(propylene glycols); or wherein the dihydric alcohol is a polymeric diol selected from the group consisting of polyethers, polyesters, hydroxy-terminated polyolefins, polyethercopolyesters, polyether polycarbonates, polycarbonate-copolyesters, polyoxymethylene polymers, and alkoxylated analogs of any of these.

18. The reaction mixture according to claim 15, wherein

is derived from a triol.

19. The reaction mixture according to claim 18, wherein the triol is selected from the group consisting of: glycerol, 1,2,4-butanetriol, 2-(hydroxymethyl)-1,3-propanediol; hexane triols, trimethylol propane, trimethylol ethane, trimethylolhexane, 1,4-cyclohexanetrimethanol, pentaerythritol mono esters, pentaerythritol mono ethers, and alkoxylated analogs of any of these.

20. The reaction mixture according to claim 15, where

is derived from a polymeric triol, the polymeric triol is selected from the group consisting of polyethers, polyesters, hydroxy-terminated polyolefins, polyether-copolyesters, polyether polycarbonates, polyoxymethylene polymers, polycarbonate-copolyesters, and alkoxylated analogs of any of these.

21. The reaction mixture according to claim 15,

is derived from a tetraol or a polyhydric alcohol with more than four hydroxyl groups.

22. The reaction mixture according to claim 18, wherein:
the B-side mixture comprises polyols having OH numbers between 28 and 112;
the aliphatic polycarbonate polyol of the B-side mixture is characterized in that: each

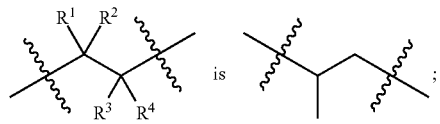

and
having an $M_n$ between about 1,000 g/mol and about 5,000 g/mol; and
the one or more additional polyols of the B-side mixture is a polyether polyol.

23. The reaction mixture of claim 22, wherein the B-side mixture further comprises:
a cell-opener;
a blowing agent;
a catalyst for the reaction of a polyol with a polyisocyanate, wherein the catalyst is an organometallic compound; and
water.

24. The reaction mixture of claim 23, wherein:
the cell-opener is selected from the group consisting of silicone-based antifoamers, waxes, finely divided solids, liquid perfluorocarbons, paraffin oils, long-chain fatty acids and certain polyether polyols made using high concentrations of ethylene oxide; and
the organometallic compound is selected from the group consisting of organomercury, organolead, organoferric, and organotin catalysts.

25. A process for preparing a flexible polyurethane foam composition comprising the steps of:
providing the reaction mixture of claim 1; and
allowing the flexible polyurethane foam to rise.

* * * * *